(12) United States Patent
Matsuura et al.

(10) Patent No.: US 8,412,276 B2
(45) Date of Patent: Apr. 2, 2013

(54) PROXIMITY TYPE ANTENNA AND RADIO COMMUNICATION DEVICE

(75) Inventors: Toshinori Matsuura, Tokyo (JP); Sadaharu Yoneda, Tokyo (JP); Koichi Kimura, Tokyo (JP)

(73) Assignee: TDK Corporation, Tokyo (JP)

( * ) Notice: Subject to any disclaimer, the term of this patent is extended or adjusted under 35 U.S.C. 154(b) by 153 days.

(21) Appl. No.: 13/114,839

(22) Filed: May 24, 2011

(65) Prior Publication Data

US 2011/0287715 A1 Nov. 24, 2011

(30) Foreign Application Priority Data

| May 24, 2010 | (JP) | 2010-118760 |
| May 24, 2010 | (JP) | 2010-118761 |
| May 24, 2010 | (JP) | 2010-118762 |
| May 24, 2010 | (JP) | 2010-118763 |

(51) Int. Cl.
*H04M 1/00* (2006.01)

(52) U.S. Cl. .......... 455/562.1; 455/575.7; 455/129; 455/25; 343/767

(58) Field of Classification Search .......... 455/562.1, 455/575.7, 129, 25, 63.4, 82, 83; 343/767, 343/789

See application file for complete search history.

(56) References Cited

U.S. PATENT DOCUMENTS

| 4,935,745 | A * | 6/1990 | Mori et al. | 343/702 |
| 6,281,599 | B1 * | 8/2001 | Murakami et al. | 307/10.2 |
| 6,452,543 | B1 * | 9/2002 | Tseng et al. | 342/357.36 |
| 6,459,406 | B1 * | 10/2002 | Tseng et al. | 342/357.36 |
| 6,600,448 | B2 * | 7/2003 | Ikegaya et al. | 343/700 MS |
| 6,633,261 | B2 * | 10/2003 | Iwai et al. | 343/700 MS |
| 6,917,333 | B2 * | 7/2005 | Ikegaya et al. | 343/700 MS |
| 6,937,200 | B2 * | 8/2005 | Takei | 343/767 |
| 7,277,060 | B2 * | 10/2007 | Fukuchi | 343/767 |
| 7,318,268 | B2 * | 1/2008 | Ikegaya et al. | 29/600 |
| 7,372,415 | B2 * | 5/2008 | Chun | 343/713 |
| 7,579,996 | B2 * | 8/2009 | Kuramoto et al. | 343/767 |
| 7,589,687 | B2 * | 9/2009 | Iwai et al. | 343/767 |
| 7,656,357 | B2 * | 2/2010 | Ishibashi et al. | 343/713 |
| 7,847,753 | B2 * | 12/2010 | Ishibashi et al. | 343/897 |
| 2003/0090425 | A1 * | 5/2003 | Ikegaya et al. | 343/767 |
| 2005/0012674 | A1 * | 1/2005 | Takei | 343/767 |
| 2008/0143612 | A1 * | 6/2008 | Iwai et al. | 343/702 |
| 2009/0051620 | A1 * | 2/2009 | Ishibashi et al. | 343/897 |
| 2009/0140938 | A1 * | 6/2009 | Ishibashi et al. | 343/713 |
| 2012/0176276 | A1 * | 7/2012 | Amari et al. | 343/700 MS |

FOREIGN PATENT DOCUMENTS

JP 2002-298095 10/2002

* cited by examiner

*Primary Examiner* — Minh D Dao

(74) *Attorney, Agent, or Firm* — Tomoki Tanida

(57) ABSTRACT

A proximity type antenna includes an antenna pattern for wirelessly communicating with an external communication device by magnetic coupling and a conductive plate arranged near the antenna pattern. The conductive plate has an aperture and a slit extending from the aperture to an end of the conductive plate and at least part of the aperture is arranged at a position of overlapping either the antenna pattern or the region surrounded by the inner periphery of the antenna pattern.

50 Claims, 58 Drawing Sheets

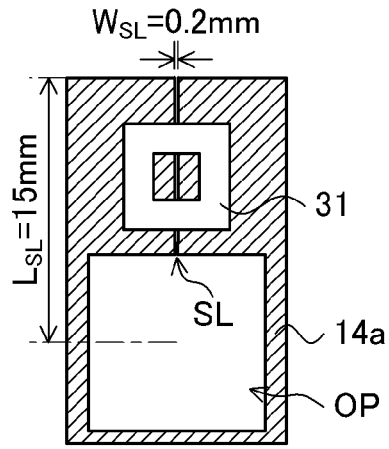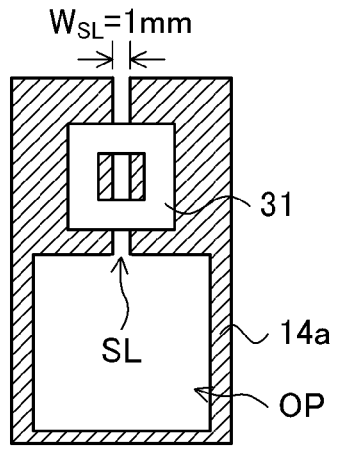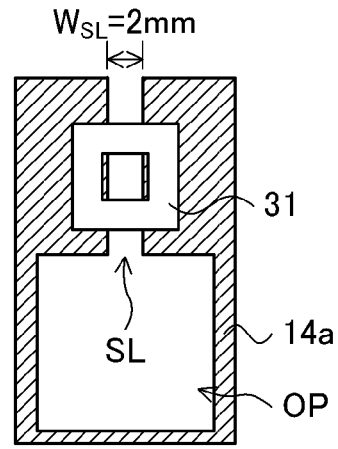
FIG.24A    FIG.24B    FIG.24C
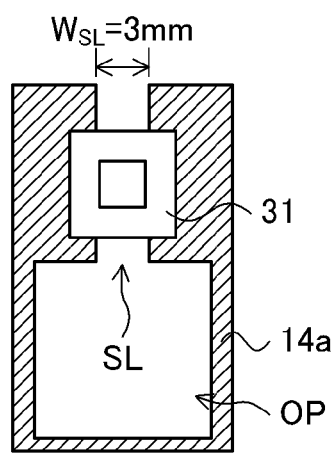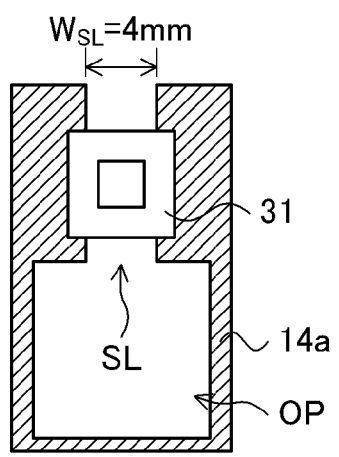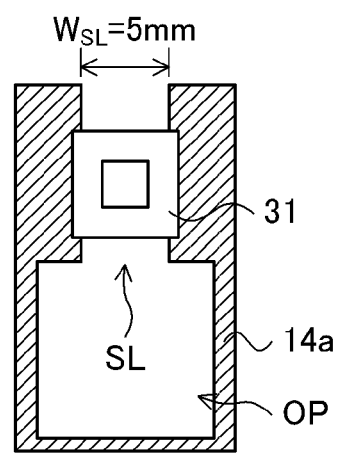
FIG.24D    FIG.24E    FIG.24F
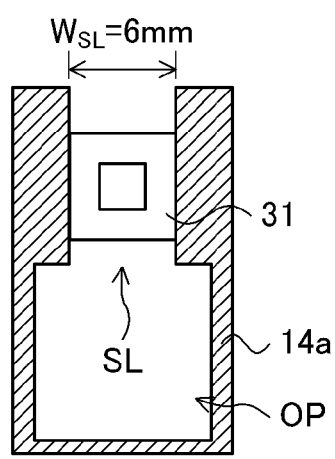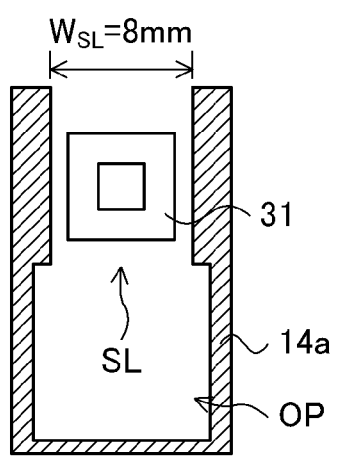
FIG.24G    FIG.24H

PROXIMITY TYPE ANTENNA AND RADIO COMMUNICATION DEVICE

TECHNICAL FIELD

The present invention relates to a proximity type antenna and a radio communication device. More particularly, this invention relates to a proximity type antenna to be used for a non-contact type IC card and a radio communication device mounted with such a non-contact type IC card.

BACKGROUND OF THE INVENTION

The scope of utilization of so-called non-contact type IC cards including MIFARE (registered trademark) and Felica (registered trademark), which are a type of communication devices, has been and is expanding. A non-contact type IC card has a feature of operating for short distance communication with an external communication device, which is referred to as reader/writer. More specifically, a non-contact type IC card includes a proximity type antenna (coupling coil) and an IC chip equipped with a memory. A non-contact type IC card transmits data in the memory and stores the data it receives by magnetic coupling using the proximity type antenna in the memory. While non-contact type IC cards that are designed to operate as independent communication devices have been in the main stream, the number of those that are mounted in and functionally combined with devices having some other feature such as mobile phones has been increasing in recent years.

In a device of the type under consideration that is mounted in and functionally combined with a device having some other feature, the components constituting the non-contact type IC card and the remaining components are arranged side by side. A conductive member may be arranged near the non-contact type IC card. If such is the case, the magnetic field is weakened by the eddy current that arises in the conductive member and the coupling characteristics between the non-contact type IC card and the external communication device can be degraded. For example, the cabinet of a mobile phone may be made of metal and when a non-contact type IC card function is mounted in such a mobile phone, the magnetic field is weakened by the eddy current that arises in the cabinet to consequently degrade the coupling characteristics.

Jpn. Pat. Appln. Laid-Open Publication No. 2002-298095 discloses a technique of suppressing degradation of coupling characteristics due to a conductive member when the conductive member is located near a reader/writer in a manner as described above. With this technique, a magnetic member is bonded to the surface of the reader/writer at the conductive member side. As a result, the magnetic field getting to the conductive member is reduced to consequently suppress degradation of coupling characteristics.

SUMMARY OF THE INVENTION

However, the effect of suppressing degradation of coupling characteristics by means of a magnetic member is not particularly remarkable and there is a demand for techniques that can more effectively suppress degradation of coupling characteristics. Particularly, unlike readers/writers, non-contact type IC cards are required to be downsized so that it is not desirable to use an additional member such as a magnetic member.

Therefore, one of the objects of the present invention is to provide a proximity type antenna and a radio communication device that can suppress degradation of coupling characteristics due to a conductive member arranged near a non-contact type IC card by means of a technique other than bonding a magnetic member.

To achieve the above-described object, the inventor of the present invention has developed a technique of suppressing degradation of coupling characteristics due to a conductive member by forming a slit at an end of the conductive member arranged near a non-contact type IC card. With this technique, the eddy current that arises due to a magnetic field flows, bypassing the slit, and the bypassing electric current generates a magnetic field in a direction of intensifying the magnetic field generated between the proximity type antenna and the external communication device communicating with it to consequently suppress the degradation of the coupling characteristics due to the conductive member.

With this technique, the antenna pattern of the proximity type antenna is preferably arranged across the slit in plan view so that the magnetic field that is generated by the electric current bypassing the slit may efficiently be taken into the proximity type antenna. However, it is difficult to realize such an arrangement in mobile phones developed in recent years. Namely, many of the users of such mobile phones using the mobile phone as a non-contact type IC card tend to make the top end side of the back surface of the cabinet of the mobile phone contact a reader/writer. Therefore, the slit is desirably arranged at the top end side of the back surface of the cabinet. On the other hand, many of the mobile phones marketed in recent years have a camera lens arranged at the top end side of the back surface of the cabinet so that the camera lens needs to be arranged in the slit in order to arrange the slit at the above-described position. Generally, the width of the antenna pattern of a proximity type antenna is small relative to a camera lens and hence the width of the slit is greater than the width of the antenna pattern. Therefore, it is difficult to arrange an antenna pattern across the slit.

Therefore, another one of the objects of the present invention is to provide a proximity type antenna and a radio communication device that can efficiently take the magnetic field generated by an electric current bypassing a slit into the antenna pattern when the width of the slit is greater than the width of the antenna pattern.

Additionally, in an instance where a non-contact type IC card is mounted in and functionally combined with a mobile phone, the proximity type antenna of the non-contact type IC card is generally arranged at the side of the rear surface of the cabinet (the surface opposite to the surface where an LCD and keypad are arranged). However, various components including a camera lens and a battery cover need to be arranged on the rear surface of the cabinet so that, when a non-contact type IC is mounted in and functionally combined with a mobile phone, care needs to be taken so as not to obstruct the operation of loading such components. In short, when a non-contact type IC card is mounted in some other device and functionally combined with the latter, care should be taken so as not to obstruct the operation of loading the components specific to the latter.

Therefore, still another one of the objects of the present invention is to provide a proximity type antenna and a radio communication device that suppress the degradation of the coupling characteristics due to the conductive member arranged near the non-contact type IC card by means of a technique other than bonding a magnetic member and that does not obstruct an operation of loading components specific to the device in which the non-contact type IC card is mounted.

In the first aspect of the present invention, the above objects are achieved by providing a proximity type antenna including an antenna pattern for wirelessly communicating with an external communication device by magnetic coupling and a conductive plate arranged near the antenna pattern. The conductive plate has an aperture and a slit extending from the aperture to an end of the conductive plate, and at least part of the aperture is arranged at a position of overlapping either the antenna pattern or the region surrounded by an inner periphery of the antenna pattern in plan view.

With this arrangement, an eddy current is made to flow to generate a magnetic field in a direction of intensifying the magnetic field generated between the proximity type antenna and the external communication device around the aperture. Therefore, the degradation of coupling characteristics due to the conductive plate arranged near the antenna pattern can be suppressed.

In the proximity type antenna as defined above, the aperture may be arranged off the center of the conductive plate. With such an arrangement, it is possible to improve the directivity of the coupling characteristics.

In a proximity type antenna according to any of the above definitions, the conductive plate may be arranged between the antenna pattern and the external communication device and the proximity type antenna may further include a magnetic member arranged at the side opposite to the conductive plate relative to the antenna pattern. Alternatively, the conductive plate may be arranged at the side opposite to the external communication device relative to the antenna pattern and the proximity type antenna may further include a magnetic member arranged at the side opposite to the antenna pattern relative to the conductive plate. With either of these arrangements, the coupling characteristics are improved if compared with an instance where no magnetic member is employed.

In a proximity type antenna according to any of the above definitions, the outer profile area of the antenna pattern may be not more than 20% of the area of the conductive plate. Excellent coupling characteristics can be obtained with such an arrangement.

In a proximity type antenna according to any of the above definitions, the area of the aperture may be not more than 10% of the area of the conductive plate. Excellent coupling characteristics can be obtained also with such an arrangement.

In a proximity type antenna according to any of the above definitions, the area of the aperture may be not less than 20% of the inner profile area of the antenna pattern and not more than 400% of the outer profile area of the antenna pattern. Excellent coupling characteristics can be obtained also with such an arrangement.

In a proximity type antenna according to any of the above definitions, the length of the slit may be not more than 20% or not less than 30% and not more than 70% of the length of the conductive plate in the extending direction of the slit. The conductive plate can maintain a sufficient degree of strength when the length of the slit is not more than 20% of the conductive plate and stable coupling characteristics can be obtained when the length of the slit is not less than 30% and not more than 70% of the length of the conductive plate.

In a proximity type antenna according to any of the above definitions, at least the part of the terminal edge of the conductive plate where the slit is formed may be curved to move away from the external communication device. Excellent coupling characteristics can be obtained with such an arrangement even when the proximity type antenna is inclined relative to the external communication device.

In a proximity type antenna according to any of the above definitions, the conductive plate may be made of a paramagnetic substance or a diamagnetic substance showing an electric conductivity of not less than $1 \times 10^7$ S/m. Excellent coupling characteristics can be obtained with such an arrangement.

In a proximity type antenna according to any of the above definitions, the proximity type antenna may operate as part of the non-contact type IC card to be mounted in a radio communication device and the conductive plate may be the cabinet of the radio communication device. With such an arrangement, the degradation of coupling characteristics due to that the cabinet of the radio communication device is a conductive member can be suppressed.

In a proximity type antenna according to any of the above definitions, the proximity type antenna may operate as part of the non-contact type IC card to be mounted in a radio communication device while the radio communication device may include a circuit substrate including a circuit for communications and a ground layer and the conductive plate may operate as the ground layer. With such an arrangement, the degradation of coupling characteristics due to that the circuit substrate of the radio communication device includes a ground layer can be suppressed.

In the second aspect of the present invention, there is provided a proximity type antenna including an antenna pattern for wirelessly communicating with an external communication device by magnetic coupling and a conductive plate arranged near the antenna pattern in a state of being insulated from the antenna pattern. The conductive plate has an aperture and a slit extending from the aperture to an end of the conductive plate, and the antenna pattern is arranged at a position of not overlapping the aperture in plan view but overlapping at least part of the slit in plan view.

In the third aspect of the present invention, there is provided a proximity type antenna including an antenna pattern for wirelessly communicating with an external communication device by magnetic coupling and a conductive plate arranged near the antenna pattern in a state of being insulated from the antenna pattern. The conductive plate is provided at an end part thereof with a slit having a constant width or an inwardly tapered slit, and the antenna pattern is arranged at a position of overlapping at least part of the slit in plan view.

With either of the above-described arrangements, an eddy current is made to flow to generate a magnetic field in a direction of intensifying the magnetic field generated between the proximity type antenna and the external communication device around the slit or the aperture. Therefore, the degradation of coupling characteristics due to the conductive plate arranged near the antenna pattern can be suppressed.

In a proximity type antenna according to any of the above definitions, the conductive plate may be arranged between the antenna pattern and the external communication device and the proximity type antenna may further include a magnetic member arranged at the side opposite to the conductive plate relative to the antenna pattern. Alternatively, the conductive plate may be arranged at the side opposite to the external communication device relative to the antenna pattern and the proximity type antenna may further include a magnetic member arranged at the side opposite to the antenna pattern relative to the conductive plate. With either of these arrangements, the coupling characteristics are improved if compared with an instance where no magnetic member is employed.

In a proximity type antenna according to either of the above definitions, the area where the slit overlaps the antenna pattern in plan view may be not less than 30% and not more than 110% of the outer profile area of the antenna pattern. Excellent coupling characteristics can be obtained with such an arrangement.

In a proximity type antenna according to any of the above definitions, the width of the slit may be not less than the length of the inner periphery of the antenna pattern as viewed in the transversal direction of the slit and not more than the length of the outer periphery of the antenna pattern as viewed in the transversal direction of the slit. Excellent coupling characteristics can be obtained also with such an arrangement.

In a proximity type antenna according to any of the above definitions, at least the part of the terminal edge of the conductive plate where the slit is formed may be curved to move away from the external communication device. Excellent coupling characteristics can be obtained with such an arrangement even when the proximity type antenna is inclined relative to the external communication device.

In a proximity type antenna according to any of the above definitions, the conductive plate may be made of a paramagnetic substance or a diamagnetic substance showing an electric conductivity of not less than $1 \times 10^7$ S/m. Excellent coupling characteristics can be obtained with such an arrangement.

In a proximity type antenna according to any of the above definitions, the proximity type antenna may operate as part of the non-contact type IC card to be mounted in a radio communication device and the conductive plate may be the cabinet of the radio communication device. With such an arrangement, the degradation of coupling characteristics due to that the cabinet of the radio communication device is a conductive member can be suppressed.

In a proximity type antenna according to any of the above definitions, the proximity type antenna may operate as part of the non-contact type IC card to be mounted in a radio communication device while the radio communication device may include a circuit substrate including a circuit for communications and a ground layer and the conductive plate may operate as the ground layer. With such an arrangement, the degradation of coupling characteristics due to that the circuit substrate of the radio communication device includes a ground layer can be suppressed.

In the fourth aspect of the present invention, there is provided a proximity type antenna including an antenna pattern for wirelessly communicating with an external communication device by magnetic coupling and a conductive plate arranged near the antenna pattern in a state of being insulated from the antenna pattern. The conductive plate has a relatively wide first slit arranged at an end part and a relatively narrow second slit arranged at the first slit. The width of the second slit is smaller than the width of the antenna pattern, and the antenna pattern is arranged across the second slit in plan view.

With such an arrangement, a bypassing current bypasses both the first slit and the second slit. Additionally, since the width of the second slit is smaller than the width of the antenna pattern, the antenna pattern can be arranged across the second slit in plan view. Therefore, the magnetic field that is generated by an electric current that bypasses the first slit (and the second slit) can efficiently be taken into the antenna pattern even when the width of the first slit is larger than the width of the antenna pattern.

In a proximity type antenna according to any of the above definitions, the conductive plate may be arranged between the antenna pattern and the external communication device and the proximity type antenna may further include a magnetic member arranged at the side opposite to the conductive plate relative to the antenna pattern. Alternatively, the conductive plate may be arranged at the side opposite to the external communication device relative to the antenna pattern and the proximity type antenna may further include a magnetic member arranged at the side opposite to the antenna pattern relative to the conductive plate. With either of these arrangements, the coupling characteristics are improved if compared with an instance where no magnetic member is employed.

In a proximity type antenna according to either of the above definitions, the area where the second slit overlaps the antenna pattern in plan view may be not less than 30% and not more than 70% of the outer profile area of the antenna pattern. Excellent coupling characteristics can be obtained with such an arrangement.

In a proximity type antenna according to any of the above definitions, at least the part of the terminal edge of the conductive plate where the first slit is formed may be curved to move away from the external communication device. Excellent coupling characteristics can be obtained with such an arrangement even when the proximity type antenna is inclined relative to the external communication device.

In a proximity type antenna according to any of the above definitions, the conductive plate may be made of a paramagnetic substance or a diamagnetic substance showing an electric conductivity of not less than $1 \times 10^7$ S/m. Excellent coupling characteristics can be obtained with such an arrangement.

In a proximity type antenna according to any of the above definitions, the proximity type antenna may operate as part of the non-contact type IC card to be mounted in a radio communication device and the conductive plate may be the cabinet of the radio communication device. With such an arrangement, the degradation of coupling characteristics due to that the cabinet of the radio communication device is a conductive member can be suppressed.

In a proximity type antenna according to any of the above definitions, the proximity type antenna may operate as part of the non-contact type IC card to be mounted in a radio communication device while the radio communication device may include a circuit substrate including a circuit for communications and a ground layer and the conductive plate may operate as the ground layer. With such an arrangement, the degradation of coupling characteristics due to that the circuit substrate of the radio communication device includes a ground layer can be suppressed.

In the fifth aspect of the present invention, there is provided a proximity type antenna including an antenna pattern for wirelessly communicating with an external communication device by magnetic coupling and a conductive plate arranged near the antenna pattern in a state of being insulated from the antenna pattern. The conductive plate has a first aperture, a slit extending from the first aperture to an end of the conductive plate and a second aperture surrounded by the conductive plate along all of its periphery, and the antenna pattern is arranged at a position of overlapping at least either of at least part of the first aperture or at least part of the slit in plan view.

With such an arrangement, an eddy current is made to flow to generate a magnetic field in a direction of intensifying the magnetic field generated between the proximity type antenna and the external communication device around the first aperture. Therefore, the degradation of coupling characteristics due to the conductive plate arranged near the antenna pattern can be suppressed. Additionally, as a result of arranging a second aperture at the conductive plate, a structure that minimally obstructs the mounting of components specific to the device to be mounted and functionally combined with the proximity type antenna is realized.

In a proximity type antenna according to any of the above definitions, the conductive plate may be arranged between the antenna pattern and the external communication device and the proximity type antenna may further include a magnetic member arranged at the side opposite to the conductive plate relative to the antenna pattern. Alternatively, the conductive plate may be arranged at the side opposite to the external communication device relative to the antenna pattern and the proximity type antenna may further include a magnetic member arranged at the side opposite to the antenna pattern relative to the conductive plate. With either of these arrangements, the coupling characteristics are improved if compared with an instance where no magnetic member is employed.

In a proximity type antenna according to any of the above definitions, at least the part of the terminal edge of the conductive plate where the slit is formed may be curved to move away from the external communication device. Excellent coupling characteristics can be obtained with such an arrangement even when the proximity type antenna is inclined relative to the external communication device.

In a proximity type antenna according to any of the above definitions, the conductive plate may be made of a paramagnetic substance or a diamagnetic substance showing an electric conductivity of not less than $1 \times 10^7$ S/m. Excellent coupling characteristics can be obtained with such an arrangement.

In a proximity type antenna according to any of the above definitions, the proximity type antenna may operate as part of the non-contact type IC card to be mounted in a radio communication device and the conductive plate may be the cabinet of the radio communication device. With such an arrangement, the degradation of coupling characteristics due to that the cabinet of the radio communication device is a conductive member can be suppressed.

In a proximity type antenna according to any of the above definitions, the proximity type antenna may operate as part of the non-contact type IC card to be mounted in a radio communication device while the radio communication device may include a circuit substrate including a circuit for communications and a ground layer and the conductive plate may operate as the ground layer. With such an arrangement, the degradation of coupling characteristics due to that the circuit substrate of the radio communication device includes a ground layer can be suppressed.

According to the present invention, there is provided a radio communication device including a proximity type antenna according to any of the above definitions.

In the first through third aspects of the present invention, the degradation of coupling characteristics due to a conductive plate arranged near the antenna pattern can be suppressed by means of a technique other than bonding a magnetic member. In the fourth aspect of the present invention, the magnetic field generated by an electric current bypassing the first slit (and the second slit) can efficiently be taken into the antenna pattern even when the width of the first slit is larger than the width of the antenna pattern. In the fifth aspect of the present invention, the degradation of coupling characteristics due to a conductive plate arranged near the antenna pattern can be suppressed by means of a technique other than bonding a magnetic member. Additionally, a structure that minimally obstructs the mounting of components specific to the device to be mounted and functionally combined with the proximity type antenna is realized.

BRIEF DESCRIPTION OF THE DRAWINGS

The above features and advantages of the present invention will be more apparent from the following description of certain preferred embodiments taken in conjunction with the accompanying drawings, in which:

FIGS. 24A through 24H illustrate the conductive plates and the antenna patterns used in the simulation for obtaining optimal values for the width of the slit according to the third embodiment of the present invention;

DETAILED DESCRIPTION OF THE EMBODIMENTS

Preferred embodiments of the present invention will be explained below in detail with reference to the accompanying drawings.

Figure 1:
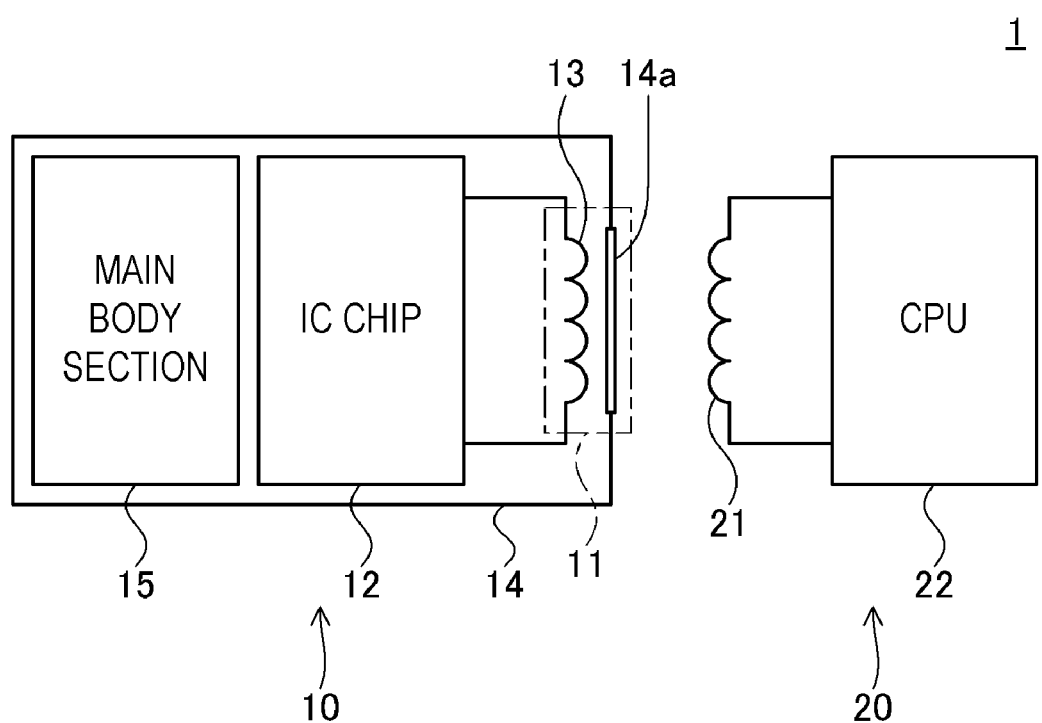
FIG. 1 is a schematic illustration of a short distance communication system according to the first embodiment of the present invention, showing the system configuration thereof.

FIG. 1 is a schematic illustration of a short distance communication system 1 according to the first embodiment of the present invention, showing the system configuration thereof. As shown in FIG. 1, the short distance communication system 1 includes a mobile phone 10 (radio communication apparatus) that includes a proximity type antenna 11, an IC chip 12 and a main body section 15 and a reader/writer 20 (external communication apparatus) that includes a proximity type antenna 21 and a CPU 22. The proximity type antenna 11 and the IC chip 12 mounted in the mobile phone 10 are components of a non-contact type IC card.

The short distance communication system 1 may typically be a MIFARE (registered trademark) or a Felica (registered trademark), which is a system for writing data into a memory (not shown) in the IC chip 12 and reading data from the memory by means of the reader/writer 20.

Communication between the mobile phone 10 as a non-contact type IC card and the reader/writer 20 is realized by magnetic coupling as short distance communication. More specifically, the reader/writer 20 constantly causes an electric current to flow to the proximity type antenna 21 and a magnetic field is generated around the proximity type antenna 21 by the electric current. As the proximity type antenna 11 gets into the magnetic field, electromotive force is generated in the proximity type antenna 11 due to the magnetic coupling and the IC chip 12 starts operating, using the electromotive force as power source. For reading data, the IC chip 12 generates an electric current that corresponds to the data stored in the internal memory (not shown) and causes it to flow to the proximity type antenna 11. As a result, the magnetic field changes and the electric current that flows to the proximity type antenna 21 also changes accordingly. The CPU 22 reads the data stored in the IC chip 12 by means of the change in the electric current. When writing data, the CPU 22 changes the electric current flowing to the proximity type antenna 21 according to the data to be written. As a result, the magnetic field changes and the electric current flowing to the proximity type antenna 11 also changes accordingly. The IC chip 12 detects the data to be written by means of the change in the electric current and writes the data into the internal memory.

The mobile phone 10 also operates as a mobile station device of a mobile communication system. The function of the mobile station device is realized mainly by the main body section 15. The main body section 15 has a function of communicating with a base station (not shown), a voice input/output function, an image input/output function and so on.

As shown in FIG. 1, the proximity type antenna 11 includes an antenna section 13 and a conductive plate 14a.

Figure 2A:
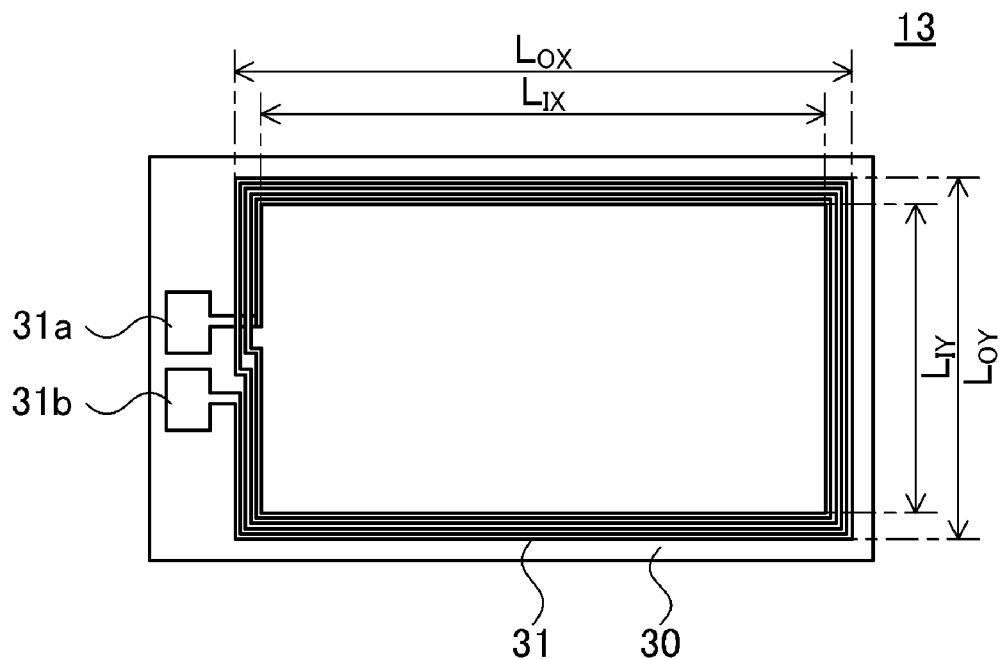
FIGS. 2A and 2B are plan views of two alternatives of the antenna section according to the first embodiment of the present invention.
Figure 2B:
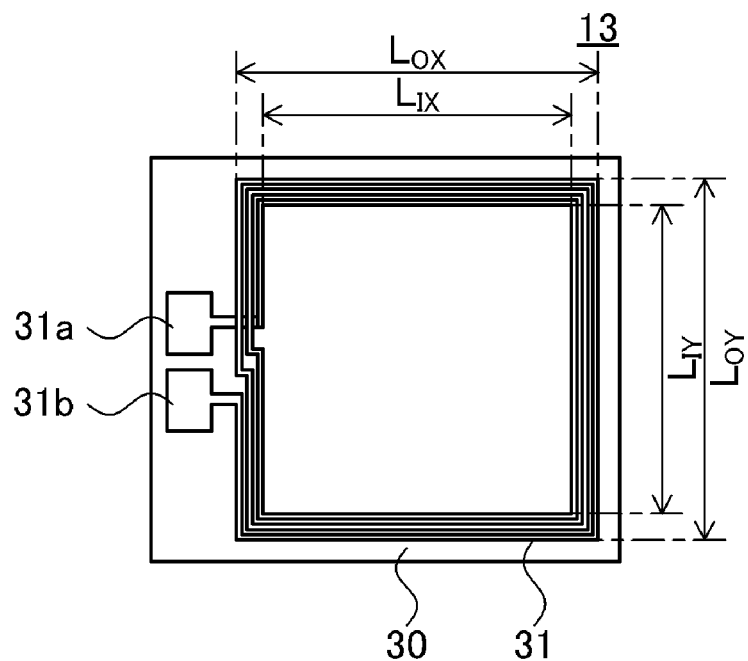

FIGS. 2A and 2B are plan views of two alternatives of the antenna section 13. As shown in these drawings, the antenna section 13 includes a substrate 30 and an antenna pattern 31 formed on the surface of the substrate 30. While each of FIGS. 2A and 2B shows an antenna pattern 31 formed by arranging a 3-turn rectangular planar spiral coil, the antenna pattern 31 is by no means limited to such an arrangement. The opposite ends 31a and 31b of the antenna pattern 31 are connected to the IC chip 12 shown in FIG. 1 (not shown).

With regard to the antenna pattern 31, terms of outer profile area $S_{OUTER}$ and inner profile area $S_{INNER}$ are employed in this specification. The outer profile area $S_{OUTER}$ refers to the area of the region surrounded by the outer periphery of the antenna pattern 31 and the inner profile area $S_{INNER}$ refers to the area of the region surrounded by the inner periphery of the antenna pattern 31. In the instance of FIGS. 2A and 2B, the transversal length and the longitudinal length of the outer periphery are respectively expressed by $L_{OX}$ and $L_{OY}$ and hence the outer profile area is expressed as $S_{OUTER} = L_{OX} \times$ $L_{OP}$, whereas the transversal length and the longitudinal length of the inner periphery are respectively expressed by $L_{IX}$ and $L_{IY}$ and hence the inner profile area is expressed as $S_{INNER}=L_{IX} \times L_{IY}$.

Returning to FIG. 1, the conductive plate 14a is a plate that is formed by part of the cabinet 14 of the mobile phone 10 so as to be electroconductive. The conductive plate 14a is arranged in parallel with the antenna section 13. The conductive plate 14a and the antenna section 13 are electrically insulated from each other. The reader/writer 20 is arranged vis-a-vis the conductive plate 14a.

Note that, while the antenna section 13 is arranged in the inside of the cabinet 14 and hence the conductive plate 14a is arranged between the antenna section 13 and the proximity type antenna 21 in FIG. 1, alternatively the antenna section 13 may be arranged outside the cabinet 14 and the antenna section 13 may be arranged between the conductive plate 14a and the proximity type antenna 21. While the conductive plate 14a is part of the cabinet 14 in the above description, the ground layer (not shown) formed in the motherboard (which will be described hereinafter) of the mobile phone 10 may be used as the conductive plate 14a. Alternatively, a conductive plate may be provided exclusively for the non-contact type IC card without utilizing a component of the mobile phone 10 so as to operate as the conductive plate 14a.

Figure 3A:
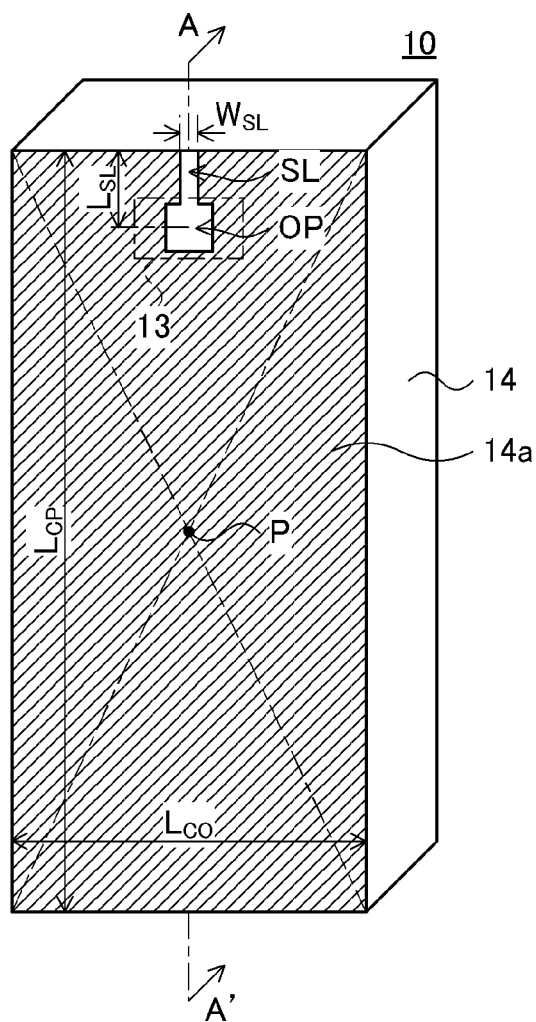
FIG. 3A is a schematic perspective view of the mobile phone according to the first embodiment of the present invention.
Figure 3B:
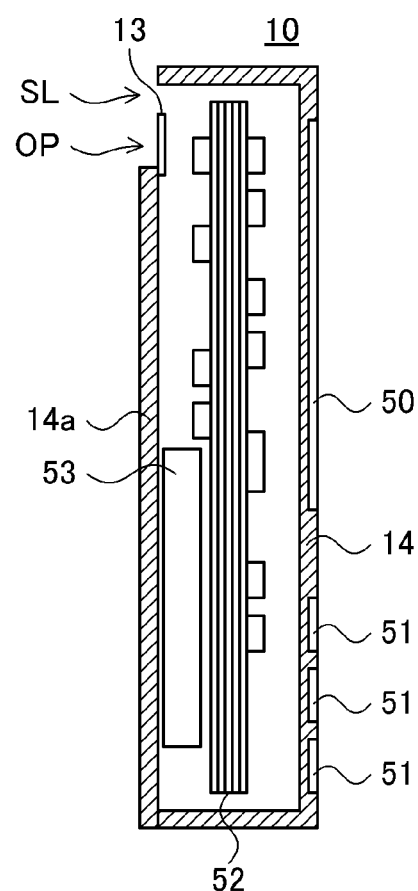
FIG. 3B is a cross-sectional view taken along line A-A' in FIG. 3A.

FIG. 3A is a schematic perspective view of the mobile phone 10. FIG. 3B is a cross-sectional view taken along line A-A' in FIG. 3A. The conductive plate 14a is hatched in FIG. 3A as in FIG. 3B for easy understanding, although FIG. 3A is not a cross-sectional view. The above description also applies to views that will be described hereinafter.

As shown in FIGS. 3A and 3B, the cabinet 14 of the mobile phone 10 is substantially a rectangular parallelepiped and an LCD 50 and a keypad 51 are arranged on one of the six surfaces thereof. A multilayer substrate 52 and a battery 53 are arranged in the inside of the mobile phone 10 along with the antenna section 13 and the IC chip 12 (not shown in FIGS. 3A and 3B). The multilayer substrate 52 operates as the motherboard of the mobile phone 10 and various electronic circuits including a circuit for communications and a ground layer are formed on the surface and in the inside thereof. Note that the components other than the antenna section 13 and the IC chip 12 correspond to the main body section 15 shown in FIG. 1.

The cabinet 14 is made of an electroconductive metal material and the conductive plate 14a is formed by using the back surface of the cabinet 14 (the surface opposite to the surface where the LCD 15 and the keypad 51 are arranged out of the six surfaces). The conductive plate 14a has an aperture OP and a slit SL extending from the aperture OP to an end of the conductive plate 14a.

In the following description, the length and the width of the slit SL are respectively expressed as $L_{SL}$ and $W_{SL}$ and the area of the aperture OP is expressed as $S_{OP}$. The length of the conductive plate 14a in the extending direction of the slit SL and the length of the conductive plate 14a in the direction orthogonal to the extending direction of the slit SL are respectively expressed as $L_{CP}$ and $L_{CO}$. Note that the length $L_{SL}$ of the slit SL is defined as the length from the central point of the aperture OP to the end of the conductive plate 14a as shown in FIG. 3A. The width $W_{SL}$ of the slit SL is made as narrow as possible within the range where neither an electrical conduction is formed between the opposite sides of the slit SL of the conductive plate 14a nor a capacitor is formed by the opposite sides of the conductive plate 14a.

The inside of the slit SL and that of the aperture OP may be void as shown in FIGS. 3A and 3B. Alternatively, they may be filled with a non-conductive substance such as insulating resin. When the insides are filled with a non-conductive substance, the cabinet 14 can be strengthened so much.

As shown in FIG. 3A, the aperture OP and the slit SL are arranged at an end of the conductive plate 14a to avoid the central point P of the conductive plate 14a. The central point P is the intersection of the diagonals of the rectangular conductive plate 14a. Such a position arrangement is selected in order to broaden the directivity of coupling characteristics. This will be described in greater detail hereinafter by referring to the results of simulations. While the central point P is the intersection of the diagonals of the conductive plate 14a in this instance, the central point will be the center of gravity of a projection image of the conductive plate 14a which is obtained by projecting the conductive plate 14a to the normal direction of a plane including the aperture OP and is configured by a homogeneous substance when the conductive plate 14a is polygonal or has an arbitrary profile formed by curves or when it is a three-dimensional object.

FIGS. 3A and 3B also show the position where the antenna section 13 is arranged. As shown, the antenna section 13 is arranged at a position where at least part of the aperture OP overlaps at least either the antenna pattern 31 or the region surrounded by the inner periphery of the antenna pattern 31 in plan view.

Figure 4A:
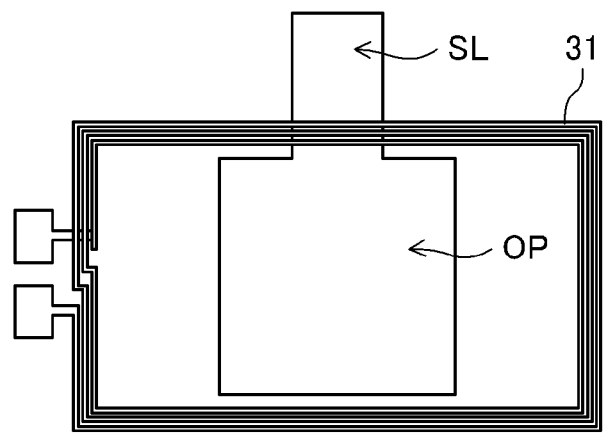
FIGS. 4A through 4C illustrate possible positional relationships between the aperture and the antenna pattern in plan view.
Figure 4B:
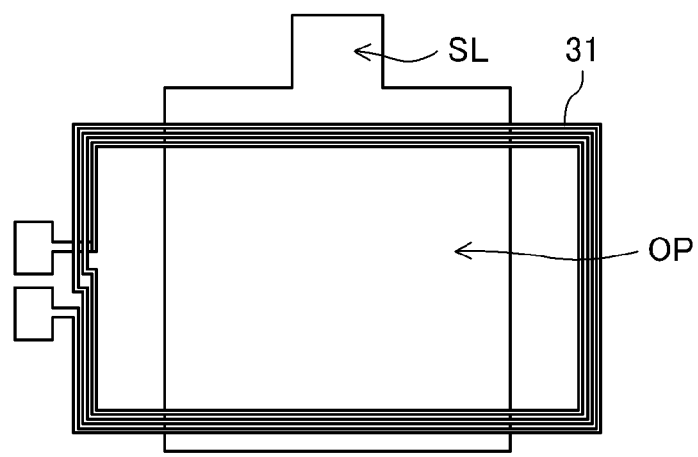
Figure 4C:
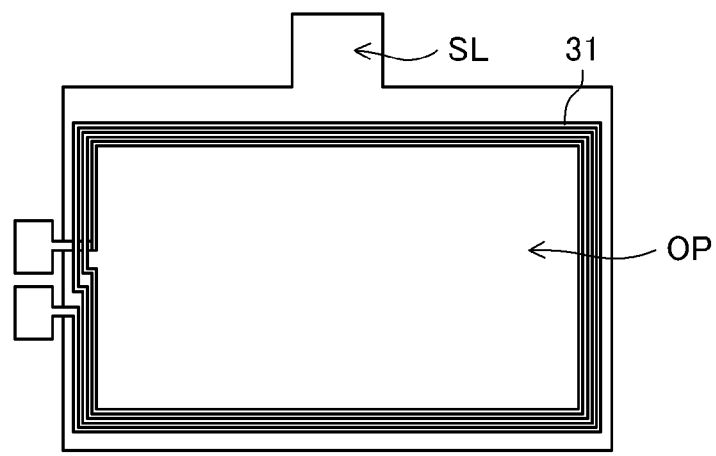

FIGS. 4A through 4C illustrate possible positional relationships between the aperture OP and the antenna pattern 31 in plan view. FIG. 4A shows an instance where the aperture OP entirely overlaps the region that is surrounded by the inner periphery of the antenna pattern 31 in plan view. FIGS. 4B and 4C respectively show an instance where the part of the aperture OP overlaps the antenna pattern 31 in plan view and an instance where part of the aperture OP overlaps the region surrounded by the inner periphery of the antenna pattern 31 in plan view.

With any of the above-described positional arrangements, the coupling characteristics between the mobile phone 10 that is a non-contact type IC card and the reader/writer 20 are not degraded when the conductive plate 14a, which is a conductive member, is placed in position. Rather, the coupling characteristics are improved if compared with an instance where no conductive plate 14a is provided. This will be described more specifically below.

Figure 5A:
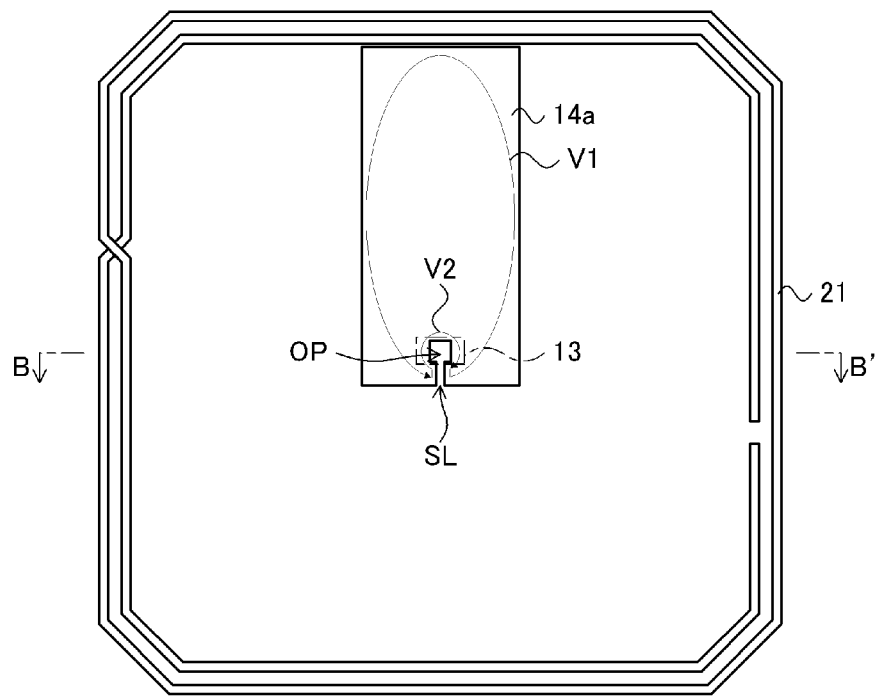
FIG. 5A is an illustration of a spiral coil that forms the proximity type antenna according to the first embodiment of the present invention and the conductive plate according to the first embodiment of the present invention.

FIG. 5A is an illustration of a spiral coil that forms the proximity type antenna 21 and the conductive plate 14a. The arrowed lines in FIG. 5A indicate the eddy currents that flow in the conductive plate 14a. As indicated by the arrowed lines, as the conductive plate 14a is brought close to the proximity type antenna 21, eddy currents V1 and V2 flow in the conductive plate 14a. The eddy current V1 is an electric current that flows along the edges of the conductive plate 14a, whereas the eddy current V2 is an electric current that flows around the aperture OP. Note that V1 and V2 do not represent any current values and are merely identification symbols for identifying the electric currents.

Figure 5B:
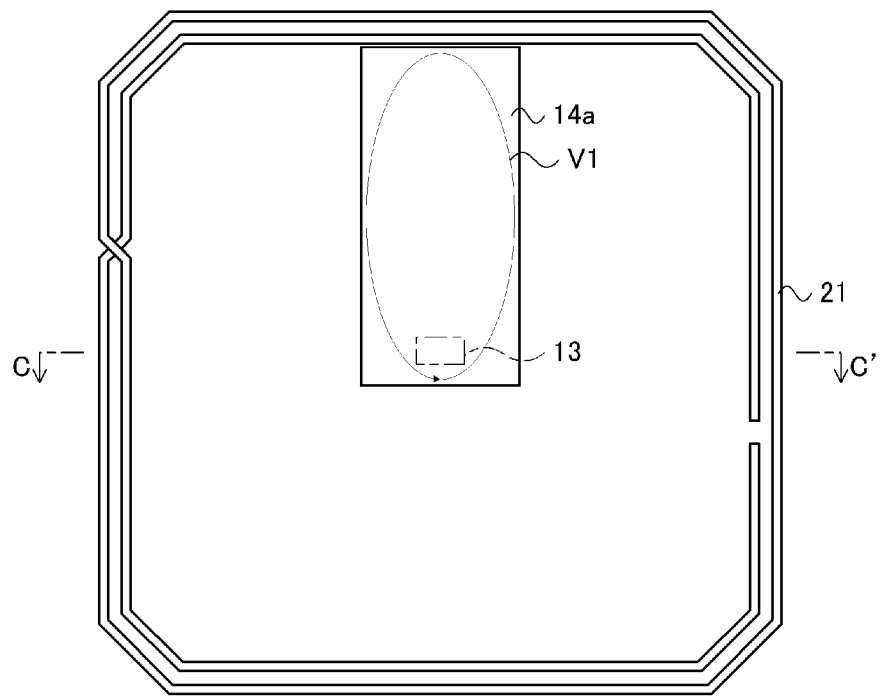
FIG. 5B shows an instance where a conductive plate having neither an aperture nor a slit is employed.

FIG. 5B shows an instance where a conductive plate 14a having neither an aperture OP nor a slit SL is employed as a comparative example. As will be understood by comparing the comparative example and FIG. 5A, the eddy current V2 is an electric current that flows in the conductive plate 14a only when an aperture OP and a slit SL are provided. In other words, because a slit SL is there, the eddy current V1 cannot make a full turn along the edges of the conductive plate 14a and therefore makes a detour to bypass the slit SL. Since an aperture OP is arranged on the bypass (at the inner end of the slit SL), an eddy current V2 is generated so as to flow in the direction opposite to the flowing direction of the eddy current V1.

Since the eddy currents that flow in the conductive plate 14a are generated by the magnetic field generated from the proximity type antenna 21, the eddy current V1 flows in the direction of generating a magnetic field that weakens the former magnetic field. To the contrary, the eddy current V2 flows in the direction opposite to the flowing direction of the eddy current V1 and hence generates a magnetic field in a direction that intensifies the magnetic field generated from the proximity type antenna 21. Therefore, the magnetic field is intensified as a result of that the eddy current V2 flows. The net results will be that the coupling characteristics are improved if compared with the instance where the conductive plate 14a has neither an aperture OP nor a slit SL and also with the instance where no conductive plate 14a is provided.

Figure 6A:
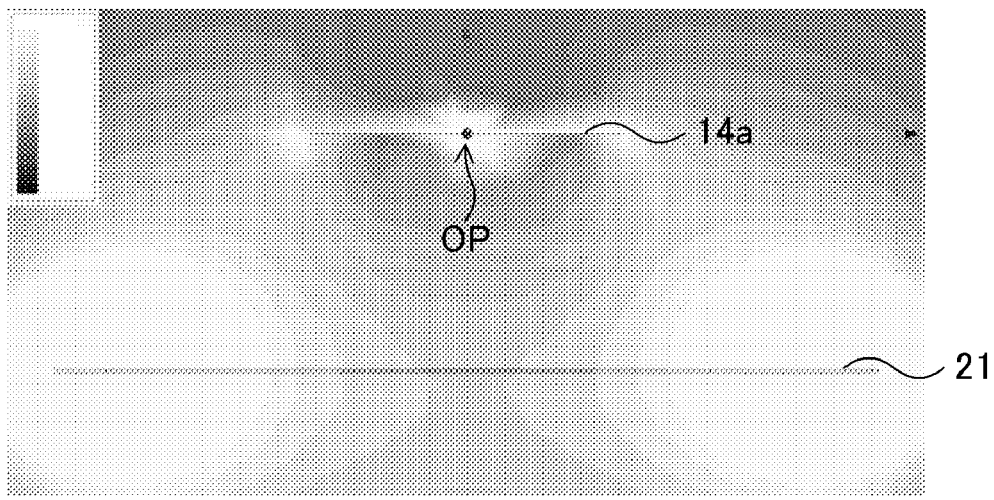
FIGS. 6A and 6B show the results obtained by simulating the magnetic field near the proximity type antenna and the conductive plate according to the first embodiment of the present invention.
Figure 6B:
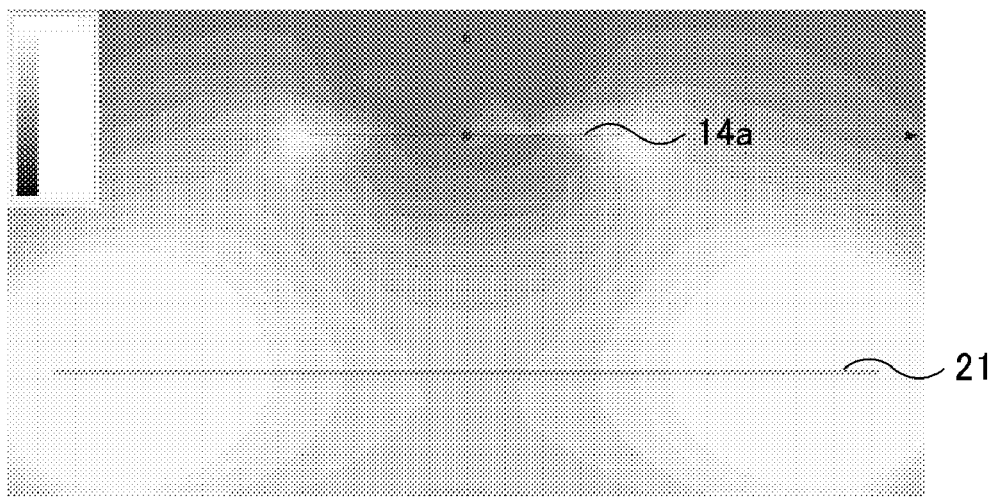

FIGS. 6A and 6B show the results obtained by simulating the magnetic field near the proximity type antenna 21 and the conductive plate 14a. FIG. 6A shows the magnetic field along the cross section taken along line B-B' in FIG. 5A and FIG. 6B shows the magnetic field along the cross section taken along line C-C' in FIG. 5B.

In FIGS. 6A and 6B, the light-colored areas are areas where the magnetic field is strong. As will be understood by seeing these views, a strong magnetic field is generated around the aperture OP but no such magnetic field is found when no aperture OP is provided. This is generated by the above-described eddy current V2 and the coupling characteristics are improved when a conductive plate 14a having an aperture OP and a slit SL is employed because such a magnetic field is generated around the aperture OP.

As described above, the coupling characteristics between the mobile phone 10 that is a non-contact type IC card and the reader/writer 20 are improved by providing the conductive plate 14a with an aperture OP and a slit SL. The extent of improvement is influenced by the size of the antenna pattern 31, that of the conductive plate 14a, that of the aperture OP and that of the slit SL as well as the material of the conductive plate 14a and so on. Therefore, their optimal values will be described below by referring to the results of simulations.

FIGS. 7A through 7E show the conductive plates 14a used for the first simulation. As shown in these drawings, the length $L_{CO}$ of conductive plate 14a in the direction orthogonal to the extending direction of the slit was employed as variable parameter and the tendency of change of the coupling efficiency relative to the change in the area ($=L_{CO} \times L_{CP}$) of the conductive plate 14a was observed.

Table 1 shows the specific values of $L_{CO}$ and other parameters used in this simulation. In the table, the symbols (mm etc.) shown below the respective parameters represent the units of the parameters. This description also applies to all the tables shown hereinafter. Although not shown in Table 1, as for the aperture OP, the length in the extending direction of the slit SL was made equal to 20 mm and the length in the direction orthogonal to the extending direction of the slit SL was made equal to 10 mm.

TABLE 1

Figures 7A, 7B, 7C, 7D, 7E:
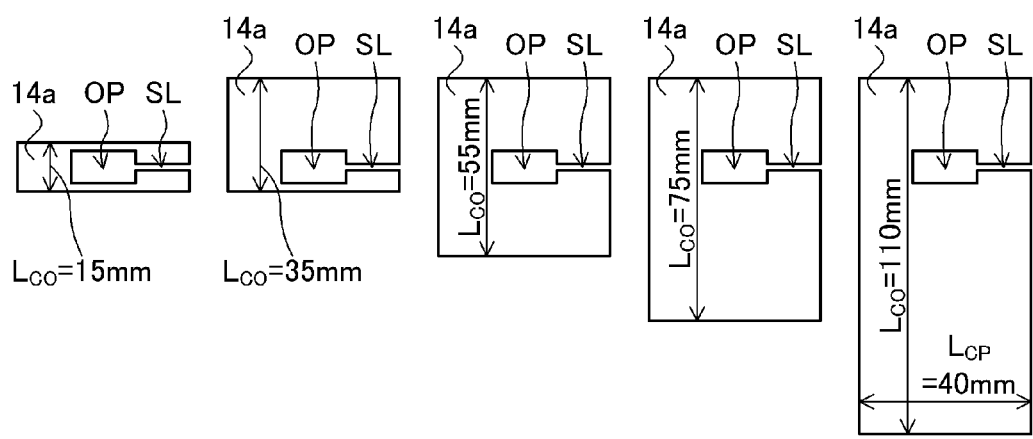
FIGS. 7A through 7E show the conductive plates used for the first simulation.

|  | $L_{CO}$ mm | $L_{CP}$ mm | $S_{OP}$ mm² | $L_{SL}$ mm | $L_{OX}$ mm | $L_{OY}$ mm | $L_{IX}$ mm | $L_{IY}$ mm |
|---|---|---|---|---|---|---|---|---|
| FIG. 7A | 15 | 40 | 200 | 20 | 15 | 25 | 11 | 21 |
| FIG. 7B | 35 | | | | | | | |
| FIG. 7C | 55 | | | | | | | |
| FIG. 7D | 75 | | | | | | | |
| FIG. 7E | 110 | | | | | | | |

In this simulation and in each of the simulations that will be described hereinafter, the proximity type antenna 21 had a size of 110 mm square and the distance between the proximity type antenna 21 and the antenna section 13 was made to be equal to 30 mm, while the thickness of the conductive plate 14a was made to be equal to 35 μm unless noted otherwise. The positional arrangement of the conductive plate 14a and the antenna pattern 31 was so determined as to make the central point of the proximity type antenna 21, that of the aperture OP and that of the inner periphery of the antenna pattern 31 agree with each other in plan view.

Figure 8A:
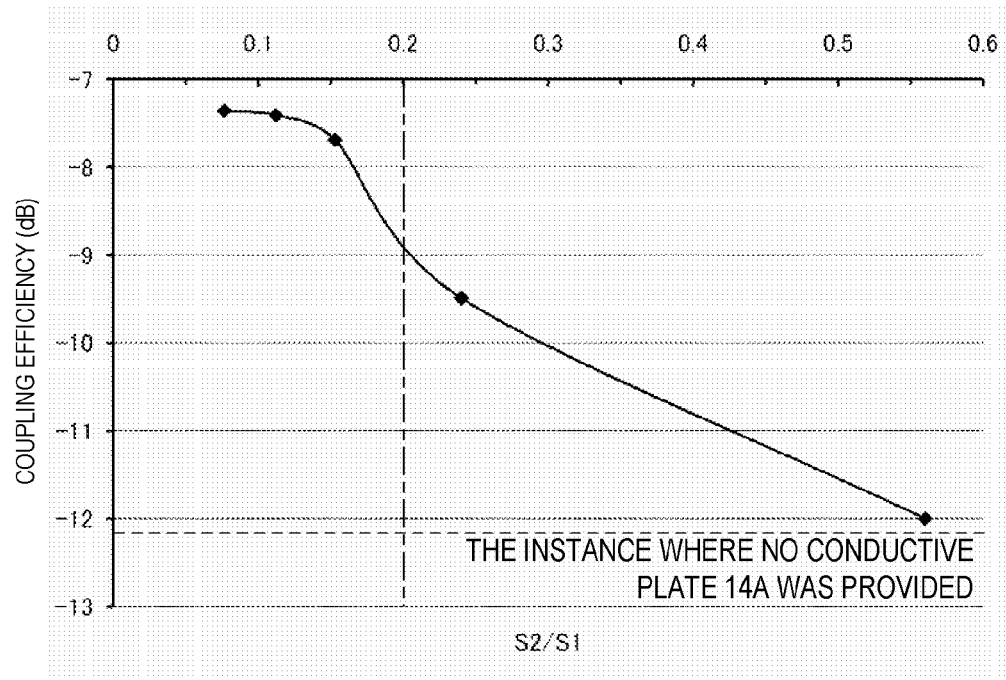
FIGS. 8A and 8B summarily illustrate the results of the first simulation.
Figure 8B:
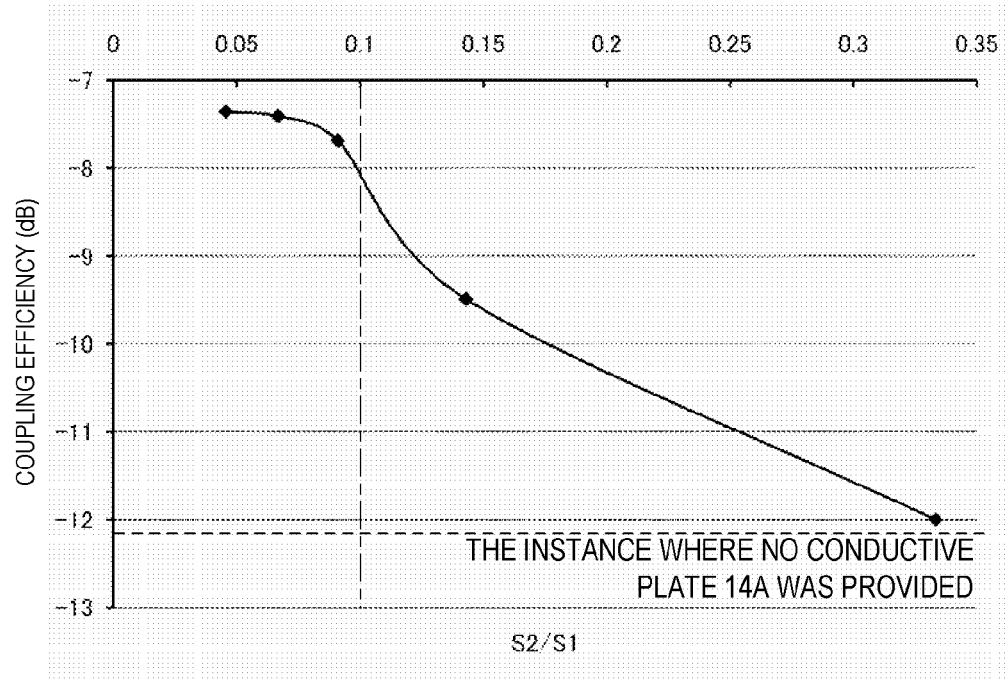

FIGS. 8A and 8B summarily illustrate the results of the first simulation. In both of FIGS. 8A and 8B, the horizontal axis indicates parameter S2/S1 and the vertical axis indicates the coupling efficiency (dB). The area ($=L_{CO} \times 40$ mm) of the conductive plate 14a that was a variable parameter is expressed as parameter S1. Parameter S2 is the outer profile area $S_{OUTER}$ ($=L_{OX} \times L_{OY}$) in FIG. 8A, whereas it is the area $S_{OP}$ of the aperture in FIG. 8B.

By seeing FIG. 8A, it will be understood that a high coupling efficiency was obtained at least within the scope of the simulation regardless of the value of S2/S1 if compared with the instance where no conductive plate 14a was provided. The coupling efficiency changed rapidly at and near S2/S1=0.2 and generally a good coupling efficiency was obtained when S2/S1≦0.2. Additionally, the coupling efficiency was good when S2/S1≦0.15 and the best coupling efficiency was obtained approximately when S2/S1≦0.11. Thus, the outer profile area $S_{OUTER}$ (S2) of the of the antenna pattern 31 is preferably not more than 20%, more preferably not more than 15%, most preferably not more than 11%, of the area (S1) of the conductive plate 14a.

By seeing FIG. 8B, on the other hand, it will be understood that the coupling efficiency changed rapidly at and near S2/S1=0.1 and generally a good coupling efficiency was obtained when S2/S1≦0.1. Additionally, the best coupling efficiency was obtained approximately when S2/S1≦0.7. Thus, the area $S_{OP}$ (S2) of the aperture is preferably not more than 10%, more preferably not more than 7%, of the area (S1) of the conductive plate 14a.

Figure 9A:
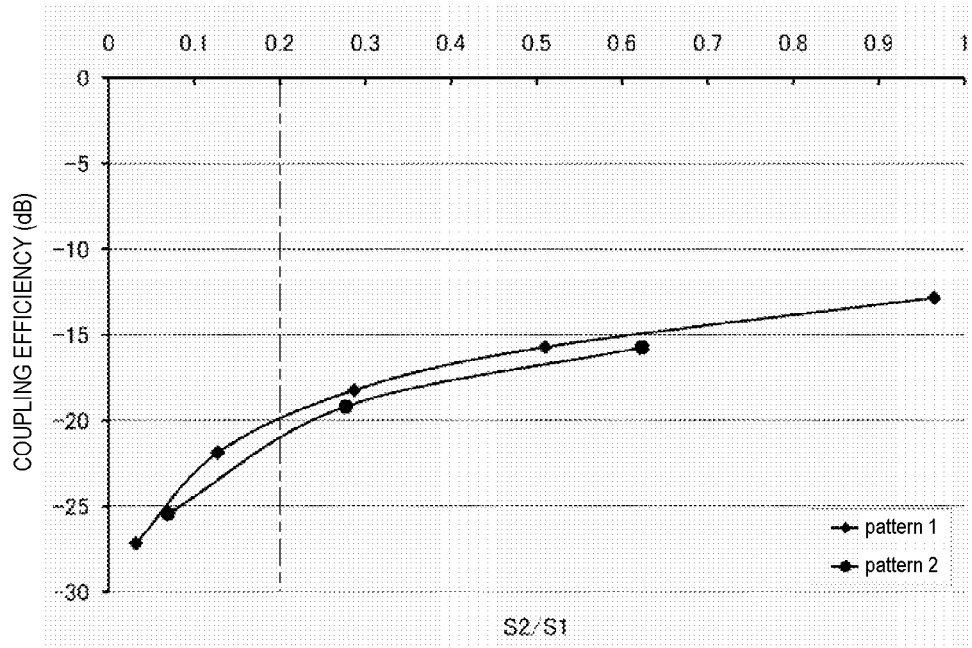
FIGS. 9A and 9B summarily illustrate the results of the second simulation.
Figure 9B:
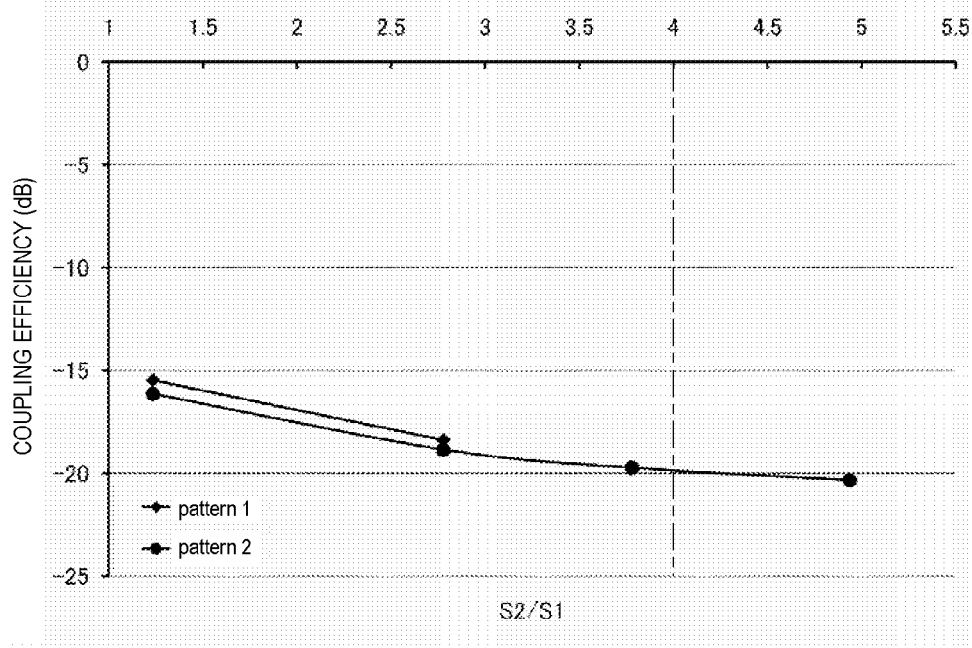

FIGS. 9A and 9B summarily illustrate the results of the second simulation. Table 2 shows the specific values of $S_{OP}$ and other parameters used in the second simulation. In the second simulation, the area $S_{OP}$ of the aperture OP was employed as variable parameter and the tendency of change of the coupling efficiency relative to the change in the area $S_{OP}$ was observed. Note that the aperture OP was made to show a square profile. In this simulation, antenna patterns 31 of two different types (pattern 1, pattern 2) having different sizes were prepared in order to see the influence of the size of the antenna pattern 31 relative to the coupling efficiency. In other words, both of them were employed in this simulation. Although not shown in Table 2, the line width was made to be equal to 0.1 mm and the inter-line distance was made to be equal to 0.1 mm in the pattern 1 of antenna pattern 31. Likewise, the line width was made to be equal to 0.2 mm and the inter-line distance was made to be equal to 0.1 mm in the pattern 2 of antenna pattern 31.

TABLE 2

|  | $L_{CO}$ mm | $L_{CP}$ mm | $S_{OP}$ mm² | $L_{SL}$ mm | $L_{OX}$ mm | $L_{OY}$ mm | $L_{IX}$ mm | $L_{IY}$ mm |
|---|---|---|---|---|---|---|---|---|
| Pattern 1 | 40 | 55 | 1 | 10 | 9 | 9 | 5.6 | 5.6 |
|  |  |  | 4 |  |  |  |  |  |
|  |  |  | 9 |  |  |  |  |  |
|  |  |  | 16 |  |  |  |  |  |
|  |  |  | 30.25 |  |  |  |  |  |
|  |  |  | 100 |  |  |  |  |  |
|  |  |  | 225 |  |  |  |  |  |

TABLE 2-continued

| | $L_{CO}$ mm | $L_{CP}$ mm | $S_{OP}$ mm² | $L_{SL}$ mm | $L_{OX}$ mm | $L_{OY}$ mm | $L_{IX}$ mm | $L_{IY}$ mm |
|---|---|---|---|---|---|---|---|---|
| Pattern 2 | | | 1 | | | | 3.8 | 3.8 |
| | | | 4 | | | | | |
| | | | 9 | | | | | |
| | | | 100 | | | | | |
| | | | 225 | | | | | |
| | | | 306.25 | | | | | |
| | | | 400 | | | | | |

In both of FIGS. 9A and 9B, the horizontal axis indicates parameter S2/S1 and the vertical axis indicates the coupling efficiency (dB). The area $S_{OP}$ of the aperture OP that was a variable parameter is expressed as parameter S2. Parameter S1 is the inner profile area $S_{INNER}$ ($=L_{IX} \times L_{IY}$) of the antenna pattern 31 in FIG. 9A, whereas it is the outer profile area $S_{OUTER}$ ($=L_{OX} \times L_{OY}$) of the antenna pattern 31 in FIG. 9B. Note that the values of the area $S_{OP}$ of the aperture OP that were smaller than the inner profile area $S_{INNER}$ of the antenna pattern 31 (S2/S1<1) were plotted in FIG. 9A, whereas the values of the area $S_{OP}$ of the aperture OP that were greater than the outer profile area $S_{OUTER}$ of the antenna pattern 31 (S2/S1>1) were plotted in FIG. 9B.

By seeing FIG. 9A, it will be understood that the coupling efficiency shows a value that makes communication hardly realizable (not more than about −20 dB) when S2/S1 is approximately less than 0.2 for both the pattern 1 and the pattern 2. Thus, the area $S_{OP}$ (S2) of the aperture OP is preferably not less than 20% of the inner profile area $S_{INNER}$ (S1) of the antenna pattern 31.

By seeing FIG. 9B, on the other hand, it will be understood that the smaller the value of S2/S1 is the better coupling efficiency can be obtained at least for the pattern 2 provided that S2/S1 is approximately not greater than 4. It will also be understood that a stable coupling efficiency can be obtained regardless of the value of S2/S1 provided that S2/S1 is approximately not less than 4. While no data was obtained for the pattern 1 at and near S2/S1=4, it will be safe to assume that a tendency similar to that of the pattern 2 is observable for the pattern 1 by seeing the tendency of the plotted two groups of data. Thus, the area $S_{OP}$ (S2) of the aperture OP is preferably not more than 400% of the outer profile area $S_{OUTER}$ (S1) of the antenna pattern 31 in order to obtain a condition that the smaller the value of S2/S1 is the better coupling efficiency can be obtained, whereas the area $S_{OP}$ (S2) of the aperture OP is preferably not less than 400% of the outer profile area $S_{OUTER}$ (S1) of the antenna pattern 31 in order to obtain a coupling efficiency that is not dependent on the value of S2/S1.

Figure 10:
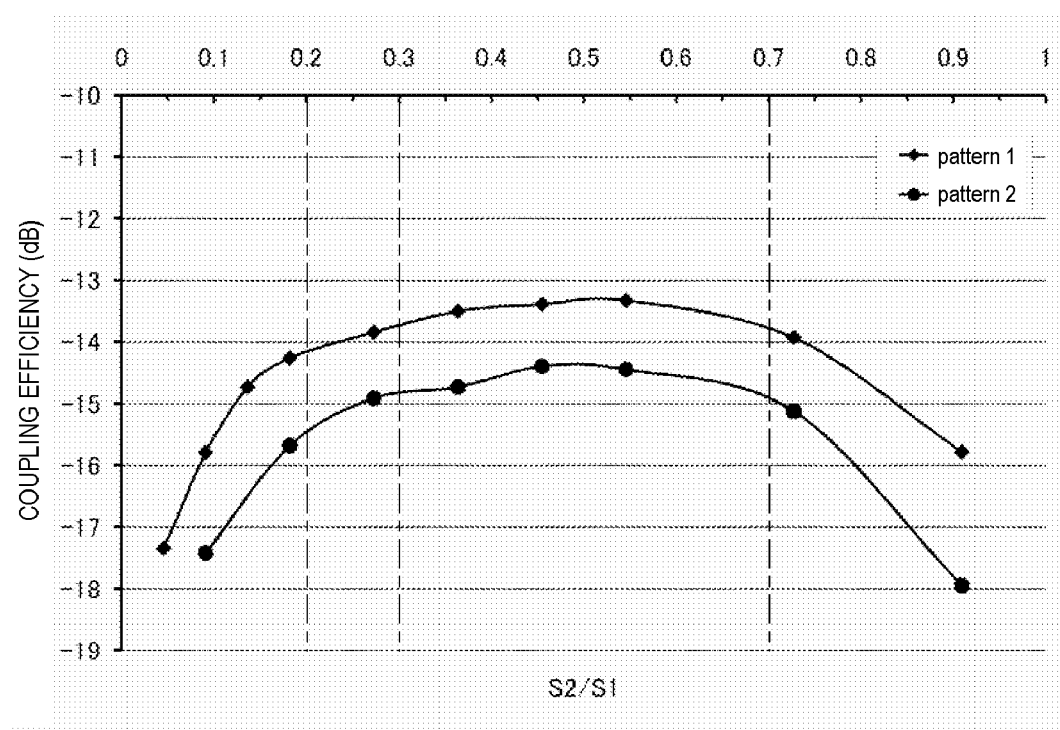
FIG. 10 summarily illustrates the results of the third simulation.

FIG. 10 summarily illustrates the results of the third simulation. Table 3 shows the specific values of $L_{SL}$ and other parameters used in the third simulation. In the third simulation, the length $L_{SL}$ of the slit SL was employed as variable parameter and the tendency of change of the coupling efficiency relative to the change in the length $L_{SL}$ was observed. In this simulation, conductive plates 14a of two different types (pattern 1, pattern 2) having different sizes were prepared in order to see the influence of the size of the conductive plate 14a relative to the coupling efficiency. In other words, both of them were employed in this simulation.

TABLE 3

| | $L_{CO}$ mm | $L_{CP}$ mm | $S_{OP}$ mm² | $L_{SL}$ mm | $L_{OX}$ mm | $L_{OY}$ mm | $L_{IX}$ mm | $L_{IY}$ mm |
|---|---|---|---|---|---|---|---|---|
| Pattern 1 | 40 | 110 | 9 | 5 | 9 | 9 | 3.8 | 3.8 |
| | | | | 10 | | | | |
| | | | | 15 | | | | |
| | | | | 20 | | | | |
| | | | | 25 | | | | |
| | | | | 30 | | | | |
| | | | | 40 | | | | |
| | | | | 50 | | | | |
| | | | | 60 | | | | |
| | | | | 80 | | | | |
| | | | | 100 | | | | |
| Pattern 2 | | 55 | | 5 | | | | |
| | | | | 10 | | | | |
| | | | | 15 | | | | |
| | | | | 20 | | | | |
| | | | | 30 | | | | |
| | | | | 40 | | | | |
| | | | | 50 | | | | |

In FIG. 10, the horizontal axis indicates parameter S2/S1 and the vertical axis indicates the coupling efficiency (dB). The length $L_{SL}$ of the slit SL as a variable parameter is expressed as parameter S2. Parameter S1 is the length $L_{CP}$ of the conductive plate 14a in the extending direction of the slit SL.

By seeing FIG. 10, it will be understood that the coupling efficiency stably shows a relatively large value (between about −13 dB and about −15 dB) when S2/S1 is approximately not less than 0.3 and not more than 0.7 for both the pattern 1 and the pattern 2. On the other hand, while S2/S1 is preferably approximately not more than 0.2 from the viewpoint of maintaining a satisfactory level of strength for the conductive plate 14a, the coupling efficiency does not fall significantly (to not more than −20 dB) if S2/S1 is made to be not more than 0.2. Thus, the length $L_{SL}$ of the slit SL is preferably not less than 30% and not more than 70% of the length $L_{CP}$ of the conductive plate 14a in the extending direction of the slit in order to stabilize the coupling efficiency at a relatively large value, whereas S2/S1 is preferably not more than 0.2 from the viewpoint of maintaining a satisfactory level of strength for the conductive plate 14a.

Figure 11A:
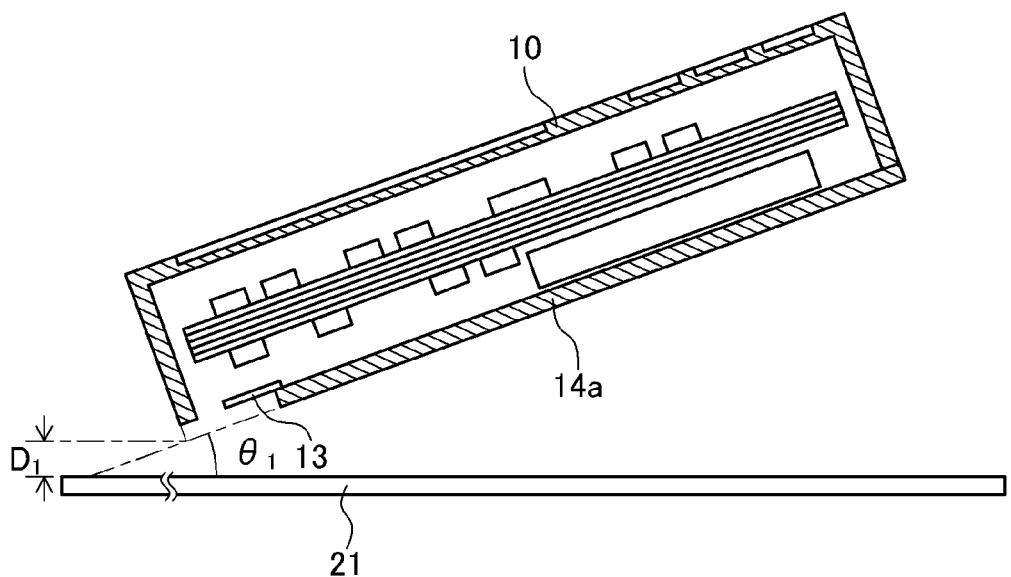
FIG. 11A is a schematic illustration of the angle that is employed in the fourth simulation.

FIG. 11A is a schematic illustration of the angle $\theta_1$ that was employed in the fourth simulation. The cross-sectional view of the mobile phone 10 shown in FIG. 11A is obtained by tilting the cross-sectional view shown in FIG. 3B. In actual scenes where the mobile phone 10 is operated, the mobile phone 10 and the proximity type antenna 21 of the reader/writer 20 may not necessarily be in parallel with each other as shown in FIG. 11A but may be arranged to show an angle $\theta_1$ ($\neq 0°$). In the fourth simulation, this angle $\theta_1$ was employed as variable parameter and the tendency of change of the coupling efficiency relative to the change in the angle $\theta_1$ was observed.

The object of the fourth simulation was to demonstrate the effect of arranging the aperture OP and the slit SL at positions off the central point P of the conductive plate 14a (see FIG. 3A). Therefore, the aperture OP was placed at a position where it overlaps the central point P and at a position off the central point P in the simulation. Additionally, for the purpose of comparison, an instance where the conductive plate 14a was removed (the cabinet 14 of the mobile phone 10 including the part corresponding to the conductive plate 14a was made of a non-conductive material) was also observed in the simulation.

Table 4 shows the specific values of angle $\theta_1$ and other parameters used in the fourth simulation. As seen from the table, different $L_{SL}$ values were discriminately used for the instance where the aperture OP overlapped the central point P and the instance where the aperture OP did not overlap the central point P. In this simulation, the position of the antenna section 13 relative to the conductive plate 14a was so selected as to make the central point of the aperture OP agree with the central point of the inner periphery of the antenna pattern 31 in plan view. The position of the antenna section 13 in the instance where the aperture OP does not overlap the central point P was also used for the position of the antenna section 13 in the instance where the conductive plate 14a was removed. The position of the mobile phone 10 relative to the proximity type antenna 21 was so selected as to make the central point of the proximity type antenna 21 agree with the central point of the inner periphery of the antenna pattern 31 in plan view and the minimum distance $D_1$ between the proximity type antenna 21 and the mobile phone (see FIG. 11A) show a constant value.

TABLE 4

|  | $\theta$ ° | $L_{CO}$ mm | $L_{CP}$ mm | $S_{OP}$ mm² | $L_{SL}$ mm | $L_{OX}$ mm | $L_{OY}$ mm | $L_{IX}$ mm | $L_{IY}$ mm |
|---|---|---|---|---|---|---|---|---|---|
| Instance where conductive plate 14a was removed | 30<br>45<br>60<br>90 |  |  | — |  | 6 | 6 | 2.6 | 2.6 |
| Instance where aperture OP does not overlap central point P | 30<br>45<br>60<br>90 | 40 | 55 | 16 | 10 |  |  |  |  |
| Instance where aperture OP overlapped central point P | 30<br>45<br>60<br>90 |  |  |  | 27.5 |  |  |  |  |

TABLE 5

|  | $L_{CO}$ mm | $L_{CP}$ mm | $S_{OP}$ mm² | $W_{SL}$ mm | $L_{SL}$ mm | $L_{OX}$ mm | $L_{OY}$ mm | $L_{IX}$ mm | $L_{IY}$ mm |
|---|---|---|---|---|---|---|---|---|---|
| Pattern 1 | 40 | 55 | 9 | 0.2<br>1<br>2<br>3<br>5<br>7<br>10 | 10 | 6 |  | 2.6 | 2.6 |
| Pattern 2 |  |  | 49 | 0.2<br>1<br>2<br>3<br>5<br>7<br>10 |  |  |  |  |  |

Figure 11B:
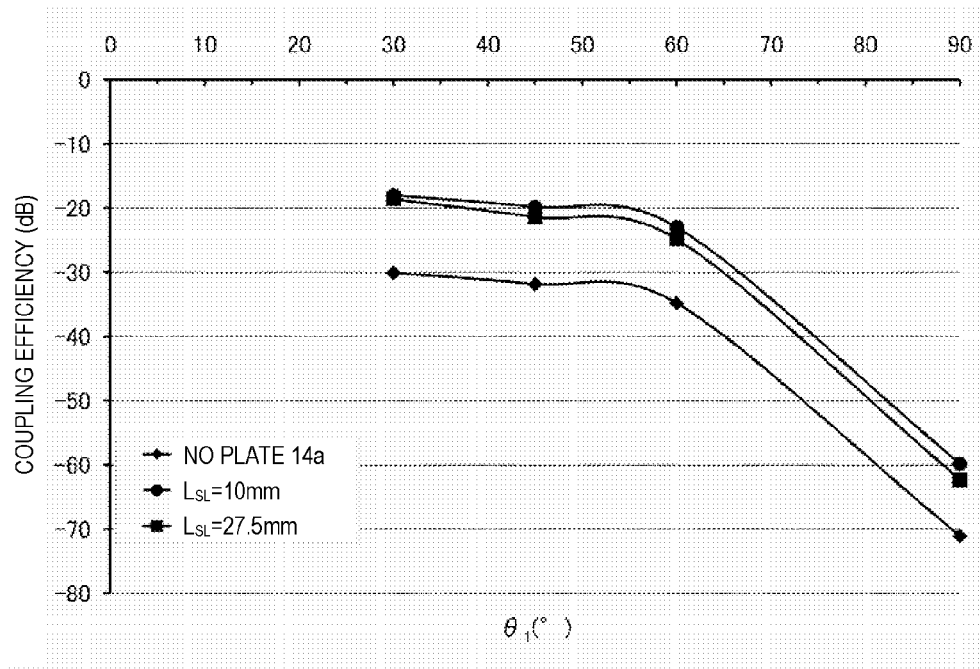
FIG. 11B schematically illustrates the results of the fourth simulation.

FIG. 11B schematically illustrates the results of the fourth simulation. In FIG. 11B, the horizontal axis indicates angle $\theta_1$ (°) and the vertical axis indicates the coupling efficiency (dB). By seeing FIG. 11B, it will be understood that the coupling efficiency fell as the angle $\theta_1$ was increased regardless if the conductive plate 14a was removed or not. This fact indicates that the coupling characteristics have directivity to make communication hardly realizable as the angle $\theta_1$ increases.

However, according to FIG. 11B, the coupling efficiency falls less if the angle $\theta_1$ increases provided that the length $L_{SL}$ of the slit SL is 10 mm when compared with other instances. This fact indicates that the coupling characteristics have a broader directivity when the aperture OP and the slit SL are arranged off the central point P of the conductive plate 14a. Thus, the aperture OP and the slit SL are preferably arranged off the central point P of the conductive plate 14a and at an end of the conductive plate 14a as shown in FIG. 3A.

Figure 12:
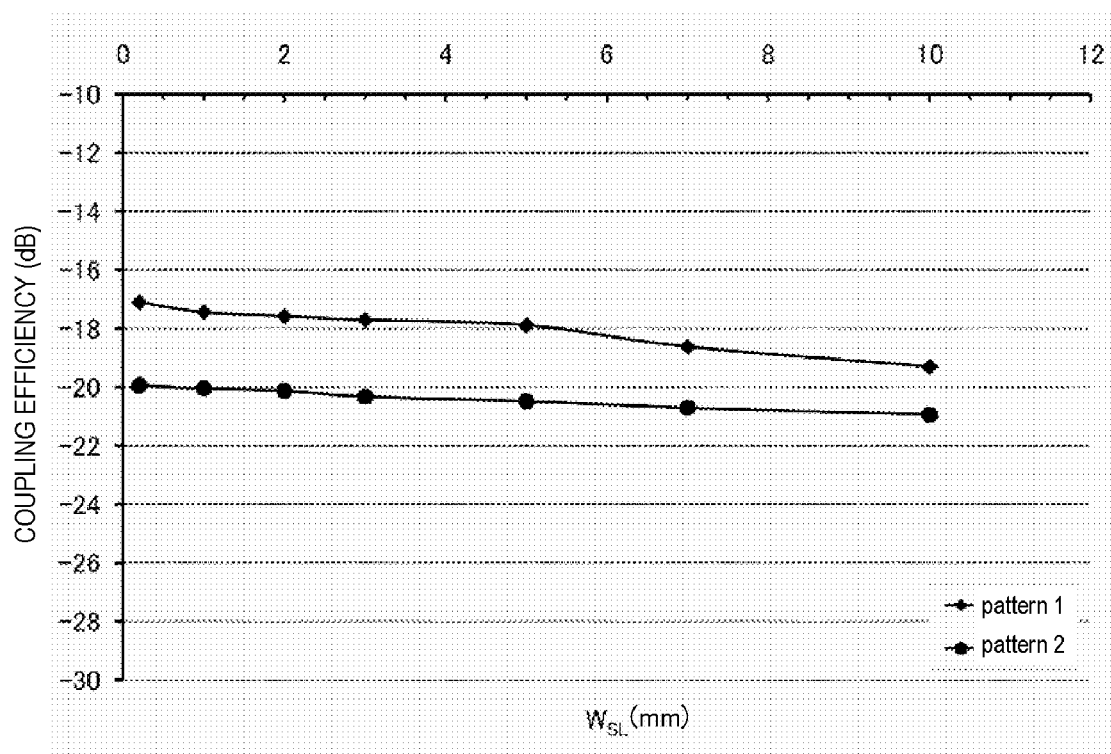
FIG. 12 schematically illustrates the results of the fifth simulation.

FIG. 12 schematically illustrates the results of the fifth simulation. Table 5 shows the specific values of $W_{SL}$ and other parameters used in the fifth simulation. In the fifth simulation, the width $W_{SL}$ of the slit SL was employed as variable parameter and the tendency of change of the coupling efficiency relative to the change in the width $W_{SL}$ was observed. In this simulation, apertures OP of two different types (pattern 1, pattern 2) having different sizes were prepared in order to see the influence of the size of the aperture OP relative to the coupling efficiency. In other words, both of them were employed in this simulation. Note that the aperture OP was made to show a square profile for both of the patterns.

In FIG. 12, the horizontal axis indicates the width $W_{SL}$ (mm) of the slit SL that was a variable parameter and the vertical axis indicates the coupling efficiency (dB). By seeing FIG. 12, it will be understood that the coupling efficiency was not influenced significantly by the width $W_{SL}$ of the slit SL for both the pattern 1 and the pattern 2. However, although not indicated by this simulation, it will be apparent that narrowing the width $W_{SL}$ down too much makes the opposite sides of the slit SL of the conductive plate 14a electrically connected and the arrangement of the slit SL meaningless. It is also not desirable that a capacitor is formed by the opposite sides of the slit SL of the conductive plate 14a. Therefore, as described above, the width $W_{SL}$ of the slit SL is preferably made as narrow as possible within the range where neither an electric conduction is formed between the opposite sides of the slit SL of the conductive plate 14a nor a capacitor is formed by the opposite sides of the conductive plate 14a.

Figure 13:
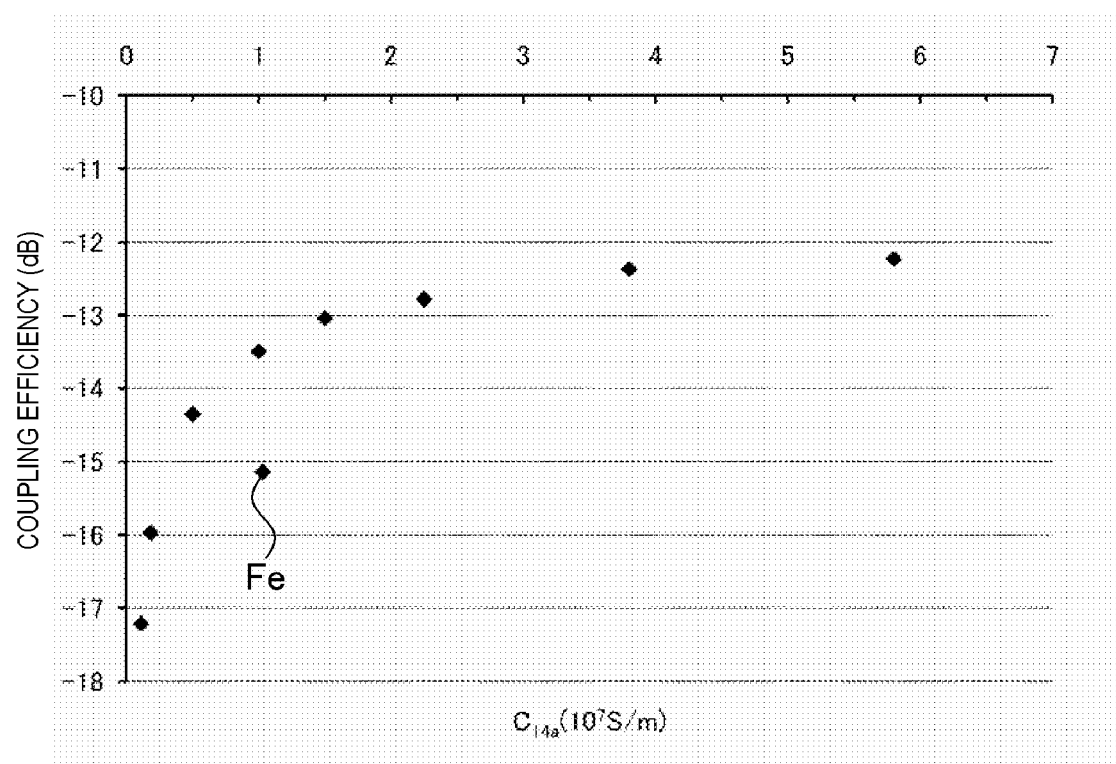
FIG. 13 schematically illustrates the results of the sixth simulation.

FIG. 13 schematically illustrates the results of the sixth simulation. Table 6 shows the materials of the conductive plates 14a tested in the sixth simulation and the specific values of the electro-conductivities $C_{14a}$ thereof and other parameters of the sixth simulation. In the sixth simulation, conductive plates 14a made of various different materials were employed and the tendency of change of the coupling efficiency relative to the electro-conductivities of the different materials was observed.

TABLE 6

| material | $C_{14a}$ $10^7$ S/m | $L_{CO}$ mm | $L_{CP}$ mm | $S_{OP}$ mm² | $W_{SL}$ mm | $L_{SL}$ mm | $L_{OX}$ mm | $L_{OY}$ mm | $L_{IX}$ mm | $L_{IY}$ mm |
|---|---|---|---|---|---|---|---|---|---|---|
| Cu | 5.800 | 40 | 55 | 49 | 0.2 | 10 | 9 | 9 | 3.8 | 3.8 |
| Al | 3.800 | | | | | | | | | |
| Mg | 2.250 | | | | | | | | | |
| Brass | 1.500 | | | | | | | | | |
| Fe | 1.030 | | | | | | | | | |
| Bronze | 1.000 | | | | | | | | | |
| Lead | 0.500 | | | | | | | | | |
| Ti | 0.182 | | | | | | | | | |
| SUS | 0.110 | | | | | | | | | |

In FIG. 13, the horizontal axis indicates the electro-conductivity $C_{14a}$ ($10^7$ S/m) of the conductive plate 14a that was a variable parameter and the vertical axis indicates the coupling efficiency (dB). By seeing FIG. 13, it will be understood that the coupling efficiency was high when the electro-conductivity $C_{14a}$ was high and held stable when the electro-conductivity $C_{14a}$ was not less than $1 \times 10^7$ S/m except the single instance where Fe (electro-conductivity $C_{14a}$=1.030× $10^7$ S/m) was employed for the material of the conductive plate 14a. It will also be understood that the coupling efficiency was remarkably low when Fe was employed for the material of the conductive plate 14a if compared with instances where materials showing a substantially same electro-conductivity were employed. This will be thought to be due to that Fe is a ferromagnetic substance (whereas each of the other materials is either a paramagnetic substance or a diamagnetic substance). Thus, the conductive plate 14a is preferably made of a material that is paramagnetic or diamagnetic and shows an electro-conductivity $C_{14a}$ of not less than $1 \times 10^7$ S/m.

As described above, the coupling characteristics between a mobile phone 10 that is a non-contact type IC card and a reader/writer 20 are influenced by the size of the antenna pattern 31, that of the conductive plate 14a, that of the aperture OP and that of the slit SL as well as the material of the conductive plate 14a. Optimum coupling characteristics can be obtained by selecting specific values for them in a manner as described above.

Figure 14A:
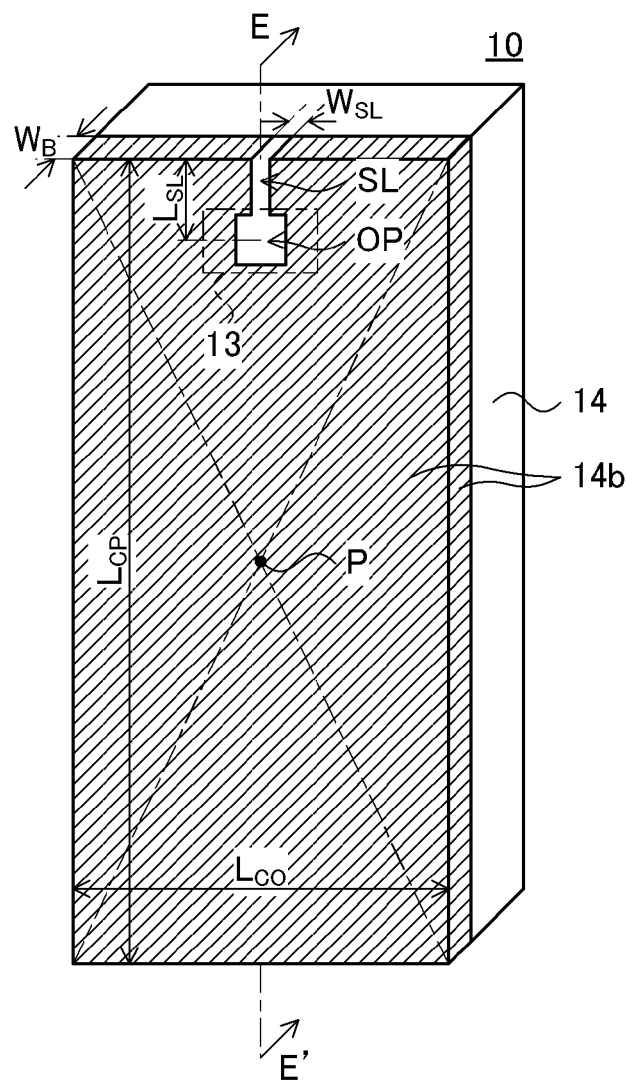
FIG. 14A is a schematic perspective view of a mobile phone to be used in a short distance communication system according to the second embodiment of the present invention.
Figure 14B:
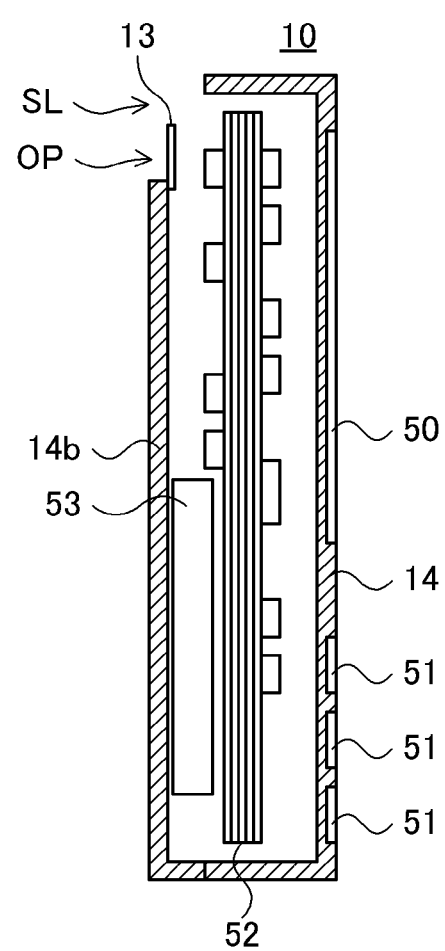
FIG. 14B is a cross-sectional view taken along line E-E' in FIG. 14A.

FIG. 14A is a schematic perspective view of a mobile phone 10 to be used in a short distance communication system according to the second embodiment of the present invention. FIG. 14B is a cross-sectional view taken along line E-E' in FIG. 14A. The short distance communication system according to this embodiment differs from the one according to the first embodiment only in terms of mobile phone 10. The mobile phone 10 of this embodiment differs from the mobile phone 10 of the first embodiment in that it includes conductive plate 14b instead of conductive plate 14a. Now, this embodiment will be described below in detail mainly in terms of the configuration of the mobile phone 10 with stress put on the difference between this embodiment and the first embodiment. Throughout the following description and the drawings referred to in the following description, the components similar to those of the first embodiment are denoted respectively by the same reference symbols.

As shown in FIGS. 14A and 14B, the conductive plate 14b extends not only on the rear surface of the cabinet 14 but also to the lateral surfaces of the cabinet 14 by a width $W_B$ from the rear surface. In other words, the edges of the conductive plate 14b are bent so as to move away from the reader/writer 20 (FIG. 1) by the width $W_B$ of the bent parts. The slit SL is extended to an end of the conductive plate 14b. In other words, the slit SL is also bent so as to move away from the reader/writer 20.

The use of a conductive plate 14b that are bent along the edges thereof can broaden the directivity of coupling characteristics. This will be described in greater detail hereinafter by referring to the results of simulations.

Figure 15A:
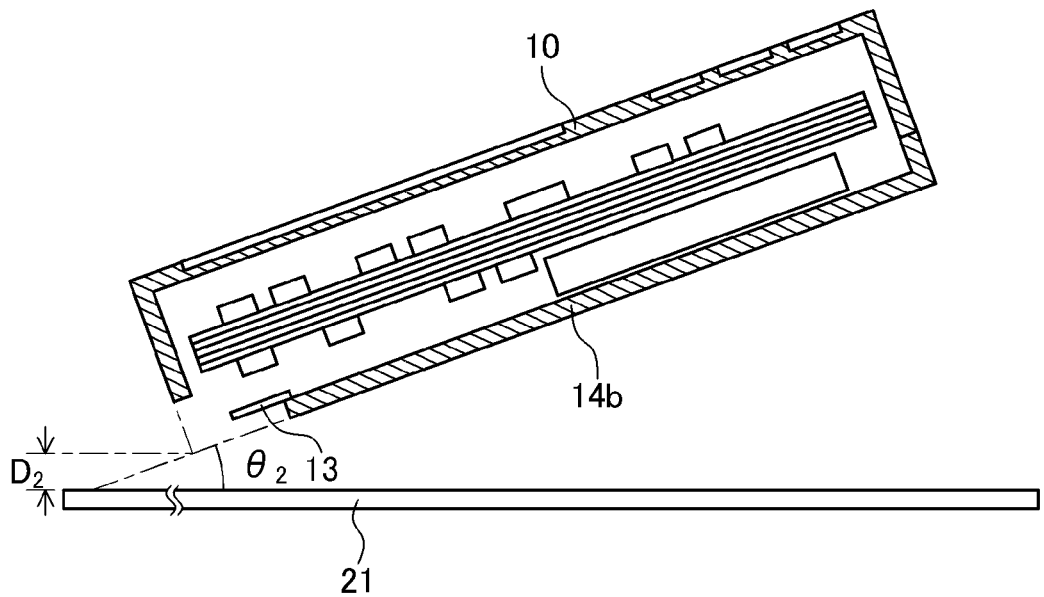
FIG. 15A is a schematic illustration of the angle that was employed in the seventh simulation.

FIG. 15A is a schematic illustration of the angle $\theta_2$ that was employed in the seventh simulation. The cross-sectional view of the mobile phone 10 shown in FIG. 15A is obtained by tilting the cross-sectional view shown in FIG. 14B. As will be understood by comparing FIG. 15A with FIG. 11A, the seventh simulation was same as the fourth simulation except that the mobile phone 10 of FIGS. 14A and 14B is used. In the seventh simulation, this angle $\theta_2$ was employed as variable parameter and the tendency of change of the coupling efficiency relative to the change in the angle $\theta_2$ was observed.

The object of the fourth simulation was to demonstrate the effect of using a conductive plate 14b that are bent along the edges thereof. In this simulation, a width of $W_B$=0 mm and that of $W_B$=3 mm were used for the bent part. In short, a conductive plate of $W_B$=0 mm is same as the conductive plate 14a of the first embodiment. For the purpose of comparison, an instance where the conductive plate 14b was removed (the cabinet 14 of the mobile phone 10 including the part corresponding to the conductive plate 14b was made of a non-conductive material) was also observed in the simulation.

Table 7 shows the specific values of the parameters of the seventh simulation. In this simulation, the position of the antenna section 13 relative to the conductive plate 14b was so selected as to make the central point of the aperture OP agree with the central point of the inner periphery of the antenna pattern 31 in plan view. The antenna section 13 was arranged at the same position also in the instance where the conductive plate 14b was removed. The position of the mobile phone 10 relative to the proximity type antenna 21 was so selected as to make the central point of the proximity type antenna 21 agree with the central point of the inner periphery of the antenna pattern 31 in plan view and the minimum distance $D_2$ between the proximity type antenna 21 and the mobile phone 10 (see FIG. 15A) show a constant value.

TABLE 7

| | θ₂ ° | $W_B$ mm | $L_{CO}$ mm | $L_{CP}$ mm | $S_{OP}$ mm² | $L_{SL}$ mm | $L_{OX}$ mm | $L_{OY}$ mm | $L_{IX}$ mm | $L_{IY}$ mm |
|---|---|---|---|---|---|---|---|---|---|---|
| Instance where conductive plate 14b was removed | 0<br>30<br>45<br>60<br>90 | | | — | | | 6 | 6 | 2.6 | 2.6 |
| Instance where conductive plate 14b was used | 0<br>30<br>45<br>60<br>90 | 0 | 40 | 55 | 16 | 10 | | | | |
| Instance where conductive plate 14b was used | 0<br>30<br>45<br>60<br>90 | 3 | | | | 27.5 | | | | |

Figure 15B:
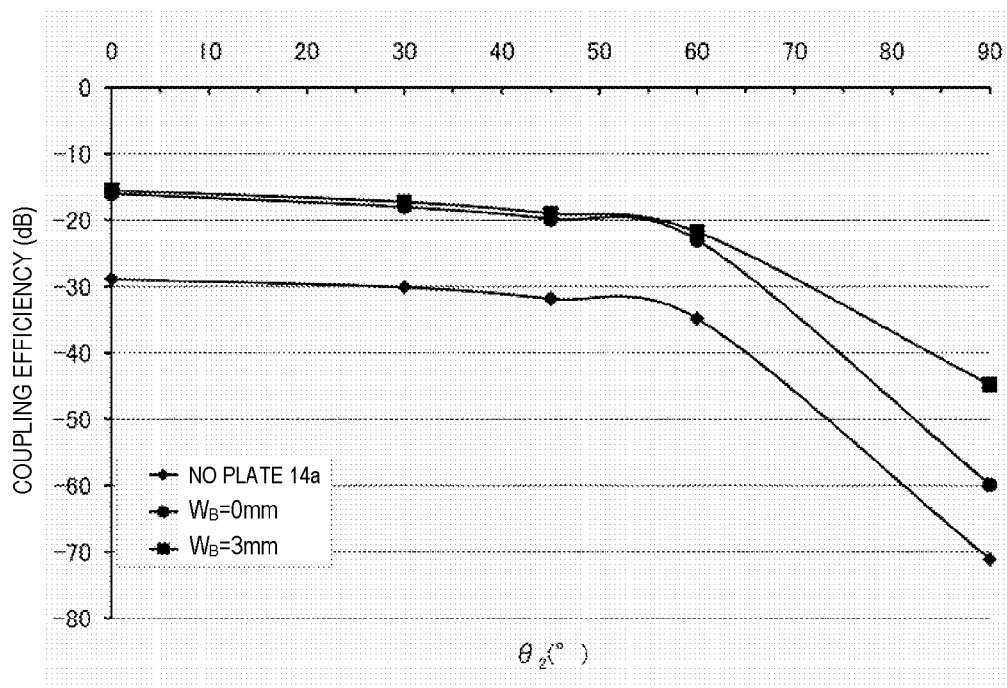
FIG. 15B schematically illustrates the results of the seventh simulation.

FIG. 15B schematically illustrates the results of the seventh simulation. In FIG. 15B, the horizontal axis indicates angle $\theta_2$ (°) and the vertical axis indicates the coupling efficiency (dB). By seeing FIG. 15B, it will be understood that the coupling efficiency fell only to a small extent relative to the increase of the angle $\theta_2$ when the width $W_B$ of the bent part was 3 mm and particularly when the angle $\theta_2$ was not less than 60° if compared with other instances. This fact indicates that the use of a conductive plate 14b having bent edges broadens the directivity of coupling characteristics.

As described above, a short distance communication system according to this embodiment can broaden the directivity of coupling characteristics because a mobile phone 10 having a conductive plate 14b that is bent along the edges thereof is employed.

Figure 16A:
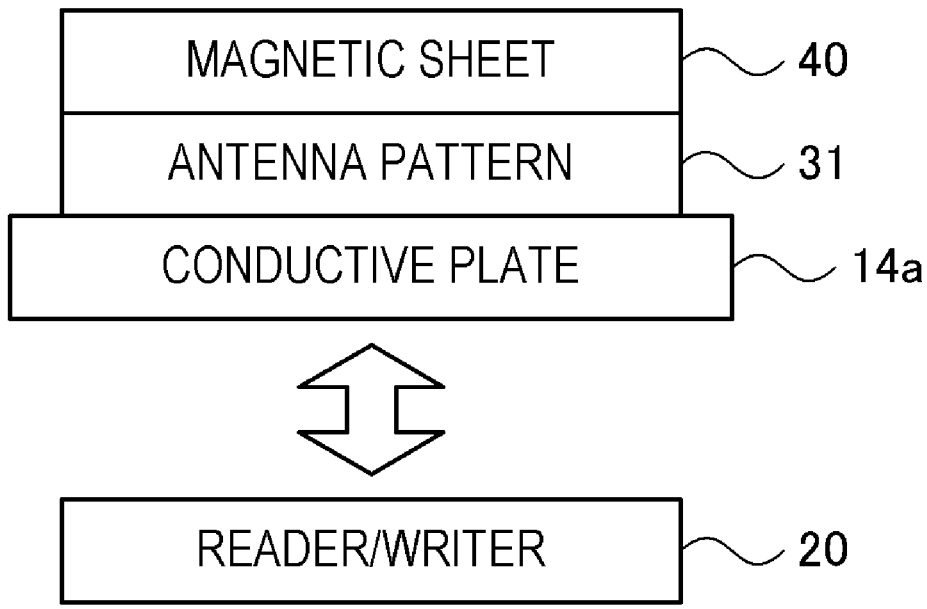
FIG. 16A is a schematic illustration of the system configuration of the short distance communication system according to the third embodiment of the present invention.

FIG. 16A is a schematic illustration of the system configuration of the short distance communication system according to the third embodiment of the present invention. The short distance communication system according to this embodiment differs from the short distance communication system 1 of the first embodiment in that it employs a magnetic sheet 40. Otherwise, this embodiment is same as the first embodiment. Now, this embodiment will be described below in detail with stress put on the difference between this embodiment and the first embodiment. Throughout the following description and the drawings referred to in the following description, the components similar to those of the first embodiment are denoted respectively by the same reference symbols.

As shown in FIG. 16A, the magnetic sheet 40 is arranged at the side opposite to the conductive plate 14a relative to the antenna pattern 31 so that the antenna pattern 31 is interposed between them. The magnetic sheet 40 is a magnetic member, which is a sheet-shaped member made of a magnetic substance such as iron oxide, chromium oxide, cobalt, ferrite or the like and applied onto the surface of the antenna pattern 31 by means of insulating glue (not shown). The magnetic sheet 40 has a size substantially same as or slightly larger than the antenna pattern 31 and smaller than the conductive plate 14a.

With the arrangement shown in FIG. 16A, the part of the magnetic field generated from the conductive plate 14a in the direction of the antenna pattern 31 is confined to the direction of the antenna pattern 31 by the magnetic sheet 40 after passing the antenna pattern 31. Then, as a result, the coupling efficiency is improved.

Table 8 shows the specific values of the parameters of the short distance communication system 1 used in a simulation for demonstrating the effect of the magnetic sheet 40. The magnetic sheet 40 has a size of 7 mm×7 mm that is same as the size of the substrate 30 of the antenna section 13. Table 9 shows the result of a simulation of coupling efficiency (dB) of a short distance communication system using the magnetic sheet 40 and that of a short distance communication system same as the former system except that no magnetic sheet 40 was used. As apparent from Table 9, the coupling efficiency (dB) was improved by using the magnetic sheet 40.

TABLE 8

| $L_{CO}$ mm | $L_{CP}$ mm | $S_{OP}$ mm² | $W_{SL}$ mm | $L_{SL}$ mm | $L_{OX}$ mm | $L_{OY}$ mm | $L_{IX}$ mm | $L_{IY}$ mm |
|---|---|---|---|---|---|---|---|---|
| 40 | 55 | 4 × 4 | 0.2 | 10 | 6 | 6 | 2.6 | 2.6 |

TABLE 9

| | Coupling efficiency |
|---|---|
| Instance where magnetic sheet 40 was employed | −15.00 dB |
| Instance where no magnetic sheet 40 was employed | −16.11 dB |

Figure 16B:
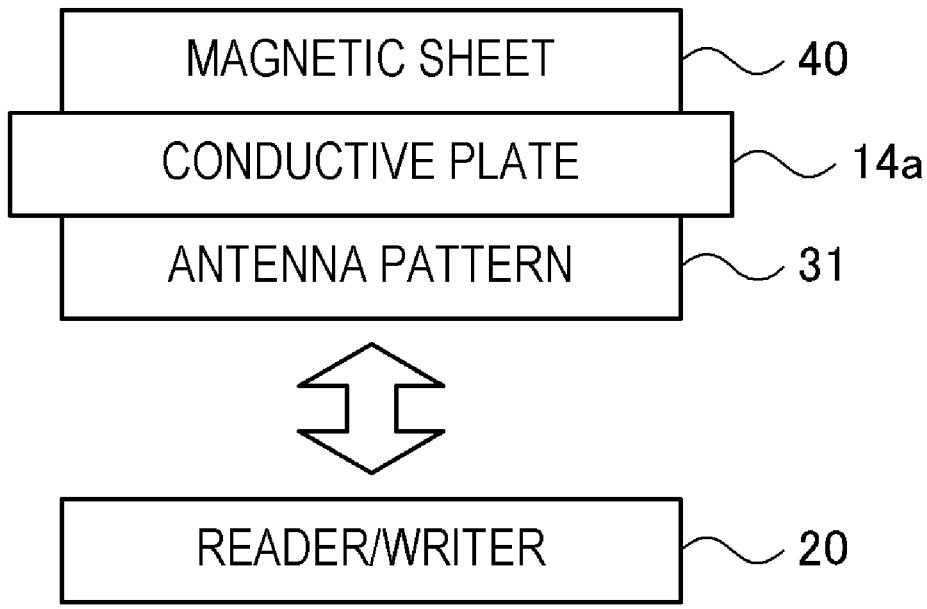
FIG. 16B is a schematic illustration of the system configuration of the short distance communication system according to the modification of the third embodiment of the present invention.

Note that the antenna pattern 31 may be arranged outside the cabinet 14 of the mobile phone 10, that is, at the side of the reader/writer 20 of the conductive plate 14a as described in the first embodiment. FIG. 16B schematically illustrates such an arrangement of the magnetic sheet 40. As shown in FIG. 16B, the magnetic sheet 40 is arranged at the side opposite to the antenna pattern 31 relative to the conductive plate 14a so that the conductive plate 14a is interposed between them in this instance. Then, the magnetic sheet 40 is applied to the surface of the conductive plate 14a by means of insulating glue (not shown).

With the arrangement of FIG. 16B, part of the magnetic field generated from the conductive plate 14a that is generated in the direction opposite to the antenna pattern 31 is confined to the direction of the antenna pattern 31 by the magnetic sheet 40. Then, as a result, the coupling efficiency is improved.

Table 10 shows the results of a simulation conducted for coupling efficiency (dB) in the case of FIG. 16B, where the same arrangement was used for two instances except the magnetic sheet 40 was employed in one of the instances, whereas no magnetic sheet 40 was employed in the other instance. The parameters same as those listed in Table 8 were used in this simulation. As apparent from Table 10, the coupling efficiency (dB) was improved by using the magnetic sheet 40 also in the simulation of FIG. 16B.

TABLE 10

|  | Coupling efficiency |
|---|---|
| Instance where magnetic sheet 40 was employed | −15.12 dB |
| Instance where no magnetic sheet 40 was employed | −16.00 dB |

As described above, a short distance communication system of this embodiment employs the magnetic sheet 40 so that it can improve the coupling efficiency (dB) if compared with an arrangement of not using the magnetic sheet 40.

Figure 17A:
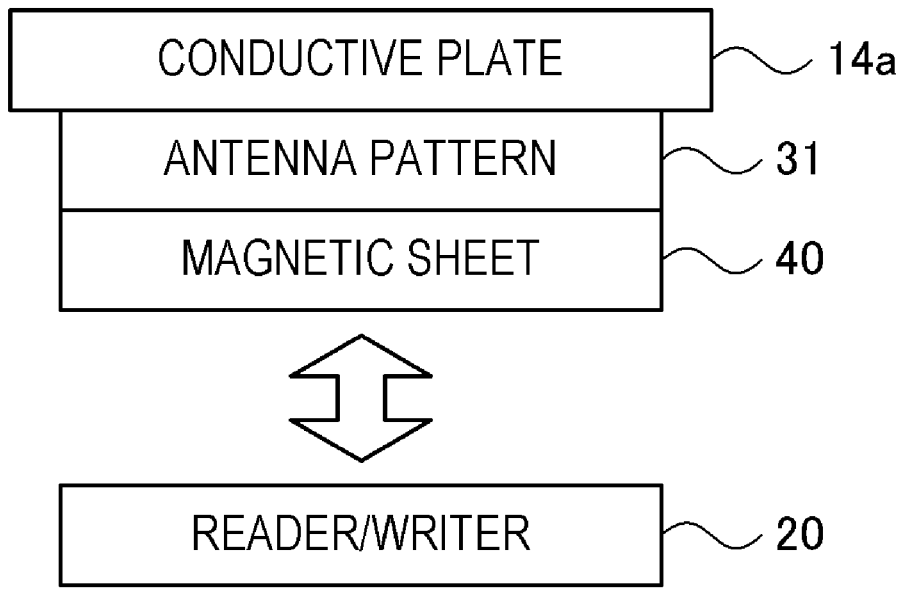
FIGS. 17A and 17B are schematic illustrations of the system configuration of the short distance communication system according to the modification of the third embodiment of the present invention.
Figure 17B:
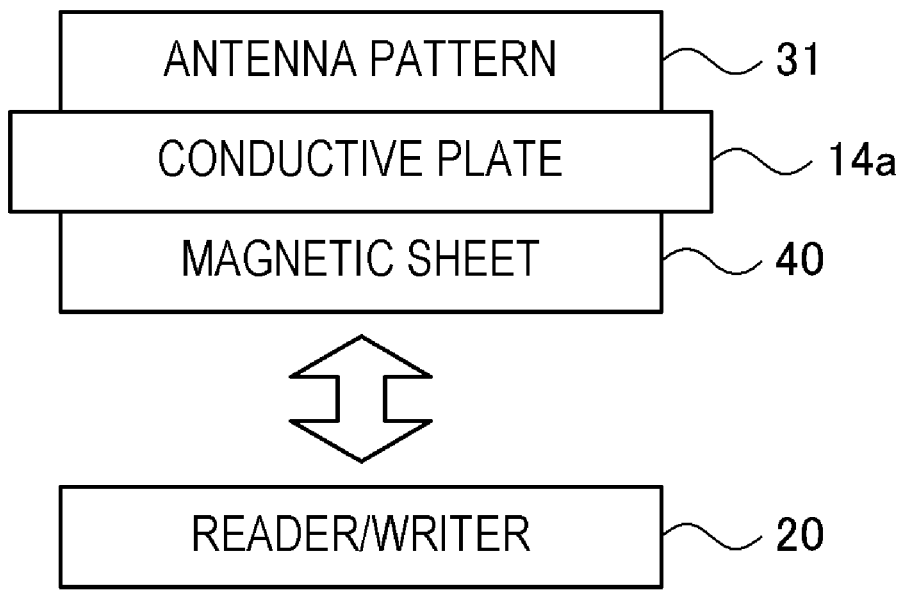

While the magnetic sheet 40 is arranged at a position remotest from the reader/writer 20 in the above-described embodiment, it may alternatively be arranged at a position closest to the reader/writer 20. FIGS. 17A and 17B schematically illustrate specific examples of such an arrangement. FIG. 17A shows an instance where the antenna pattern 31 is arranged at the side of the reader/writer 20 as viewed from the conductive plate 14a. With this arrangement, part of the magnetic field generated from the conductive plate 14a in the direction of the antenna pattern 31 is confined to the direction of the antenna pattern 31 by the magnetic sheet 40 after passing the antenna pattern 31 as in the case of FIG. 16A. Then, as a result, the coupling efficiency is improved. FIG. 17B shows an instance where the conductive plate 14a is arranged at the side of the reader/writer 20 as viewed from the antenna pattern 31. With this arrangement, part of the magnetic field generated from the conductive plate 14a in the direction opposite to the antenna pattern 31 is confined to the direction of the antenna pattern 31 by the magnetic sheet 40 as in the case of FIG. 16B. Then, as a result, the coupling efficiency is improved.

While the first embodiment and the second embodiment of the present invention are described above as preferred embodiments, the present invention is by no means limited thereto. It may needless to say that the present invention can be embodied in various different ways without departing from the spirit and scope of the present invention.

For example, while the aperture OP of each of the above-described embodiments is described as rectangular, the profile of the aperture OP is by no means limited to rectangle. For instance, a circular or elliptic aperture OP may alternatively be used.

Figure 18:
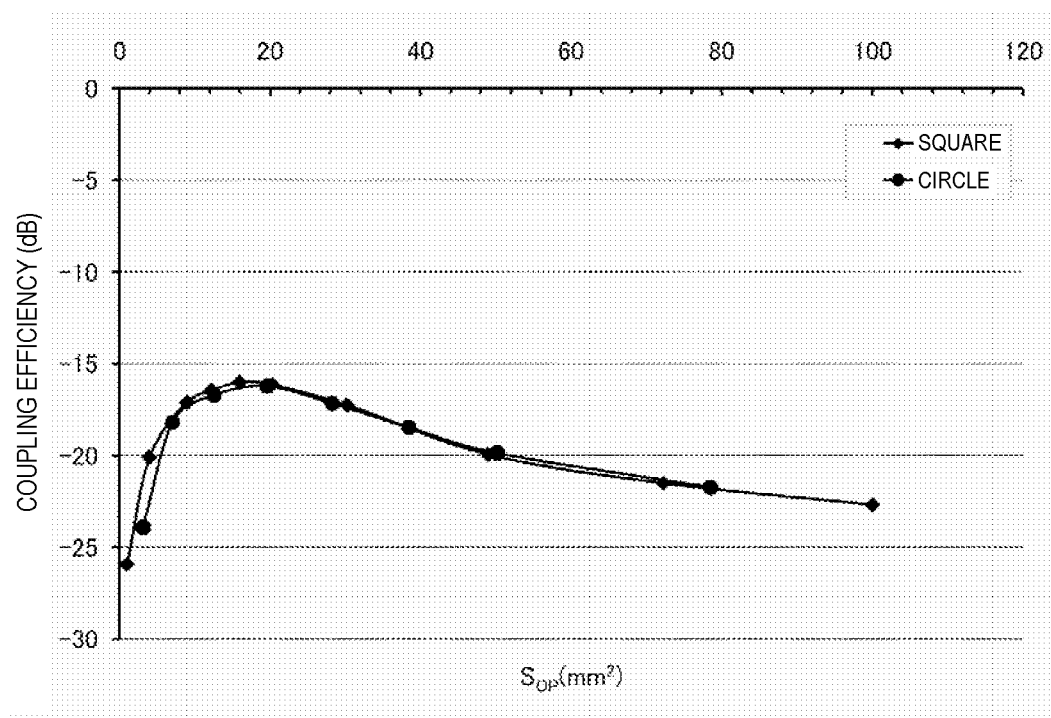
FIG. 18 illustrates the results of a simulation where a square aperture and a circular aperture were employed and the tendency of change of the coupling efficiency relative to the change in the area of the aperture was observed.

FIG. 18 illustrates the results of a simulation where a square aperture OP and a circular aperture OP were employed and the tendency of change of the coupling efficiency relative to the change in the area $S_{OP}$ of the aperture was observed. As apparent from FIG. 18, the change in the coupling efficiency shows a substantially same tendency regardless of the profile of the aperture OP so that it is safe to say that the influence of the profile of the aperture OP on the coupling efficiency is limited and small.

Figure 19A:
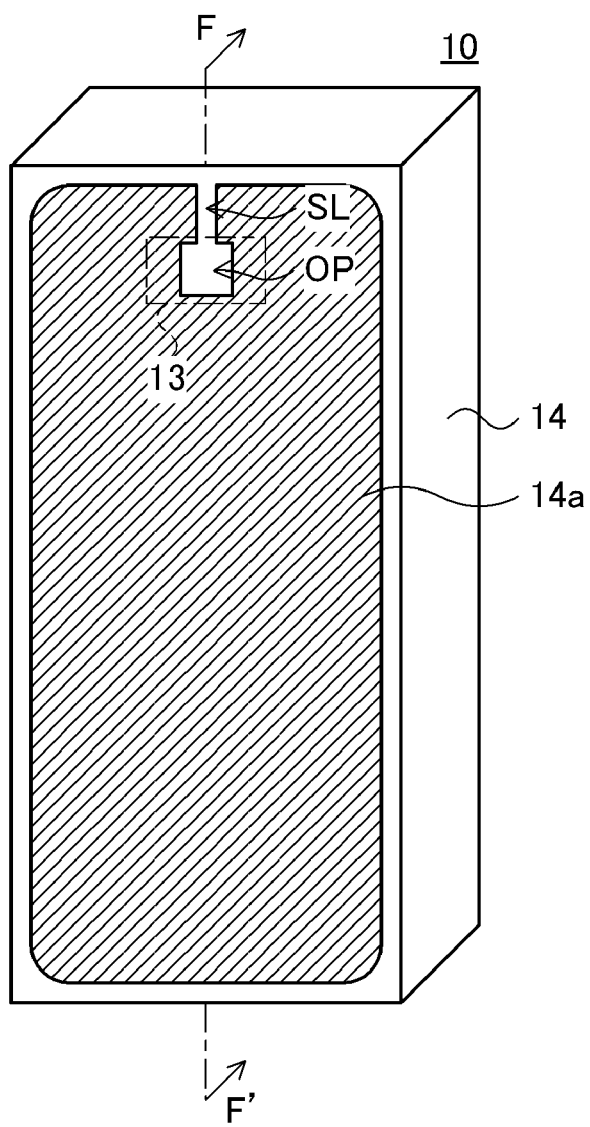
FIG. 19A is a schematic perspective view of a modified mobile phone obtained by modifying the mobile phone shown in the first embodiment.
Figure 19B:
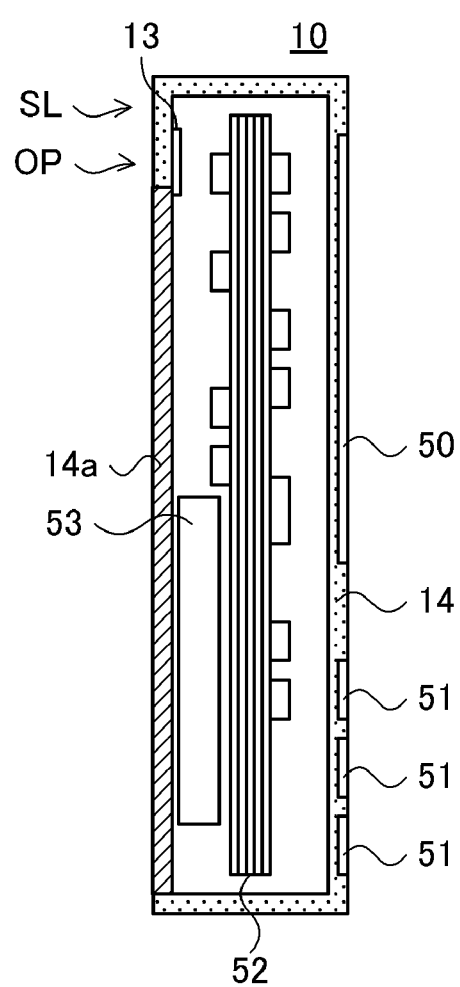
FIG. 19B is a schematic cross-sectional view taken along line F-F' in FIG. 19A.

FIG. 19A is a schematic perspective view of a modified mobile phone 10 obtained by modifying the mobile phone 10 shown in the first embodiment. FIG. 19B is a schematic cross-sectional view taken along line F-F' in FIG. 19A. In the case of this modified mobile phone 10, the cabinet 14 is an insulating member typically made of plastic and the conductive plate 14a is formed by a metal plate embedded into the rear surface side of the cabinet 14. Such an arrangement can also be used for the conductive plate 14a.

Figure 20A:
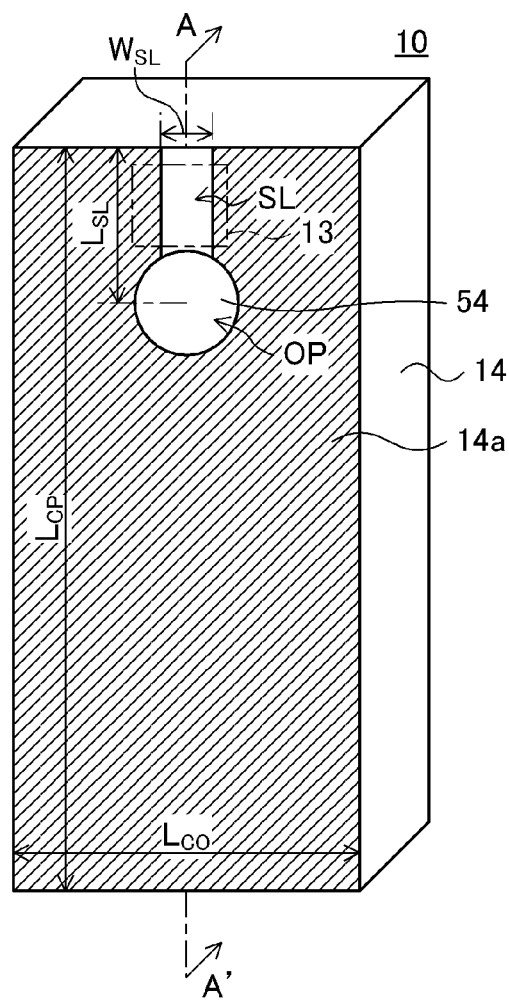
FIG. 20A is a schematic perspective view of a mobile phone to be used in a short distance communication system according to the third embodiment of the present invention.
Figure 20B:
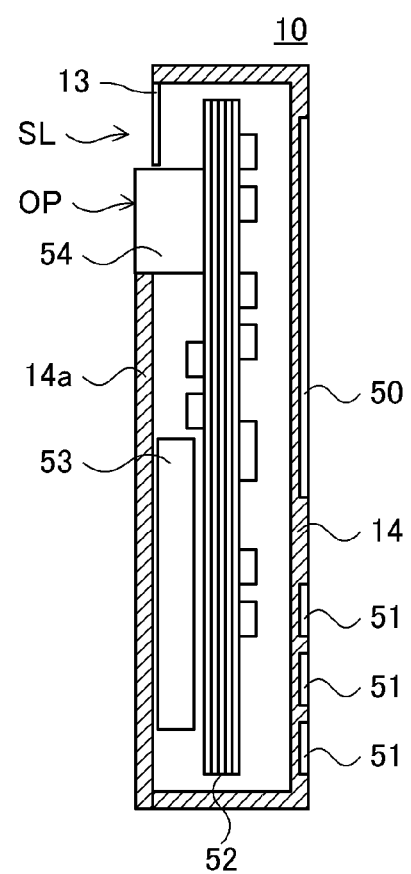
FIG. 20B is a cross-sectional view taken along line A-A' in FIG. 20A.
Figure 21:
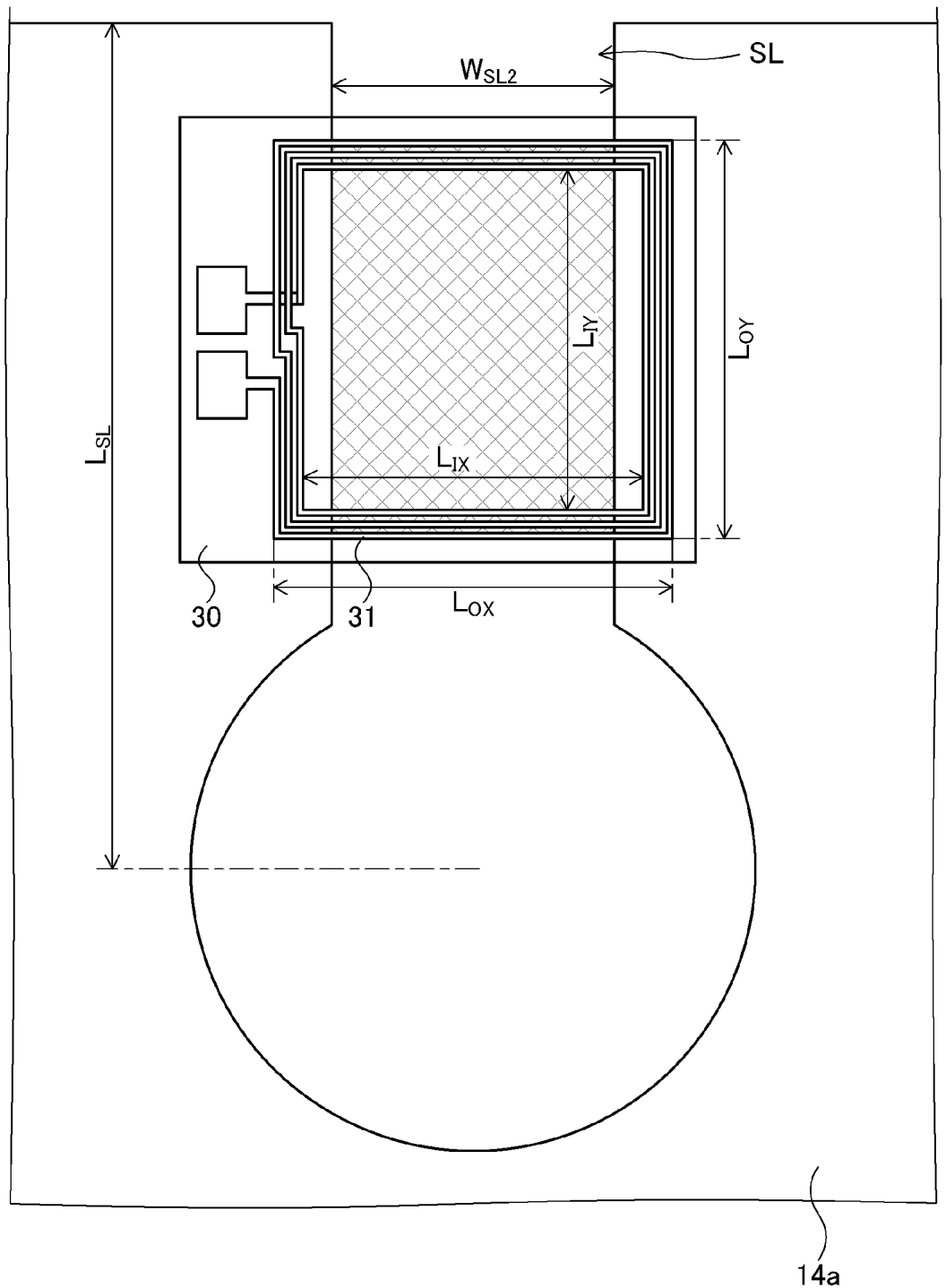
FIG. 21 is an enlarged schematic view of part of the mobile phone of FIG. 20A showing a slit and an aperture and the vicinity thereof.

FIG. 20A is a schematic perspective view of a mobile phone 10 to be used in a short distance communication system according to the third embodiment of the present invention. FIG. 20B is a cross-sectional view taken along line A-A' in FIG. 20A. FIG. 21 is an enlarged schematic view of part of the mobile phone 10 of FIG. 20A showing a slit SL and an aperture OP and the vicinity thereof, which will be described in greater detail hereinafter. The conductive plate 14a is hatched in FIG. 20A as in FIG. 20B for easy understanding, although FIG. 20A is not a cross-sectional view. The above description also applies to views that will be described hereinafter.

The short distance communication system according to this embodiment is same as the one according to the first embodiment except that only the mobile phone 10 thereof differs from that of the first embodiment. As shown in FIGS. 20A and 20B, the mobile phone 10 of this embodiment is substantially a rectangular parallelepiped and an LCD 50 and a keypad 51 are arranged on one of the six surfaces thereof. A multilayer substrate 52, a battery 53 and a camera 54 are arranged in the inside of the mobile phone 10 along with the antenna section 13 and the IC chip 12 (not shown in FIGS. 20A and 20B). The multilayer substrate 52 operates as the motherboard of the mobile phone 10 and various electronic circuits including a circuit for communications and a ground layer are formed on the surface and in the inside thereof. The lens of the camera 54 is exposed at the rear surface of the cabinet 14. Note that the components other than the antenna section 13 and the IC chip 12 correspond to the main body section 15 shown in FIG. 1.

The cabinet 14 is made of an electroconductive metal material and the conductive plate 14a is formed by utilizing the back surface of the cabinet 14 (the surface opposite to the surface where the LCD 50 and the keypad 51 are arranged out of the six surfaces). The conductive plate 14a has an aperture OP and a slit SL extending from the aperture OP to an end of the conductive plate 14a.

In the following description, the length and the width of the slit SL are respectively expressed as $L_{SL}$ and $W_{SL}$ and the area of the aperture OP is expressed as $S_{OP}$. The length of the conductive plate 14a in the extending direction of the slit SL and the length of the conductive plate 14a in the direction orthogonal to the extending direction of the slit SL are respectively expressed as $L_{CP}$ and $L_{CO}$. Note that the length $L_{SL}$ of the slit SL is defined as the length from the central point of the aperture OP to the end of the conductive plate 14a as shown in FIG. 20A.

As shown in FIGS. 20A and 20B, the lens of the camera 54 is arranged in the aperture OP. Therefore, the profile and the area $S_{OP}$ of the aperture OP is so determined as to allow the lens of the camera 54 to be arranged in the aperture OP. On the other hand, the width $W_{SL}$ of the slit SL is optimized by taking the relationship with the size of the antenna pattern 31 into consideration as will be described in greater detail hereinafter.

The inside of the slit SL may be void as shown in FIGS. 20A and 20B. Alternatively, they may be filled with a non-conductive substance such as insulating resin. When the inside is filled with a non-conductive substance, the cabinet 14 can be strengthened so much. While the lens of the camera 54 and the aperture OP are of the same size in FIGS. 20A and 20B, there may be a gap between the lens and the conductive plate 14a. If so, the gap may also be filled with a non-conductive substance such as insulating resin.

FIGS. 20A and 20B and FIG. 21 also show the position where the antenna section 13 is arranged. As shown particularly in FIG. 21, the antenna section 13 is arranged at a position where the antenna pattern 31 overlaps at least part of the slit SL in plan view.

With the above-described positional arrangement, the coupling characteristics between the mobile phone 10 that is a non-contact type IC card and the reader/writer 20 are not degraded when the conductive plate 14a, which is a conductive member, is placed in position. Rather, the coupling characteristics are improved if compared with an instance where no conductive plate 14a is provided. This will be described more specifically below.

Figure 22A:
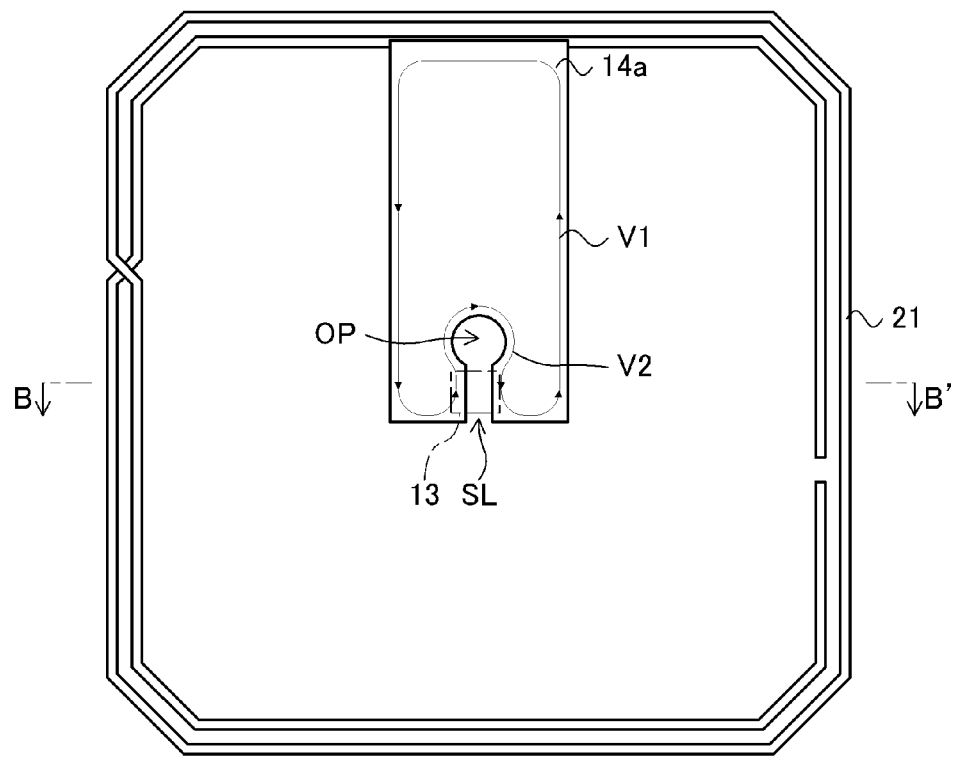
FIG. 22A is an illustration of a spiral coil that forms the proximity type antenna according to the third embodiment of the present invention and the conductive plate according to the third embodiment of the present invention.

FIG. 22A is an illustration of a spiral coil that forms the proximity type antenna 21 and the conductive plate 14a. The arrowed lines in FIG. 22A indicate the eddy currents that flow in the conductive plate 14a. As indicated by the arrowed lines, as the conductive plate 14a is brought close to the proximity type antenna 21, eddy currents V1 and V2 flow in the conductive plate 14a. The eddy current V1 is an electric current that flows along the edges of the conductive plate 14a, whereas the eddy current V2 is an electric current that flows around the aperture OP from the both sides of the slit SL. Note that V1 and V2 do not represent any current values and are merely identification symbols for identifying the electric currents.

Figure 22B:
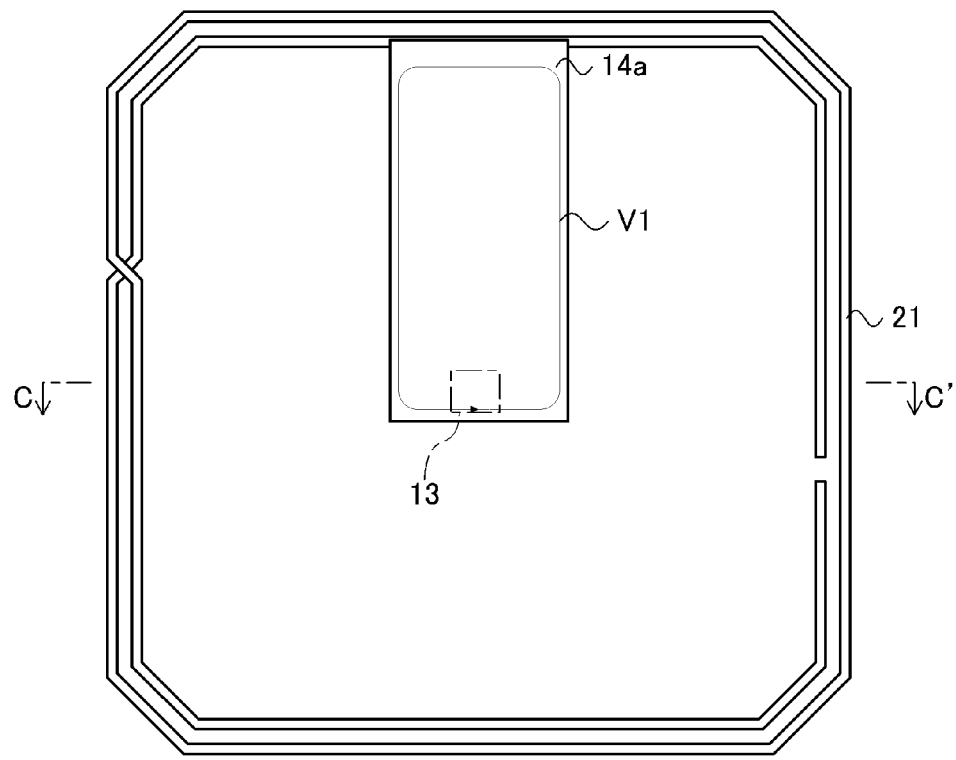
FIG. 22B shows an instance where a conductive plate having neither an aperture OP nor a slit SL is employed.

FIG. 22B shows an instance where a conductive plate 14a having neither an aperture OP nor a slit SL is employed as a comparative example. As will be understood by comparing the comparative example and FIG. 22A, the eddy current V2 is an electric current that flows in the conductive plate 14a only when an aperture OP and a slit SL are provided. In other words, because a slit SL is there, the eddy current V1 cannot make a full turn along the edges of the conductive plate 14a and therefore makes a detour to bypass the slit SL. Then, as a result, the eddy current V2 is generated so as to flow in the direction opposite to the flowing direction of the eddy current V1.

Since the eddy currents that flow in the conductive plate 14a are generated by the magnetic field generated from the proximity type antenna 21, the eddy current V1 flows in the direction of generating a magnetic field that weakens the former magnetic field. To the contrary, the eddy current V2 flows in the direction opposite to the flowing direction of the eddy current V1 and hence it generates a magnetic field that intensifies the magnetic field generated from the proximity type antenna 21. Therefore, the magnetic field is intensified as a result of that the eddy current V2 flows. The net results will be that the coupling characteristics are improved if compared with the instance where the conductive plate 14a has neither an aperture OP nor a slit SL and also with the instance where no conductive plate 14a is provided.

Figure 23A:
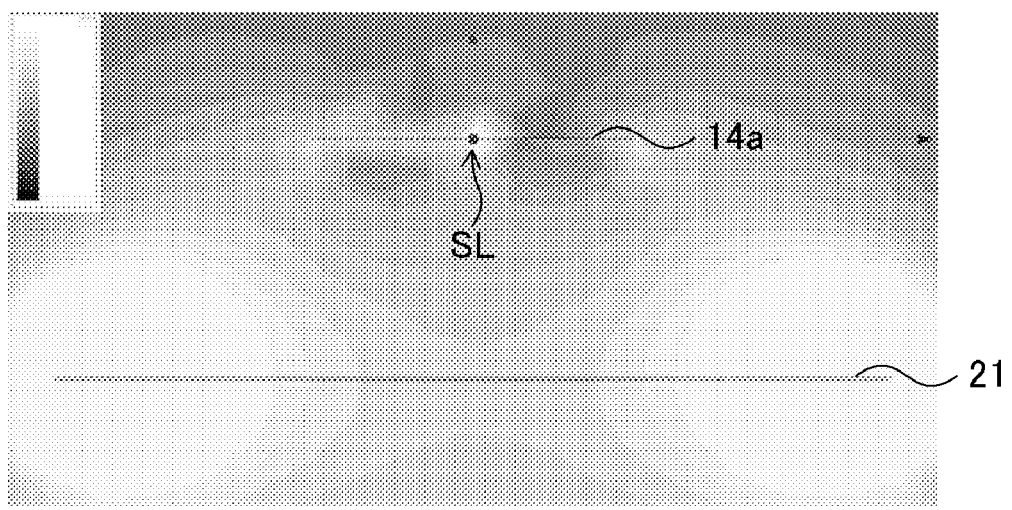
FIGS. 23A and 23B show the results obtained by simulating the magnetic field near the proximity type antenna and the conductive plate according to the third embodiment of the present invention.
Figure 23B:
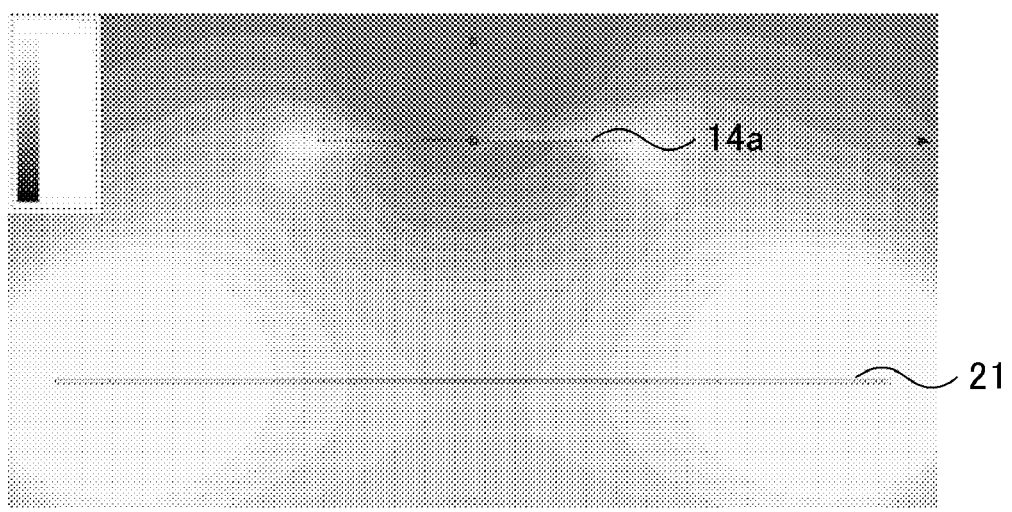

FIGS. 23A and 23B show the results obtained by simulating the magnetic field near the proximity type antenna 21 and the conductive plate 14a. FIG. 23A shows the magnetic field along the cross section taken along line B-B' in FIG. 22A and FIG. 23B shows the magnetic field along the cross section taken along line C-C' in FIG. 22B.

In FIGS. 23A and 23B, the light-colored areas are areas where the magnetic field is strong. As will be understood by seeing these views, a strong magnetic field is generated around the slit SL but no such magnetic field is found when neither an aperture OP nor a slit SL is provided. This is generated by the above-described eddy current V2 and the coupling characteristics are improved when a conductive plate 14a having an aperture OP and a slit SL is employed because such a magnetic field is generated.

Now, the results of a simulation of the coupling efficiency observed between the mobile phone 10 that is a non-contact type IC card and the reader/writer 20 will be described below. Table 11 shows the specific values of parameters used for the conductive plates 14a of three patterns (a) through (c) in the simulation. In the table, the symbols (mm etc.) shown below the respective parameters represent the units of the parameters. This description also applies to all the tables shown hereinafter. In short, the pattern (a) out of the three patterns shows an instance where no conductive plate 14a was employed. The pattern (b) shows an instance where the aperture OP and the slit SL were removed from the conductive plate 14a.

TABLE 11

|     | $L_{CP}$ mm | $L_{CO}$ mm | $L_{SL}$ mm | $W_{SL}$ mm | $S_{OP}$ mm$^2$ | $L_{OX}$ mm | $L_{OY}$ mm | $L_{IX}$ mm | $L_{IY}$ mm |
|-----|-----|-----|-----|-----|-----|-----|-----|-----|-----|
| (a) | 0   | 0   | —   | —   | —   | 6   | 6   | 2.6 | 2.6 |
| (b) | 110 | 40  | 0   | 0   | 0   |     |     |     |     |
| (c) |     |     | 12  | 4   | 0   |     |     |     |     |

In this simulation and in each of the simulations that will be described hereinafter, the proximity type antenna 21 had a size of 110 mm square and the distance between the proximity type antenna 21 and the antenna section 13 was made to be equal to 30 mm, while the thickness of the conductive plate 14a was made to be equal to 35 μm unless noted otherwise. The positional arrangement of the conductive plate 14a was so determined as to make the central point of the proximity type antenna 21 and that of the inner periphery of the antenna pattern 31 agree with each other in plan view.

Table 12 shows the results of the simulation for each of the patterns illustrated in Table 11. As will be understood by seeing the table, the coupling efficiency was remarkably high for the pattern (c) having a slit SL if compared with the other patterns. Thus, it will be safe to say that the coupling characteristics between the mobile phone 10 that is a non-contact type IC card and the reader/writer 20 were improved in this instance.

TABLE 12

|     | Coupling effeciency |
|-----|-----|
| (a) | −28.86 dB |
| (b) | −48.80 dB |
| (c) | −16.93 dB |

As described above, the coupling characteristics between the mobile phone 10 that is a non-contact type IC card and the reader/writer 20 are improved by providing the conductive plate 14a with an aperture OP and a slit SL. The extent of improvement is influenced by the width $W_{SL}$ of the slit SL, the material of the conductive plate 14a and so on. Therefore, their optimal values will be described below by referring to the results of simulations.

FIGS. 24A through 24H illustrate the conductive plates 14a and the antenna patterns 31 used in the simulation for obtaining optimal values for the width $W_{SL}$ of the slit SL. Note that only the slit SL and the aperture OP and the vicinity thereof are shown for each of the conductive plates 14a and only the outer periphery and the inner periphery are schematically shown for each of the antenna patterns 31. Also note that the apertures OP have a square profile. As shown in the views, the width $W_{SL}$ of the slit SL was employed as variable parameter and the tendency of change of the coupling efficiency relative to the change in the width $W_{SL}$ of the slit SL was observed in this simulation.

Table 13 shows the specific values of $W_{SL}$ and other parameters used in this simulation. In the table, (a) through (h) correspond respectively to FIGS. 24A through 24H.

TABLE 13

| | $L_{CP}$ mm | $L_{CO}$ mm | $L_{SL}$ mm | $W_{SL}$ mm | $S_{OP}$ mm² | $L_{OX}$ mm | $L_{OY}$ mm | $L_{IX}$ mm | $L_{IY}$ mm |
|---|---|---|---|---|---|---|---|---|---|
| (a) | 55 | 40 | 15 | 0.2 | 10 × 10 | 6 | 6 | 2.6 | 2.6 |
| (b) | | | | 1 | | | | | |
| (c) | | | | 2 | | | | | |
| (d) | | | | 3 | | | | | |

TABLE 13-continued

| | $L_{CP}$ mm | $L_{CO}$ mm | $L_{SL}$ mm | $W_{SL}$ mm | $S_{OP}$ mm² | $L_{OX}$ mm | $L_{OY}$ mm | $L_{IX}$ mm | $L_{IY}$ mm |
|---|---|---|---|---|---|---|---|---|---|
| (e) | | | | 4 | | | | | |
| (f) | | | | 5 | | | | | |
| (g) | | | | 6 | | | | | |
| (h) | | | | 8 | | | | | |

Figure 25:
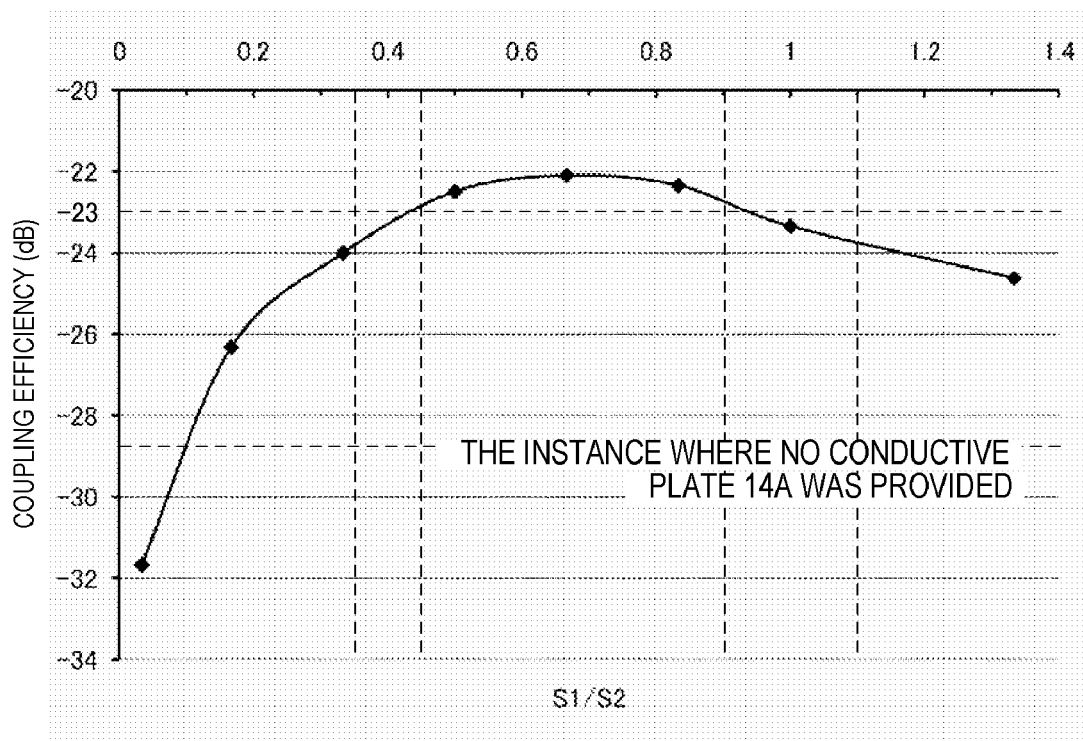
FIG. 25 summarily illustrates the results of the simulation for obtaining optimal values for the width of the slit according to the third embodiment of the present invention.

FIG. 25 summarily illustrates the results of the simulation. In FIG. 25, the horizontal axis indicates parameter S1/S2 and the vertical axis indicates the coupling efficiency (dB). The parameter S1 was the area of the part of the slit SL that overlaps the antenna pattern 31 in plan view (=$W_{SL} \times L_{OY}$, the area of the patched part in FIG. 21) and the parameter S2 was the outer profile area $S_{OUTER}$ (=$L_{OX} \times L_{OY}$) of the antenna pattern 31.

As shown in FIG. 25, the highest value of coupling efficiency was about −22 dB. The coupling efficiency is preferably not less than −24 dB that is lower than the highest value by 2 dB, more preferably not less than −23 dB that is lower than the highest value by 1 dB. By seeing FIG. 25 from this viewpoint, the coupling efficiency went above −24 dB when S1/S2 was approximately not less than 0.35 and not more than 1.1 and above −23 dB when S1/S2 was approximately not less than 0.45 and not more than 0.9. Thus, the area of the part of the slit SL that overlaps the antenna pattern 31 in plan view, or $W_{SL} \times L_{OY}$, is preferably not less than 35% and not more than 110%, more preferably not less than 45% and not more than 90%, of the outer profile area $S_{OUTER}$ of the antenna pattern 31. Considering $S_{OUTER}=L_{OX} \times L_{OY}$, the width $W_{SL}$ of the slit SL is preferably not less than 35% and not more than 110%, more preferably not less than 45% and not more than 90%, of the transversal length $L_{OX}$ of the outer periphery of the antenna pattern 31.

Differently stated, the width $W_{SL}$ of the slit SL is preferably not less than the transversal length $L_{IX}$ of the inner periphery of the antenna pattern 31 and not more than the length $L_{OX}$ of the outer periphery in the transversal direction of the slit. FIGS. 24E through 24G correspond to such an arrangement. It may be safe to assume that the magnetic field generated from the eddy current V2 is efficiently taken into the antenna pattern 31 to improve the coupling efficiency with such an arrangement.

Table 14 shows the materials of the conductive plates 14a tested in a simulation conducted to find out preferable materials for a conductive plate 14a, the specific values of the electro-conductivities $C_{14a}$ thereof and other parameters of this simulation. In this simulation, conductive plates 14a made of various different materials were employed and the tendency of change of the coupling efficiency relative to the electro-conductivities of the different materials was observed.

TABLE 14

| material | $C_{14a}$ 10⁷ S/m | $L_{CP}$ mm | $L_{CD}$ mm | $L_{SL}$ mm | $W_{SL}$ mm | $S_{OP}$ mm² | $L_{OX}$ mm | $L_{OY}$ mm | $L_{IX}$ mm | $L_{IY}$ mm |
|---|---|---|---|---|---|---|---|---|---|---|
| Cu | 5.800 | 55 | 40 | 10 | 4 | 10 × 10 | 6 | 6 | 2.6 | 2.6 |
| Al | 3.800 | | | | | | | | | |
| Mg | 2.250 | | | | | | | | | |
| Brass | 1.500 | | | | | | | | | |
| Fe | 1.030 | | | | | | | | | |
| Bronze | 1.000 | | | | | | | | | |
| Lead | 0.500 | | | | | | | | | |
| Ti | 0.182 | | | | | | | | | |
| SUS | 0.110 | | | | | | | | | |

According to the results of the simulation (not shown), the coupling efficiency was high when the electro-conductivity $C_{14a}$ was high and held stable when the electro-conductivity $C_{14a}$ was not less than 1×10⁷ S/m except the single instance where Fe (electro-conductivity $C_{14a}$=1.030×10⁷ S/m) was employed for the material of the conductive plate 14a. It was also found that the coupling efficiency was remarkably low when Fe was employed for the material of the conductive plate 14a if compared with instances where materials showing a substantially same electro-conductivity were employed. This will be thought to be due to that Fe is a ferromagnetic substance (whereas each of the other materials is either a paramagnetic substance or a diamagnetic substance). Thus, the conductive plate 14a is preferably made of a material that is paramagnetic or diamagnetic and shows an electro-conductivity $C_{14a}$ of not less than 1×10⁷ S/m.

As described above, the coupling characteristics between a mobile phone 10 that is a non-contact type IC card and a reader/writer 20 are influenced by the relationship between the width $W_{SL}$ of the slit SL and the size of the antenna pattern 31 and the material of the conductive plate 14a. Optimum coupling characteristics can be obtained by selecting specific values for them in a manner as described above.

Figure 26A:
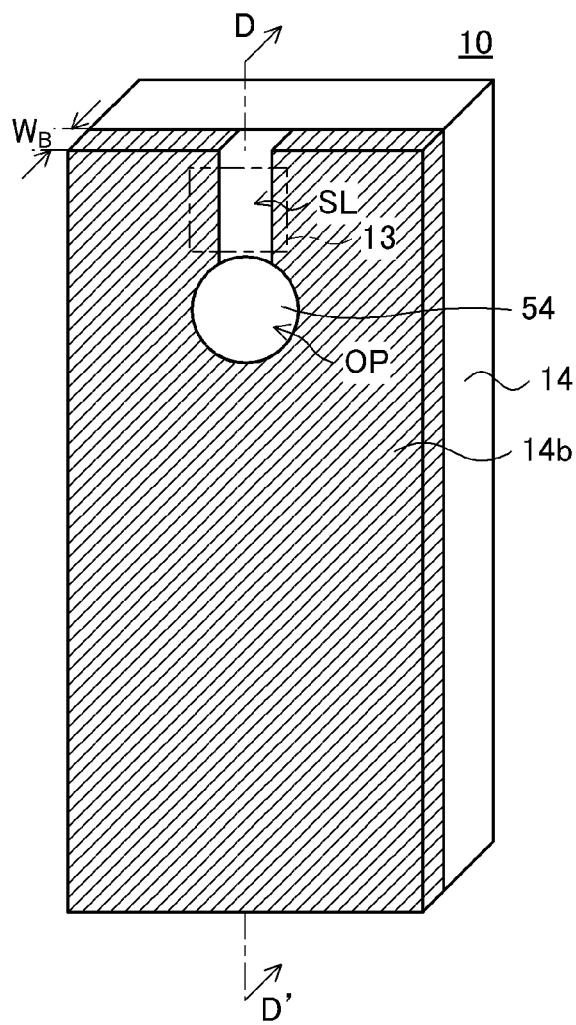
FIG. 26A is a schematic perspective view of a mobile phone to be used in a short distance communication system according to the fourth embodiment of the present invention.
Figure 26B:
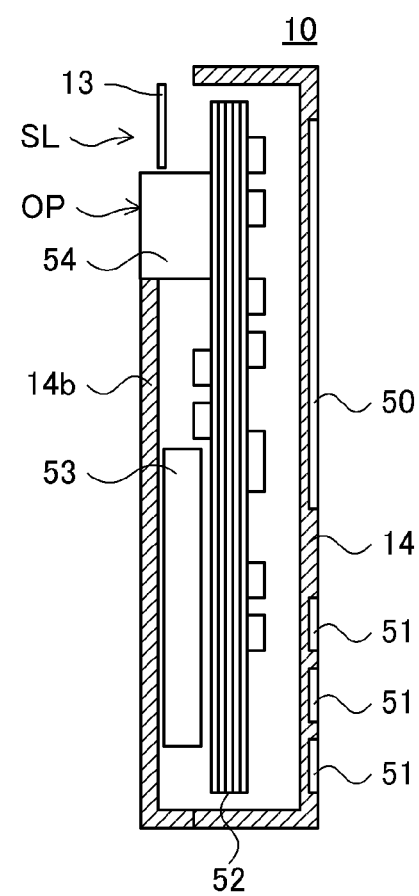
FIG. 26B is a cross-sectional view taken along line D-D' in FIG. 26A.

FIG. 26A is a schematic perspective view of a mobile phone 10 to be used in a short distance communication system according to the fourth embodiment of the present invention. FIG. 26B is a cross-sectional view taken along line D-D' in FIG. 26A. The short distance communication system according to this embodiment differs from the one according to the first embodiment only in terms of mobile phone 10. The mobile phone 10 of this embodiment differs from the mobile phone 10 of the third embodiment in that it includes conductive plate 14b instead of conductive plate 14a. Now, this embodiment will be described below in detail mainly in terms of the configuration of the mobile phone 10 with stress put on the difference between this embodiment and the third embodiment. Throughout the following description and the drawings referred to in the following description, the components similar to those of the third embodiment are denoted respectively by the same reference symbols.

As shown in FIGS. 26A and 26B, the conductive plate 14b extends not only on the rear surface of the cabinet 14 but also to the lateral surfaces of the cabinet 14 by a width $W_B$ from the rear surface. In other words, the edges of the conductive plate 14b are bent so as to move away from the reader/writer 20 (FIG. 1) by the width $W_B$ of the bent parts. The slit SL is extended to an end of the conductive plate 14b. In other words, the slit SL is also bent so as to move away from the reader/writer 20.

The use of a conductive plate 14b that are bent along the edges thereof can broaden the directivity of coupling characteristics. This will be described in greater detail hereinafter by referring to the results of simulations.

Figure 27:
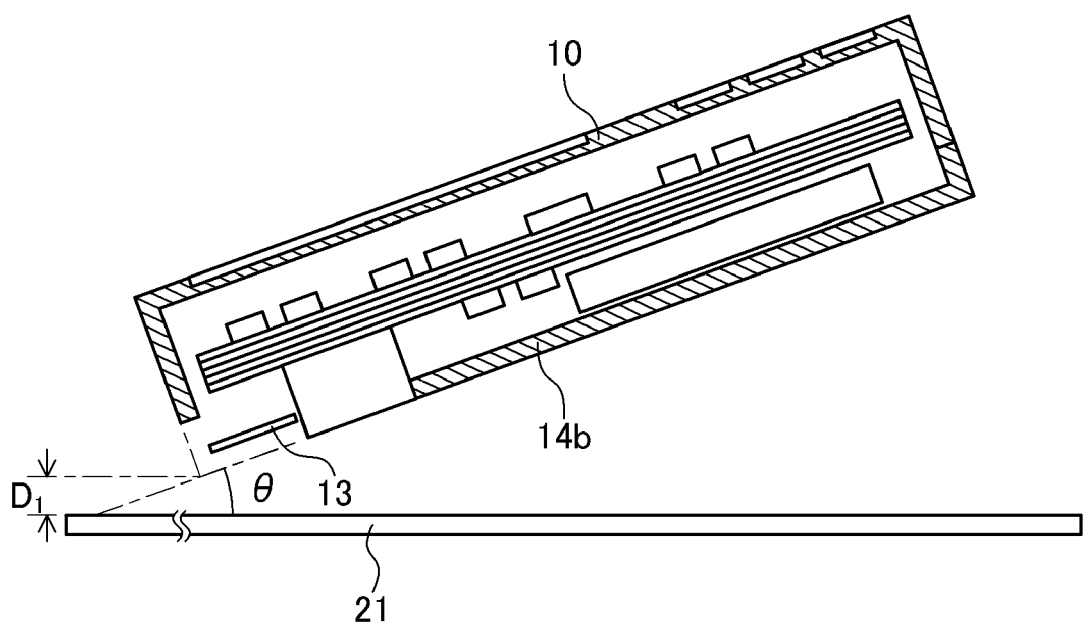
FIG. 27 is a schematic illustration of the angle that was employed in the simulation showing the expansion effect of the directivity of coupling characteristics.

FIG. 27 is a schematic illustration of the angle θ that was employed in this simulation. The cross-sectional view of the mobile phone 10 shown in FIG. 27 is obtained by tilting the cross-sectional view shown in FIG. 26B. In actual scenes where the mobile phone 10 is operated, the mobile phone 10 and the proximity type antenna 21 of the reader/writer 20 may not necessarily be in parallel with each other as shown in FIG. 27 but may be arranged to show an angle θ (≠0°). In this simulation, this angle θ was employed as variable parameter and the tendency of change of the coupling efficiency relative to the change in the angle θ was observed.

The object of this simulation was to demonstrate the effect of using a conductive plate 14b that are bent along the edges thereof. In this simulation, a width of $W_B$=0 mm and that of $W_B$=3 mm were used for the bent part. In short, a conductive plate 14b of $W_B$=0 mm is same as the conductive plate 14a of the third embodiment. For the purpose of comparison, an instance where the conductive plate 14b was removed (the cabinet 14 of the mobile phone 10 including the part corresponding to the conductive plate 14b was made of a non-conductive material) was also observed in the simulation.

Table 15 shows the specific values of the parameters of this simulation. In this simulation, the position of the antenna section 13 in the mobile phone 10 in the instance where the conductive plate 14b was provided was also used for the instance where the conductive plate 14b was removed. The position of the mobile phone 10 relative to the proximity type antenna 21 was so selected as to make the central point of the proximity type antenna 21 agree with the central point of the inner periphery of the antenna pattern 31 in plan view and the minimum distance $D_1$ between the proximity type antenna 21 and the mobile phone 10 (see FIG. 27) show a constant value.

use of a conductive plate 14b having bent edges broadens the directivity of coupling characteristics.

As described above, a short distance communication system according to this embodiment can broaden the directivity of coupling characteristics because a mobile phone 10 having a conductive plate 14b that is bent along the edges thereof is employed.

Figure 28A:
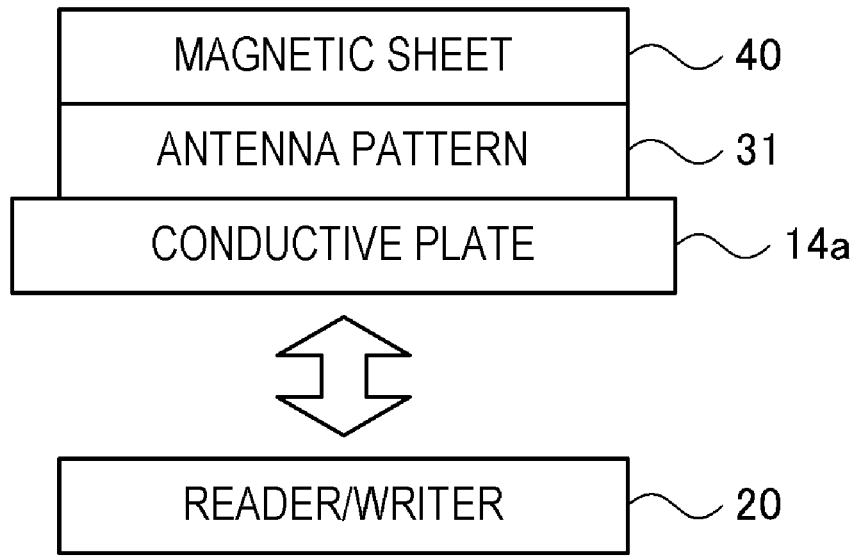
FIG. 28A is a schematic illustration of the system configuration of the short distance communication system according to the fifth embodiment of the present invention.

FIG. 28A is a schematic illustration of the system configuration of the short distance communication system according to the fifth embodiment of the present invention. The short distance communication system according to this embodiment differs from the short distance communication system 1 of the third embodiment in that it employs a magnetic sheet 40. Otherwise, this embodiment is same as the third embodiment. Now, this embodiment will be described below in detail with stress put on the difference between this embodiment and the third embodiment. Throughout the following description and the drawings referred to in the following description, the components similar to those of the third embodiment are denoted respectively by the same reference symbols.

As shown in FIG. 28A, the magnetic sheet 40 is arranged at the side opposite to the conductive plate 14a relative to the antenna pattern 31 so that the antenna pattern 31 is interposed between them. The magnetic sheet 40 is a magnetic member, which is a sheet-shaped member made of a magnetic substance such as iron oxide, chromium oxide, cobalt, ferrite or the like and applied onto the surface of the antenna pattern 31 by means of insulating glue (not shown). The magnetic sheet 40 has a size substantially same as or slightly larger than the antenna pattern 31 and smaller than the conductive plate 14a.

With the arrangement shown in FIG. 28A, the part of the magnetic field generated from the conductive plate 14a in the direction of the antenna pattern 31 is confined to the direction of the antenna pattern 31 by the magnetic sheet 40 after passing the antenna pattern 31. Then, as a result, the coupling efficiency is improved.

Table 16 shows the specific values of the parameters of the short distance communication system 1 used in a simulation for demonstrating the effect of the magnetic sheet 40. The magnetic sheet 40 has a size of 7 mm×7 mm that is same as the size of the substrate 30 of the antenna section 13. Table 17 shows the result of a simulation of coupling efficiency (dB) of

TABLE 15

| | θ ° | $W_B$ mm | $L_{CP}$ mm | $L_{CO}$ mm | $L_{SL}$ mm | $W_{SL}$ mm | $S_{OP}$ mm² | $L_{OX}$ mm | $L_{OY}$ mm | $L_{IX}$ mm | $L_{IY}$ mm |
|---|---|---|---|---|---|---|---|---|---|---|---|
| Instance where conductive plate 14b was removed | 0 30 45 60 90 | | | | — | | | 6 | 6 | 2.6 | 2.6 |
| Instance where conductive plate 14a was used | 0 30 45 60 90 | 0 | 55 | 40 | 10 | 4 | 10 × 10 | | | | |
| Instance where conductive plate 14b was used | 0 30 45 60 90 | 3 | | | | | | | | | |

According to the results of the simulation (not shown), the coupling efficiency fell only to a small extent relative to the increase of the angle θ when the width $W_B$ of the bent part was 3 mm and particularly when the angle θ was not less than 60° if compared with other instances. This fact indicates that the a short distance communication system using the magnetic sheet 40 and that of a short distance communication system same as the former system except that no magnetic sheet 40 was used. As apparent from Table 17, the coupling efficiency (dB) was improved by using the magnetic sheet 40.

TABLE 16

| $L_{CP}$ mm | $L_{CO}$ mm | $L_{SL}$ mm | $W_{SL}$ mm | $S_{OP}$ mm² | $L_{OX}$ mm | $L_{OY}$ mm | $L_{IX}$ mm | $L_{IY}$ mm |
|---|---|---|---|---|---|---|---|---|
| 55 | 40 | 10 | 4 | 10 × 10 | 6 | 6 | 2.6 | 2.6 |

TABLE 17

| | Coupling efficiency |
|---|---|
| Instance where magnetic sheet 40 was employed | −22.13 dB |
| Instance where no magnetic sheet 4- was employed | −22.16 dB |

Figure 28B:
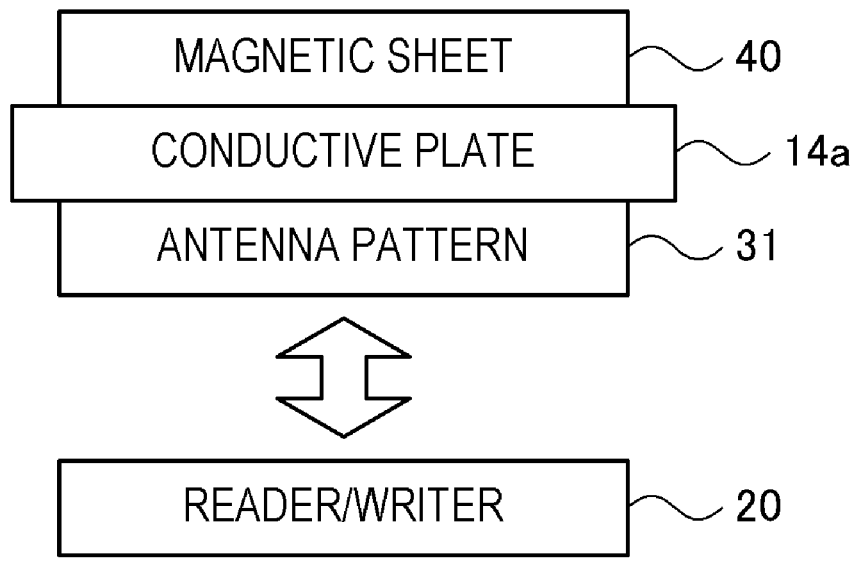
FIG. 28B is a schematic illustration of the system configuration of the short distance communication system according to the modification of the fifth embodiment of the present invention.

Note that the antenna pattern 31 may be arranged outside the cabinet 14 of the mobile phone 10, that is, at the side of the reader/writer 20 of the conductive plate 14a as described in the first embodiment. FIG. 28B schematically illustrates such an arrangement of the magnetic sheet 40. As shown in FIG. 28B, the magnetic sheet 40 is arranged at the side opposite to the antenna pattern 31 relative to the conductive plate 14a so that the conductive plate 14a is interposed between them in this instance. Then, the magnetic sheet 40 is applied to the surface of the conductive plate 14a by means of insulating glue (not shown).

With the arrangement of FIG. 28B, part of the magnetic field generated from the conductive plate 14a that is generated in the direction opposite to the antenna pattern 31 is confined to the direction of the antenna pattern 31 by the magnetic sheet 40. Then, as a result, the coupling efficiency is improved.

Table 18 shows the results of a simulation conducted for coupling efficiency (dB) in the case of FIG. 28B, where the same arrangement was used for two instances except the magnetic sheet 40 was employed in one of the instances, whereas no magnetic sheet 40 was employed in the other instance. The parameters same as those listed in Table 16 were used in this simulation. As apparent from Table 18, the coupling efficiency (dB) was improved by using the magnetic sheet 40 also in the simulation of FIG. 28B.

TABLE 18

| | Coupling efficiency |
|---|---|
| Instance where magnetic sheet 40 was employed | −21.85 dB |
| Instance where no magnetic sheet 40 was employed | −22.09 dB |

As described above, a short distance communication system of this embodiment employs the magnetic sheet 40 so that it can improve the coupling efficiency (dB) if compared with an arrangement of not using the magnetic sheet 40.

Figure 29A:
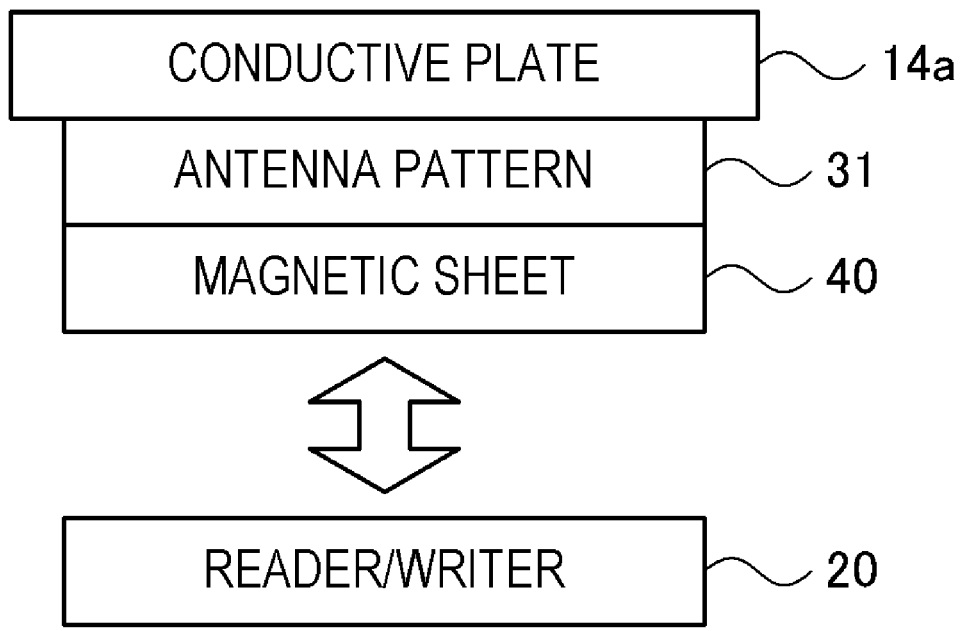
FIGS. 29A and 29B are schematic illustrations of the system configuration of the short distance communication system according to the modification of the fifth embodiment of the present invention.
Figure 29B:
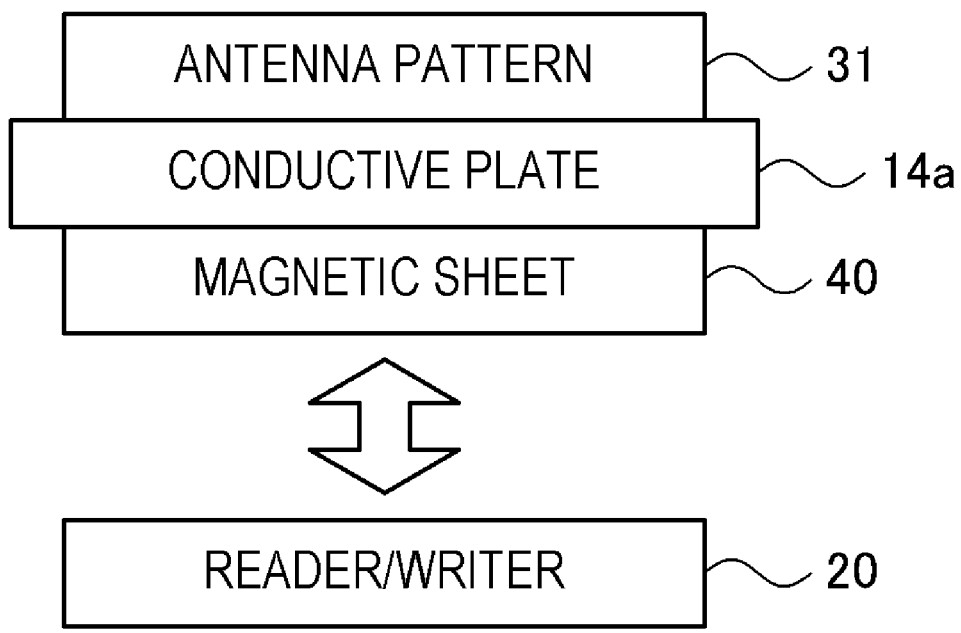

While the magnetic sheet 40 is arranged at a position remotest from the reader/writer 20 in the above-described embodiment, it may alternatively be arranged at a position closest to the reader/writer 20. FIGS. 29A and 29B schematically illustrate specific examples of such an arrangement. FIG. 29A shows an instance where the antenna pattern 31 is arranged at the side of the reader/writer 20 as viewed from the conductive plate 14a. With this arrangement, part of the magnetic field generated from the conductive plate 14a in the direction of the antenna pattern 31 is confined to the direction of the antenna pattern 31 by the magnetic sheet 40 after passing the antenna pattern 31 as in the case of FIG. 28A. Then, as a result, the coupling efficiency is improved. FIG. 29B shows an instance where the conductive plate 14a is arranged at the side of the reader/writer 20 as viewed from the antenna pattern 31. With this arrangement, part of the magnetic field generated from the conductive plate 14a in the direction opposite to the antenna pattern 31 is confined to the direction of the antenna pattern 31 by the magnetic sheet 40 as in the case of FIG. 28B. Then, as a result, the coupling efficiency is improved.

While the third embodiment through the fifth embodiment of the present invention are described above as preferred embodiments, the present invention is by no means limited thereto. It may needless to say that the present invention can be embodied in various different ways without departing from the spirit and scope of the present invention.

Figure 30A:
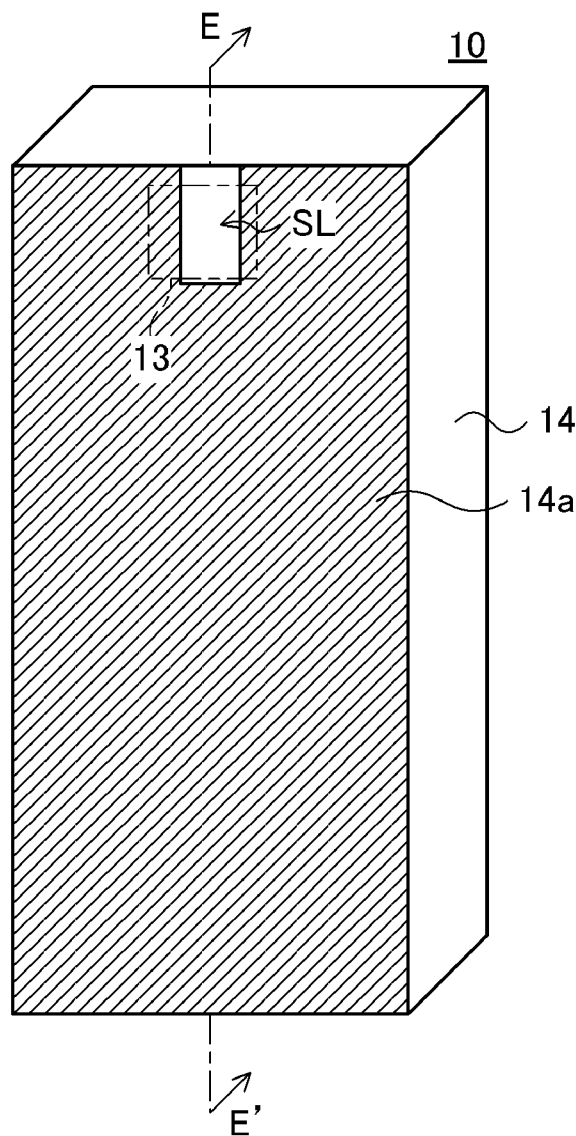
FIG. 30A is a schematic perspective view of a first modified mobile phone obtained by modifying the mobile phone shown in the third embodiment.
Figure 30B:
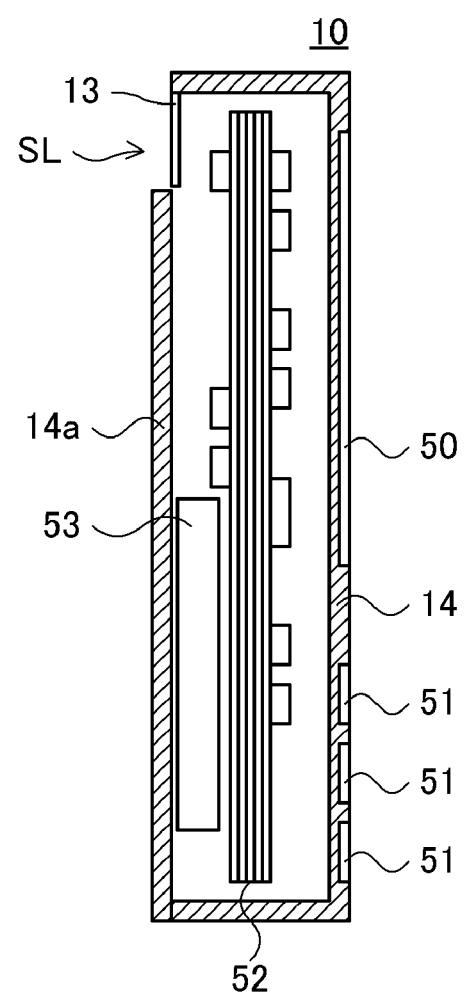
FIG. 30B is a schematic cross-sectional view taken along line E-E' in FIG. 30A.

For example, FIG. 30A is a schematic perspective view of a first modified mobile phone 10 obtained by modifying the mobile phone 10 shown in the third embodiment. FIG. 30B is a schematic cross-sectional view taken along line E-E' in FIG. 30A. In the case of this modified mobile phone 10, the mobile phone 10 does not have any camera. Accordingly, the conductive plate 14a does not have any aperture OP and has only a slit SL. With this arrangement, eddy current V2 as described above flows because of the provision of the slit SL to make it possible to suppress the degradation of the coupling characteristics due to conductive plate 14a.

Figure 31A:
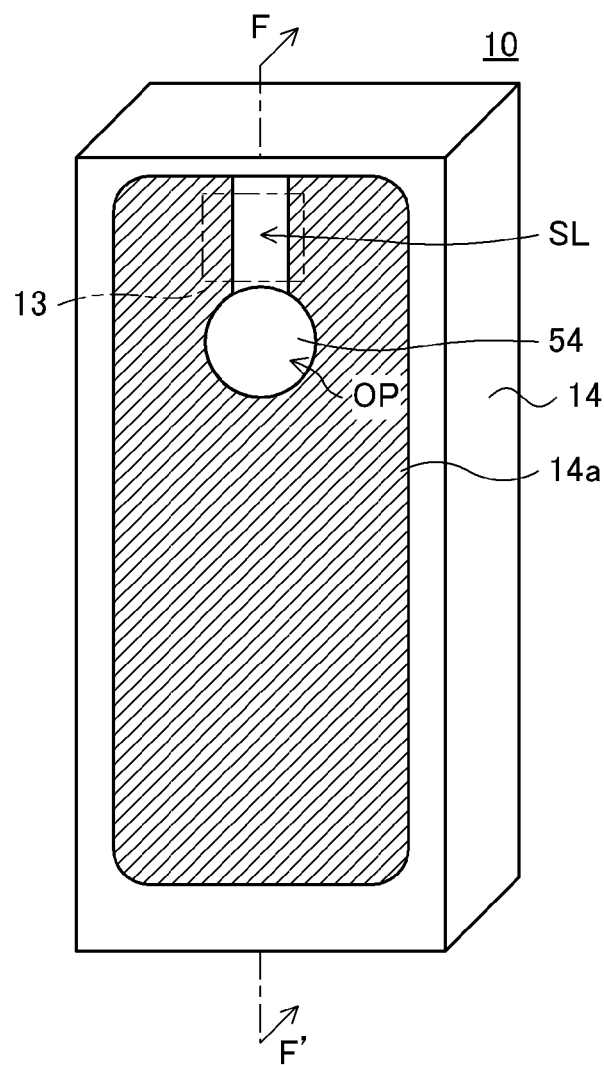
FIG. 31A is a schematic perspective view of a second modified mobile phone obtained by modifying the mobile phone shown in the third embodiment.
Figure 31B:
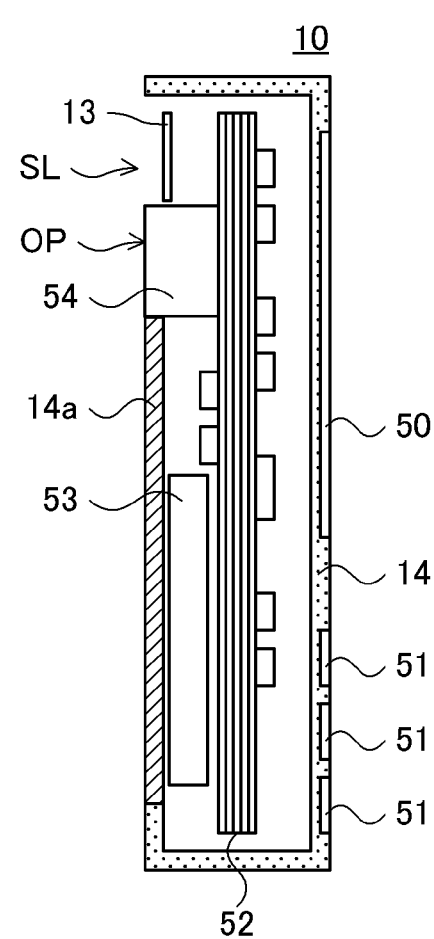
FIG. 31B is a schematic cross-sectional view taken along line F-F' in FIG. 31A.

FIG. 31A is a schematic perspective view of a second modified mobile phone 10 obtained by modifying the mobile phone 10 shown in the third embodiment. FIG. 31B is a schematic cross-sectional view taken along line F-F' in FIG. 31A. In the case of this modified mobile phone 10, the cabinet 14 is made of an insulating substance such as plastic and conductive plate 14a is formed by a metal plate embedded into the rear surface side of the cabinet 14. A conductive plate 14a can also be formed in this manner.

Figure 32A:
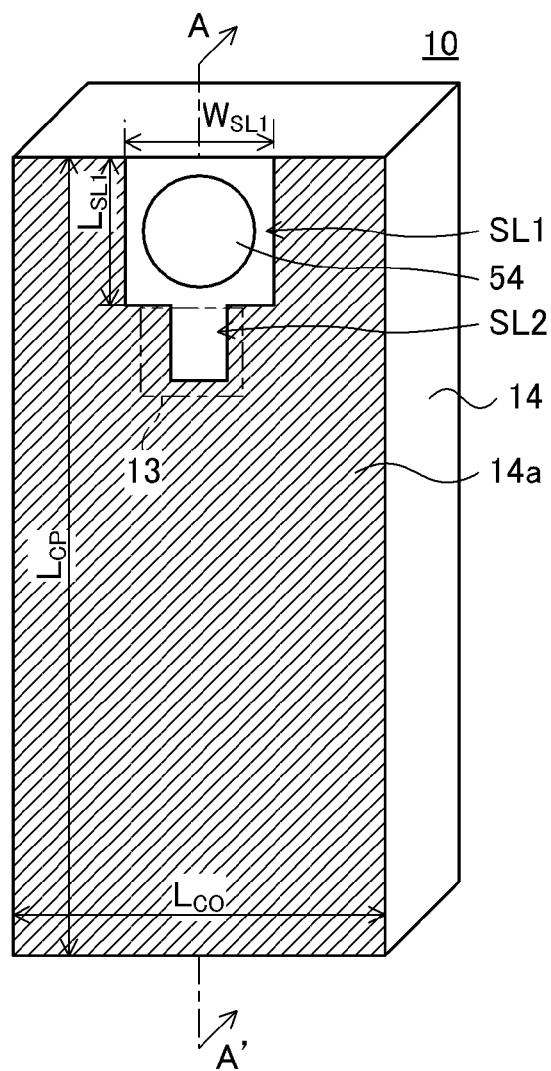
FIG. 32A is a schematic perspective view of a mobile phone to be used in a short distance communication system according to the sixth embodiment of the present invention.
Figure 32B:
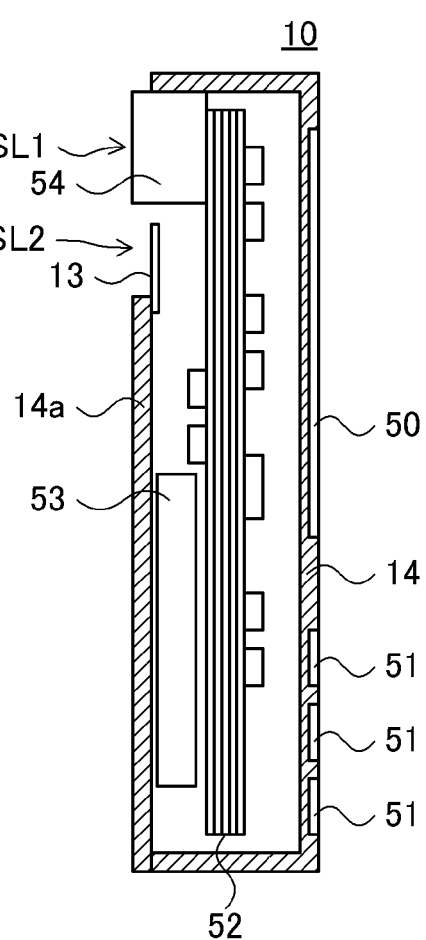
FIG. 32B is a cross-sectional view taken along line A-A' in FIG. 32A.
Figure 33:
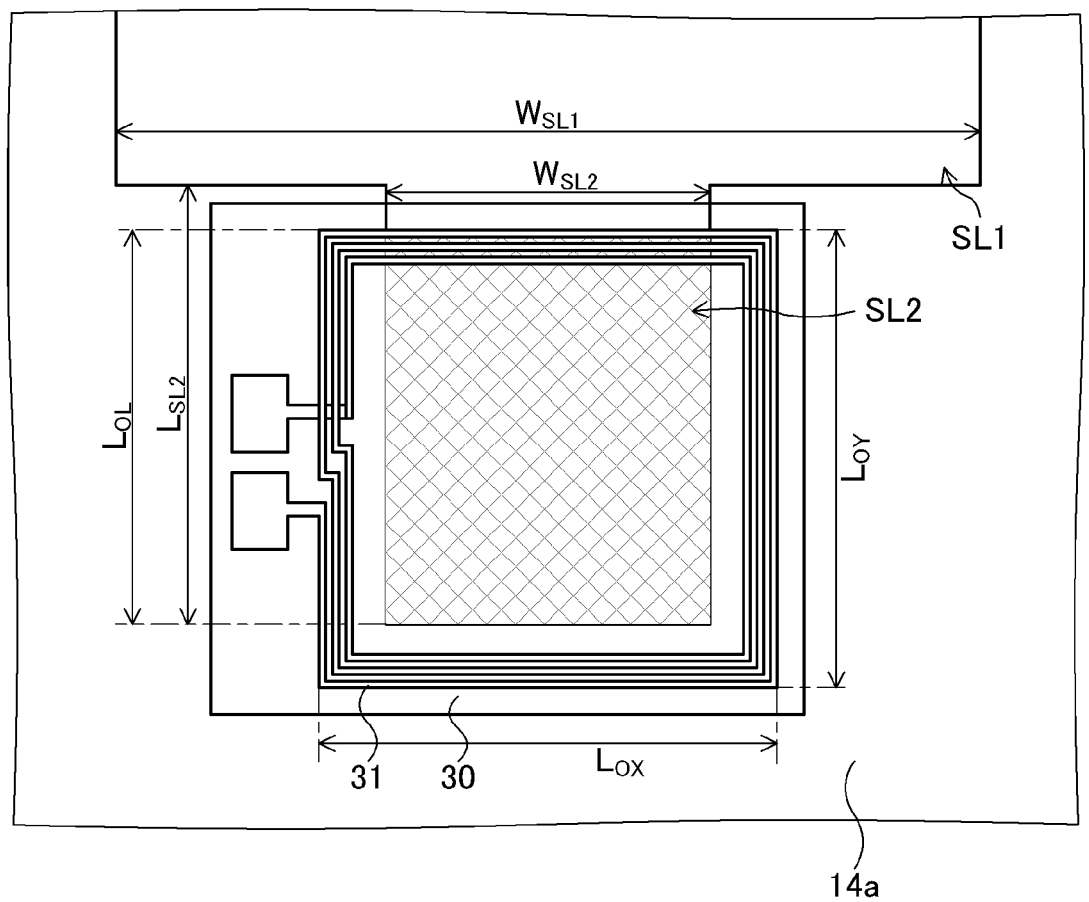
FIG. 33 is an enlarged schematic view of part of the mobile phone of FIG. 32A showing a second slit and the vicinity thereof.

FIG. 32A is a schematic perspective view of a mobile phone 10 to be used in a short distance communication system according to the sixth embodiment of the present invention. FIG. 32B is a cross-sectional view taken along line A-A' in FIG. 32A. FIG. 33 is an enlarged schematic view of part of the mobile phone 10 of FIG. 32A showing a second slit SL2 and the vicinity thereof, which will be described in greater detail hereinafter. The conductive plate 14a is hatched in FIG. 32A as in FIG. 32B for easy understanding, although FIG. 32A is not a cross-sectional view. The above description also applies to views that will be described hereinafter.

The short distance communication system according to this embodiment is same as the one according to the first embodiment except that only the mobile phone 10 thereof differs from that of the first embodiment. As shown in FIGS. 32A and 32B, the mobile phone 10 of this embodiment is substantially a rectangular parallelepiped and an LCD 50 and a keypad 51 are arranged on one of the six surfaces thereof. A multilayer substrate 52, a battery 53 and a camera 54 are arranged in the inside of the mobile phone 10 along with the antenna section 13 and the IC chip 12 (not shown in FIGS. 32A and 32B). The multilayer substrate 52 operates as the motherboard of the mobile phone 10 and various electronic circuits including a circuit for communications and a ground layer are formed on the surface and in the inside thereof. The lens of the camera 54 is exposed at the rear surface of the cabinet 14. Note that the components other than the antenna section 13 and the IC chip 12 correspond to the main body section 15 shown in FIG. 1.

The cabinet 14 is made of an electroconductive metal material and the conductive plate 14a is formed by utilizing the back surface of the cabinet 14 (the surface opposite to the surface where the LCD 50 and the keypad 51 are arranged out of the six surfaces). The conductive plate 14a has a first slit SL1 arranged at an end section of the conductive plate 14a and a second slit SL2 extending from the bottom of the first slit SL1.

In the following description, the length and the width of the first slit SL1 are respectively expressed as $L_{SL1}$ and $W_{SL1}$ (FIG. 32A) and the length and the width of the second slit SL2 are respectively expressed as $L_{SL2}$ and $W_{SL2}$ (FIG. 33). The length of the part of the second slit SL2 that overlaps the antenna pattern 31 in plan view is expressed as $L_{OL}$ (FIG. 33). The length of the conductive plate 14a in the extending direction of the first slit SL1 is expressed as $L_{CP}$, while the length of the conductive plate 14a in the direction orthogonal to the extending direction of the first slit SL1 is expressed as $L_{CO}$ (FIG. 32A).

As shown in FIGS. 32A and 32B, the lens of the camera 54 is arranged in the first slit SL1. Therefore, the width $W_{SL1}$ of first slit SL1 is determined to be larger than the width (diameter) of the lens of the camera. On the other hand, the width $W_{SL2}$ of the second slit SL2 is optimized by taking the relationship with the size of the antenna pattern 31 into consideration as will be described in greater detail hereinafter.

The inside of the first slit SL1 and that of the second slit SL2 (except the part of the lens of the camera) may be void as shown in FIGS. 32A and 32B. Alternatively they may be filled with a non-conductive substance such as insulating resin. When the insides are filled with a non-conductive substance, the cabinet 14 can be strengthened so much.

FIGS. 32A and 32B and FIG. 33 also show the position where the antenna section 13 is arranged. As shown particularly in FIG. 33, the antenna section 13 is arranged at a position where the antenna pattern 31 crosses the second slit SL2 in plan view.

With the above-described positional arrangement, the width of the first slit SL1 is larger than the width of the antenna pattern 31. Notwithstanding such an arrangement, however, the magnetic field that is generated by an electric current bypassing the first slit SL1 (and the second slit SL2) can efficiently be taken into the antenna pattern 31. As a result, the coupling characteristics between the mobile phone 10 that is a non-contact type IC card and the reader/writer 20 are not degraded when the conductive plate 14a, which is a conductive member, is placed in position. Rather, the coupling characteristics are improved if compared with an instance where no conductive plate 14a is provided. This will be described more specifically below.

Figure 34A:
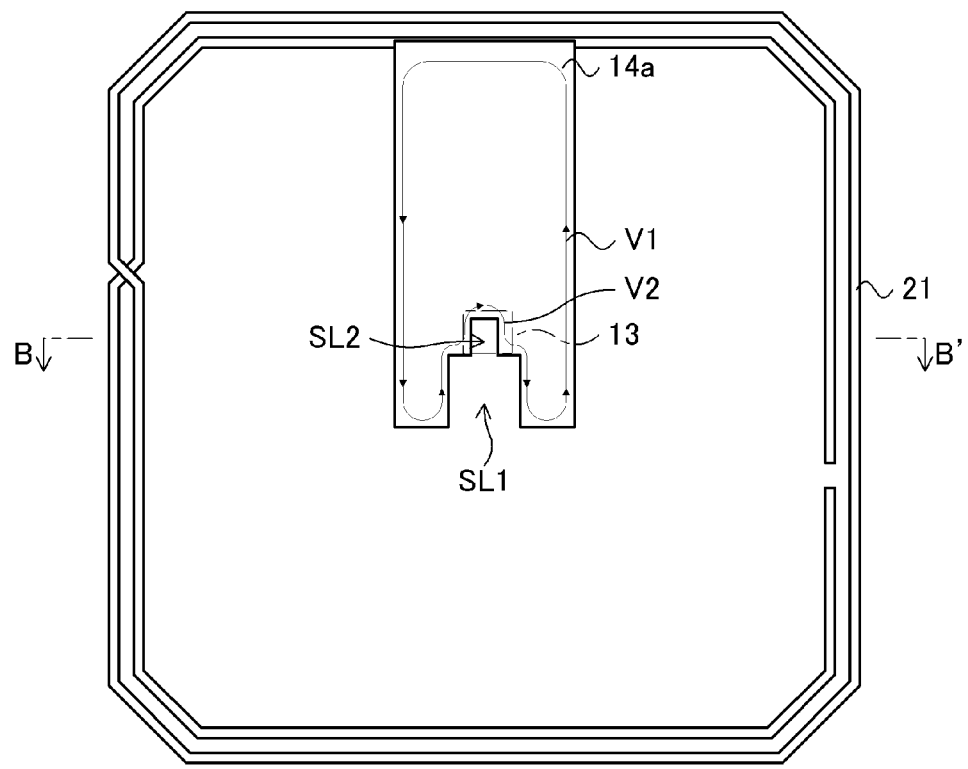
FIG. 34A is an illustration of a spiral coil that forms the proximity type antenna according to the sixth embodiment of the present invention and the conductive plate according to the sixth embodiment of the present invention.

FIG. 34A is an illustration of a spiral coil that forms the proximity type antenna 21 and the conductive plate 14a. The arrowed lines in FIG. 34A indicate the eddy currents that flow in the conductive plate 14a. As indicated by the arrowed lines, as the conductive plate 14a is brought close to the proximity type antenna 21, eddy current V1 flows in the conductive plate 14a. The eddy current V1 is an electric current that flows along the edges of the conductive plate 14a and turns out to be a bypassing current V2 that bypasses the first and second slits SL1 and SL2 in the area where the slits are formed. Note that V1 and V2 do not represent any current values and are merely identification symbols for identifying the electric currents.

Figure 34B:
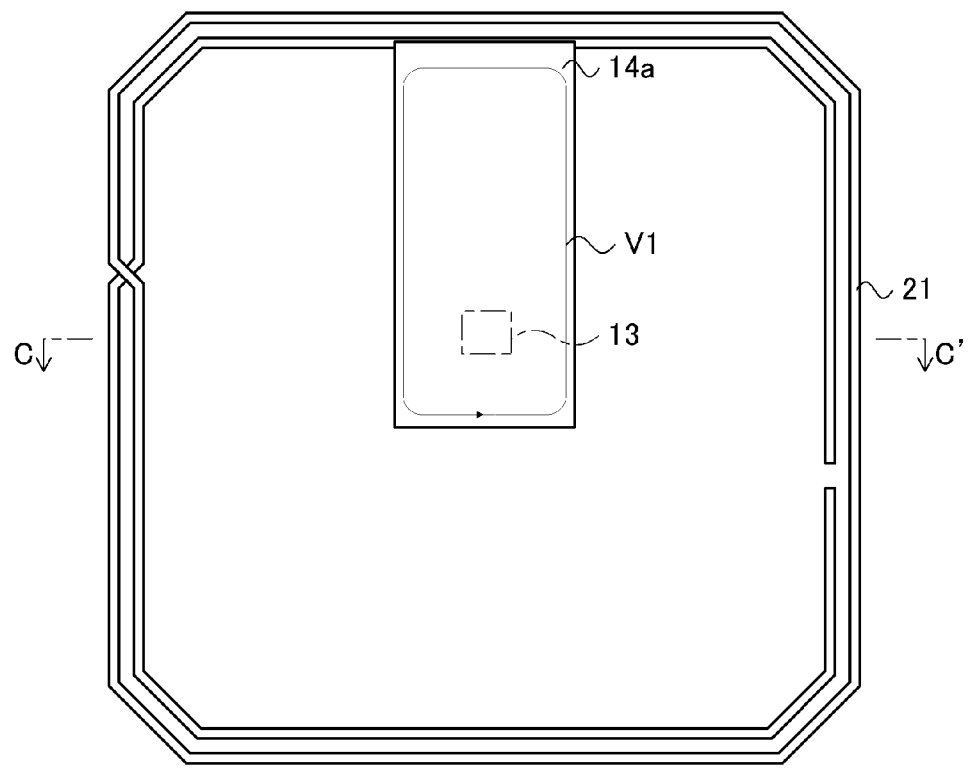
FIG. 34B shows an instance where a conductive plate having neither a first slit nor a second slit is employed.

FIG. 34B shows an instance where a conductive plate 14a having neither a first slit SL1 nor a second slit SL2 is employed as a comparative example. As a matter of course, eddy current V1 flows without bypassing the area where the first and second slits SL1 and SL2 are formed so that no bypassing current V2 flows in this comparative example.

Since the eddy current V1 is generated by the magnetic field generated from the proximity type antenna 21, it flows in the direction of generating a magnetic field that weakens the former magnetic field. In the instance of the comparative example shown in FIG. 34B, the eddy current V1 flows in this direction at any point on the conductive plate 14a. To the contrary, in the embodiment shown in FIG. 34A, the eddy current V2 flows in the direction opposite to the flowing direction of the eddy current V1 and hence generates a magnetic field in a direction that intensifies the magnetic field generated from the proximity type antenna 21. Therefore, when the antenna pattern 31 is arranged so as to cross the second slit SL2, the magnetic field that is taken into the antenna pattern 31 is raised by the bypassing current V2 that flows around the second slit SL2. The net results will be that the coupling characteristics are improved if compared with the instance where the conductive plate 14a has no slit and also with the instance where no conductive plate 14a is provided.

Figure 35A:
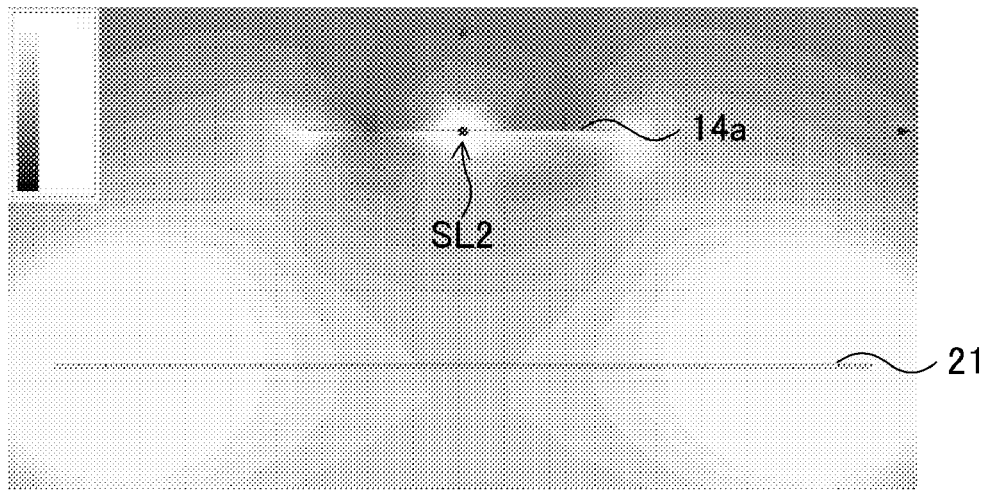
FIGS. 35A and 35B show the results obtained by simulating the magnetic field near the proximity type antenna and the conductive plate according to the sixth embodiment of the present invention.
Figure 35B:
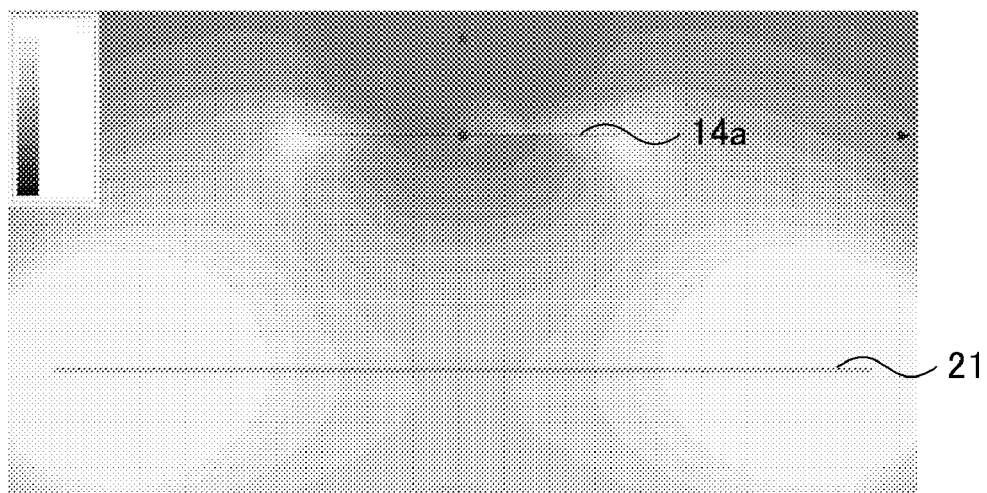

FIGS. 35A and 35B show the results obtained by simulating the magnetic field near the proximity type antenna 21 and the conductive plate 14a. FIG. 35A shows the magnetic field along the cross section taken along line B-B' in FIG. 34A and FIG. 35B shows the magnetic field along the cross section taken along line C-C' in FIG. 34B.

In FIGS. 35A and 35B, the light-colored areas are areas where the magnetic field is strong. As will be understood by seeing these views, a strong magnetic field is generated around the second slit SL2 but no such magnetic field is found when neither a first slit SL1 nor a second slit SL2 is provided. This is generated by the above-described bypassing current V2 and the coupling characteristics are improved when the antenna pattern 31 is arranged so as to cross the second slit SL2 because such a magnetic field is generated.

Now, the results of a simulation of the coupling efficiency observed between the mobile phone 10 that is a non-contact type IC card and the reader/writer 20 will be described below. Table 19 shows the specific values of parameters used for the conductive plates 14a of three patterns (a) through (c) in the simulation. In the table, the symbols (mm etc.) shown below the respective parameters represent the units of the parameters. This description also applies to all the tables shown hereinafter. In short, the pattern (a) out of the three patterns shows an instance where no conductive plate 14a was employed. The pattern (b) shows an instance where the first slit SL1 and the second slit SL2 were removed from the conductive plate 14a.

TABLE 19

| | $L_{CP}$ mm | $L_{CO}$ mm | $L_{SL1}$ mm² | $W_{SL1}$ mm | $L_{SL2}$ mm | $W_{SL2}$ mm | $L_{OL}$ mm | $L_{OX}$ mm | $L_{OY}$ mm | $L_{IX}$ mm | $L_{IY}$ mm |
|---|---|---|---|---|---|---|---|---|---|---|---|
| (a) | 0 | 0 | — | — | — | — | — | 6 | 6 | 2.6 | 2.6 |
| (b) | 110 | 40 | 0 | 0 | 0 | 0 | 0 | | | | |
| (c) | | | 10 | 10 | 7 | 4 | 5 | | | | |

In this simulation and in each of the simulations that will be described hereinafter, the proximity type antenna 21 had a size of 110 mm square and the distance between the proximity type antenna 21 and the antenna section 13 was made to be equal to 30 mm, while the thickness of the conductive plate 14a was made to be equal to 35 μm unless noted otherwise. The positional arrangement of the conductive plate 14a was so determined as to make the central point of the proximity type antenna 21 and that of the inner periphery of the antenna pattern 31 agree with each other in plan view.

Table 20 shows the results of the simulation for each of the patterns illustrated in Table 19. As will be understood by seeing the table, the coupling efficiency was remarkably high for the pattern (c) having first and second slits SL1 and SL2 if compared with the other patterns. Thus, it will be safe to say that the coupling characteristics between the mobile phone 10 that is a non-contact type IC card and the reader/writer 20 were improved in this instance.

TABLE 20

|     | Coupling effeciency |
| --- | --- |
| (a) | −28.86 dB |
| (b) | −48.80 dB |
| (c) | −17.09 dB |

As described above, the coupling characteristics between the mobile phone 10 that is a non-contact type IC card and the reader/writer 20 are improved by providing the conductive plate 14a with a second slit SL2 and arranging an antenna pattern 31 so as to cross the second slit SL2. The extent of improvement is influenced by the width $W_{SL2}$ of the second slit SL2, the material of the conductive plate 14a and so on. Therefore, their optimal values will be described below by referring to the results of simulations.

FIGS. 36A through 36H illustrate the conductive plates 14a and the antenna patterns 31 used in the simulation for obtaining optimal values for the width $W_{SL2}$ of the second slit SL2. Note that only the second slit SL2 and the vicinity thereof are shown for each of the conductive plates 14a and only the outer periphery and the inner periphery are schematically shown for each of the antenna patterns 31. As shown in the views, the width $W_{SL2}$ of the second slit SL was employed as variable parameter and the tendency of change of the coupling efficiency relative to the change in the width $W_{SL2}$ was observed in this simulation.

Table 21 shows the specific values of $W_{SL2}$ and other parameters used in this simulation. In the table, (a) through (h) correspond respectively to FIGS. 36A through 36H.

TABLE 21

|     | $L_{CP}$ mm | $L_{CO}$ mm | $L_{SL1}$ mm | $W_{SL1}$ mm | $L_{SL2}$ mm | $W_{SL2}$ mm | $L_{OL}$ mm | $L_{OX}$ mm | $L_{OY}$ mm | $L_{IX}$ mm | $L_{IY}$ mm |
| --- | --- | --- | --- | --- | --- | --- | --- | --- | --- | --- | --- |
| (a) | 55 | 40 | 10 | 10 | 7 | 0.2 | 4 | 6 | 6 | 2.6 | 2.6 |
| (b) |    |    |    |    |    | 1 |    |    |    |    |    |
| (c) |    |    |    |    |    | 2 |    |    |    |    |    |
| (d) |    |    |    |    |    | 3 |    |    |    |    |    |
| (e) |    |    |    |    |    | 4 |    |    |    |    |    |
| (f) |    |    |    |    |    | 5 |    |    |    |    |    |
| (g) |    |    |    |    |    | 6 |    |    |    |    |    |
| (h) |    |    |    |    |    | 8 |    |    |    |    |    |

Figure 37A:
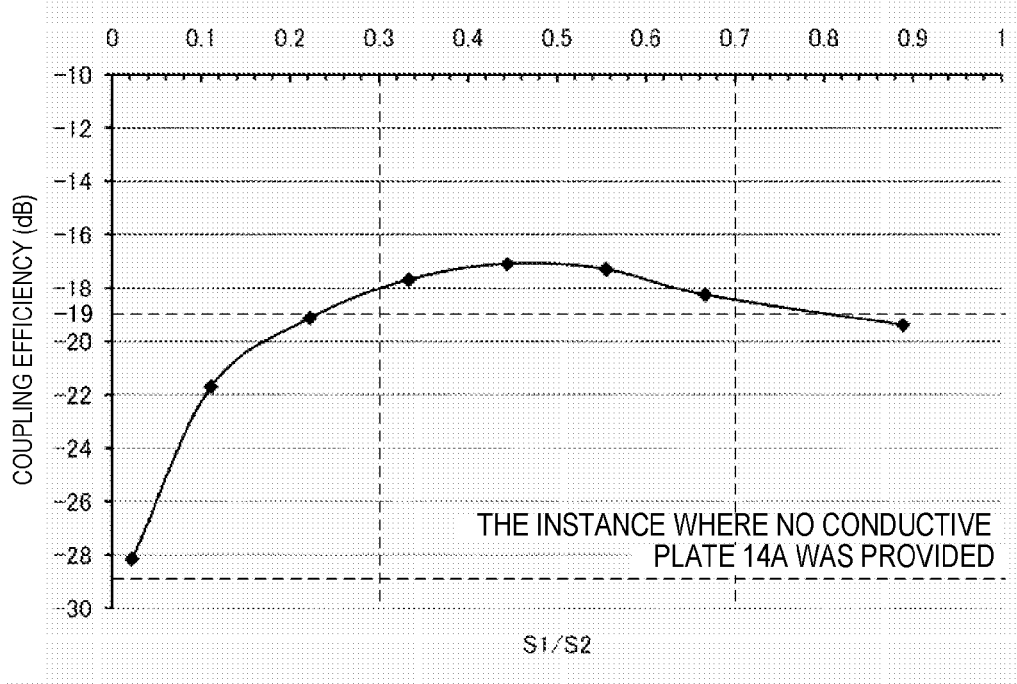
FIGS. 37A and 37B summarily illustrate the results of the simulation for obtaining optimal values for the width of the second slit according to the sixth embodiment of the present invention.
Figure 37B:
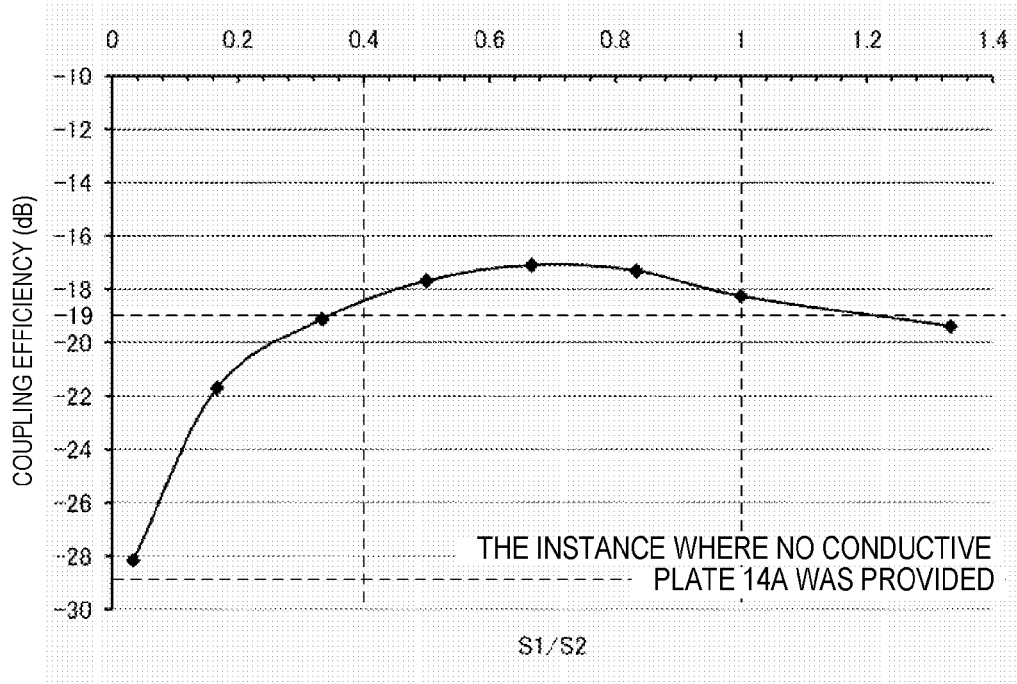

FIGS. 37A and 37B summarily illustrate the results of the simulation. In both FIGS. 37A and 37B, the horizontal axis indicates parameter S1/S2 and the vertical axis indicates the coupling efficiency (dB). In FIG. 37A, the parameter S1 was the area of the part of the second slit SL2 that overlaps the antenna pattern 31 in plan view (=$W_{SL2} \times L_{OL}$, the area of the patched part in FIG. 33) and the parameter S2 was the outer profile area $S_{OUTER}$ (=$L_{OX} \times L_{OY}$) of the antenna pattern 31.

In FIG. 37B, on the other hand, the parameter S1 was the width $W_{SL2}$ of the second slit SL2 and the parameter S2 was the length $L_{OX}$ of outer periphery of the antenna pattern 31 in the transversal direction.

As shown in FIGS. 37A and 37B, the highest value of coupling efficiency was about −17 dB. The coupling efficiency is preferably not less than −19 dB that is lower than the highest value by 2 dB. By seeing FIG. 37A from this viewpoint, the coupling efficiency went above −19 dB when S1/S2 was approximately not less than 0.3 and not more than 0.7. Thus, the area of the part of the second slit SL2 that overlaps the antenna pattern 31 in plan view, or $W_{SL2} \times L_{OL}$, is preferably not less than 30% and not more than 70% of the outer profile area $S_{OUTER}$ of the antenna pattern 31.

FIG. 37B tells that the coupling efficiency went above −19 dB when S1/S2 was approximately not less than 0.4 and not more than 1.0. Thus, the width $W_{SL2}$ of the second slit SL2 is preferably not less than 40% and not more than 100% of the length $L_{OX}$ of the outer periphery of the antenna pattern 31 in the transversal direction.

Figure 36A:
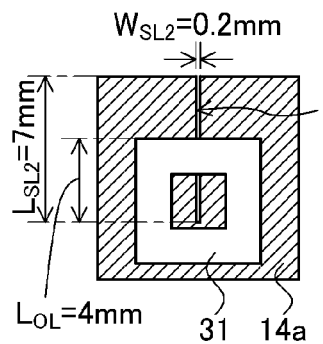
FIGS. 36A through 36H illustrate the conductive plates and the antenna patterns used in the simulation for obtaining optimal values for the width of the second slit SL2 according to the sixth embodiment of the present invention.
Figure 36B:
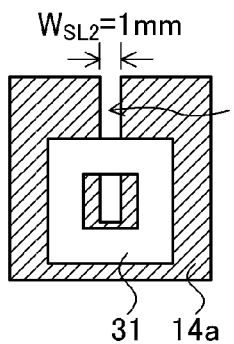
Figure 36C:
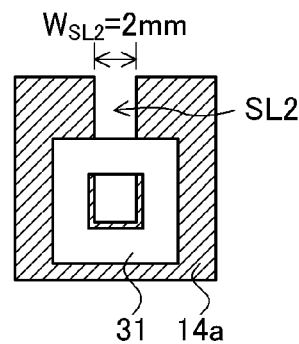
Figure 36D:
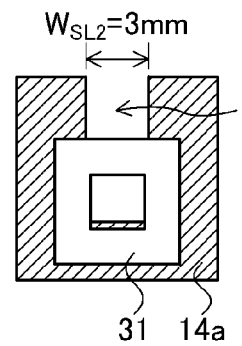
Figure 36E:
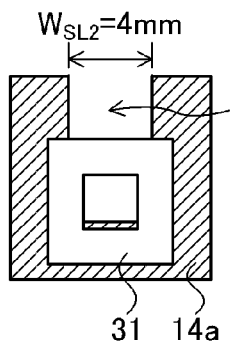
Figure 36F:
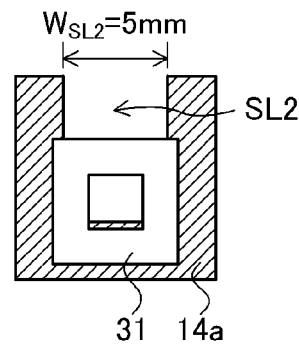
Figure 36G:
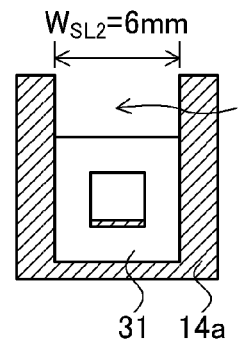
Figure 36H:
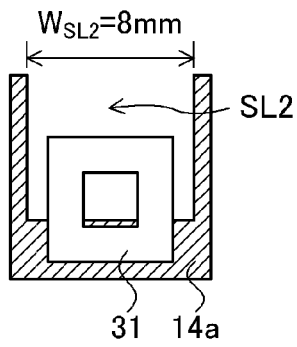

Differently stated, the size of the second slit SL2, that of the antenna pattern 31 and their positions are preferably so determined as to make the three sides of the second slit SL2 including the bottom side and the two lateral sides are covered by the antenna pattern 31. FIGS. 36A through 36G correspond to such an arrangement. In FIG. 36H, only the bottom side of the second slit SL2 is covered by the antenna pattern 31 while the two lateral sides are not. Thus, it may be safe to assume that, with this arrangement, the magnetic field generated from the bypassing current V2 is efficiently taken into the antenna pattern 31 to reduce the coupling efficiency.

Table 22 shows the materials of the conductive plates 14a tested in a simulation conducted to show preferable materials for a conductive plate 14a, the specific values of the electro-conductivities $C_{14a}$ thereof and other parameters of this simulation. Although not shown in Table 22 for the reason of the available space, $L_{OX}$, $L_{OY}$, $L_{IX}$ and $L_{IY}$ were 6 mm, 6 mm, 2.6 mm and 2.6 mm respectively. In this simulation, conductive plates 14a made of various different materials were employed and the tendency of change of the coupling efficiency relative to the electro-conductivities of the different materials was observed.

TABLE 22

| material | $C_{14a}$ $10^7$ S/m | $L_{CP}$ mm | $L_{CO}$ mm | $L_{SL1}$ mm | $W_{SL1}$ mm | $L_{SL2}$ mm | $W_{SL2}$ mm | $L_{OL}$ mm |
| --- | --- | --- | --- | --- | --- | --- | --- | --- |
| Cu | 5.800 | 55 | 40 | 10 | 10 | 7 | 4 | 5 |
| Al | 3.800 |    |    |    |    |    |    |    |
| Mg | 2.250 |    |    |    |    |    |    |    |

TABLE 22-continued

| material | $C_{14a}$ $10^7$ S/m | $L_{CP}$ mm | $L_{CO}$ mm | $L_{SL1}$ mm | $W_{SL1}$ mm | $L_{SL2}$ mm | $W_{SL2}$ mm | $L_{OL}$ mm |
|---|---|---|---|---|---|---|---|---|
| Brass | 1.500 | | | | | | | |
| Fe | 1.030 | | | | | | | |
| Bronze | 1.000 | | | | | | | |
| Lead | 0.500 | | | | | | | |
| Ti | 0.182 | | | | | | | |
| SUS | 0.110 | | | | | | | |

According to the results of the simulation (not shown), the coupling efficiency was high when the electro-conductivity $C_{14a}$ was high and held stable when the electro-conductivity $C_{14a}$ was not less than $1 \times 10^7$ S/m except the single instance where Fe (electro-conductivity $C_{14a}$=1.030×10$^7$ S/m) was employed for the material of the conductive plate 14a. It was also found that the coupling efficiency was remarkably low when Fe was employed for the material of the conductive plate 14a if compared with instances where materials showing a substantially same electro-conductivity were employed. This will be thought to be due to that Fe is a ferromagnetic substance (whereas each of the other materials is either a paramagnetic substance or a diamagnetic substance). Thus, the conductive plate 14a is preferably made of a material that is paramagnetic or diamagnetic and shows an electro-conductivity $C_{14a}$ of not less than $1 \times 10^7$ S/m.

As described above, the coupling characteristics between a mobile phone 10 that is a non-contact type IC card and a reader/writer 20 are influenced by the relationship between the width $W_{SL2}$ of the second slit SL2 and the size of the antenna pattern 31 and the material of the conductive plate 14a. Optimum coupling characteristics can be obtained by selecting specific values for them in a manner as described above.

Figure 38A:
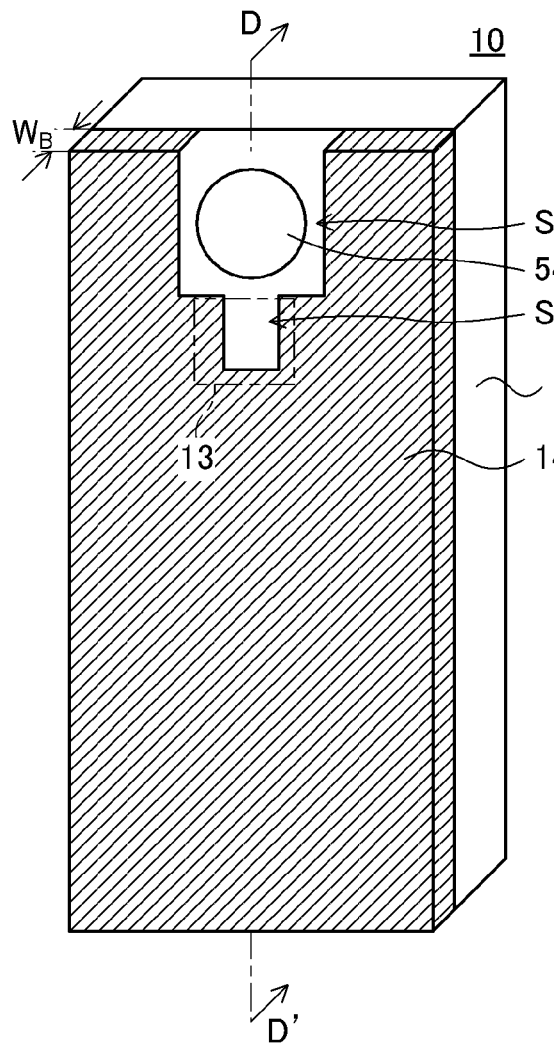
FIG. 38A is a schematic perspective view of a mobile phone to be used in a short distance communication system according to the seventh embodiment of the present invention.
Figure 38B:
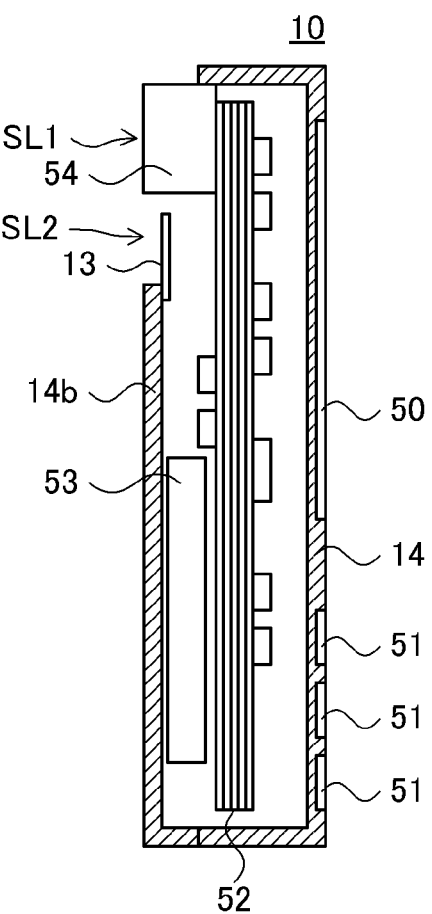
FIG. 38B is a cross-sectional view taken along line D-D' in FIG. 38A.

FIG. 38A is a schematic perspective view of a mobile phone 10 to be used in a short distance communication system according to the seventh embodiment of the present invention. FIG. 38B is a cross-sectional view taken along line D-D' in FIG. 38A. The short distance communication system according to this embodiment differs from the one according to the first embodiment only in terms of mobile phone 10. The mobile phone 10 of this embodiment differs from the mobile phone 10 of the sixth embodiment in that it includes conductive plate 14b instead of conductive plate 14a. Now, this embodiment will be described below in detail mainly in terms of the configuration of the mobile phone 10 with stress put on the difference between this embodiment and the sixth embodiment. Throughout the following description and the drawings referred to in the following description, the components similar to those of the sixth embodiment are denoted respectively by the same reference symbols.

As shown in FIGS. 38A and 38B, the conductive plate 14b extends not only on the rear surface of the cabinet 14 but also to the lateral surfaces of the cabinet 14 by a width $W_B$ from the rear surface. In other words, the edges of the conductive plate 14b are bent so as to move away from the reader/writer 20 (FIG. 1) by the width $W_B$ of the bent parts. The first slit SL1 is extended to an end of the conductive plate 14b. In other words, it is also bent so as to move away from the reader/writer 20.

The use of a conductive plate 14b that are bent along the edges thereof can broaden the directivity of coupling characteristics. This will be described in greater detail hereinafter by referring to the results of simulations.

Figure 39A:
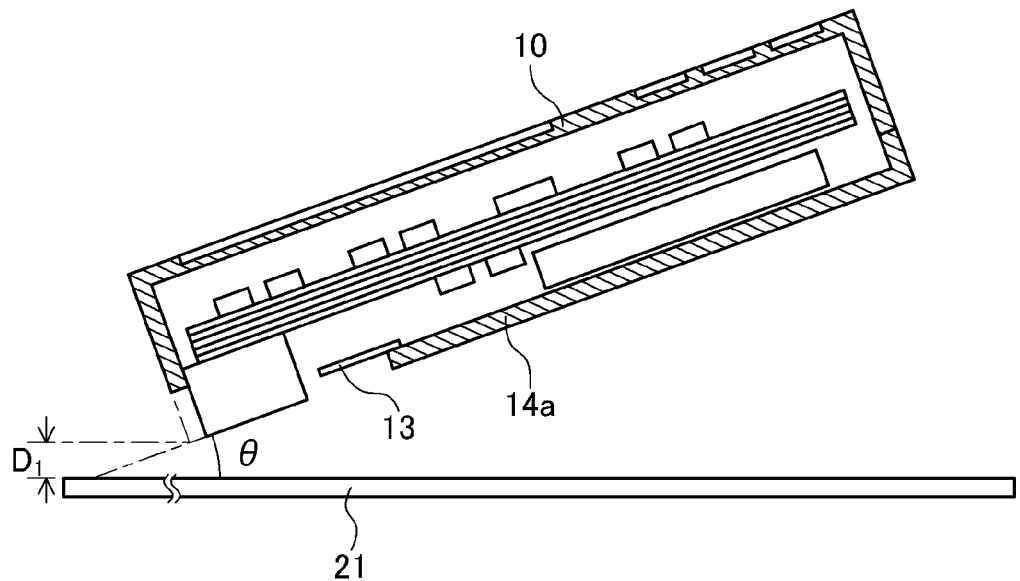
FIGS. 39A and 39B are a schematic illustration of the angle that was employed in the simulation showing the expansion effect of the directivity of coupling characteristics and a schematic illustration of the results of the simulation, respectively.

FIG. 39A is a schematic illustration of the angle θ that was employed in this simulation. The cross-sectional view of the mobile phone 10 shown in FIG. 39 is obtained by tilting the cross-sectional view shown in FIG. 38B. In actual scenes where the mobile phone 10 is operated, the mobile phone 10 and the proximity type antenna 21 of the reader/writer 20 may not necessarily be in parallel with each other as shown in FIG. 39A but may be arranged to show an angle θ (≠0°). In this simulation, this angle θ was employed as variable parameter and the tendency of change of the coupling efficiency relative to the change in the angle θ was observed.

The object of this simulation was to demonstrate the effect of using a conductive plate 14b that are bent along the edges thereof. In this simulation, a width of $W_B$=0 mm and that of $W_B$=3 mm were used for the bent part. In short, a conductive plate 14b of $W_B$=0 mm is same as the conductive plate 14a of the sixth embodiment. For the purpose of comparison, an instance where the conductive plate 14b was removed (the cabinet 14 of the mobile phone 10 including the part corresponding to the conductive plate 14b was made of a non-conductive material) was also observed in the simulation.

Table 23 shows the specific values of the parameters of this simulation. Although not shown in Table 23 for the reason of the available space, $L_{OX}$, $L_{OY}$, $L_{IX}$ and $L_{IY}$ were 6 mm, 6 mm, 2.6 mm and 2.6 mm respectively. In this simulation, the position of the antenna section 13 in the mobile phone 10 in the instance where the conductive plate 14b was provided was also used for the instance where the conductive plate 14b was removed. The position of the mobile phone 10 relative to the proximity type antenna 21 was so selected as to make the central point of the proximity type antenna 21 agree with the central point of the inner periphery of the antenna pattern in plan view and the minimum distance $D_1$ between the proximity type antenna 21 and the mobile phone 10 (see FIG. 39A) show a constant value.

TABLE 23

| | θ ° | $W_B$ mm | $L_{CP}$ mm | $L_{CO}$ mm | $L_{SL1}$ mm | $W_{SL1}$ mm | $L_{SL2}$ mm | $W_{SL2}$ mm | $L_{OL}$ mm |
|---|---|---|---|---|---|---|---|---|---|
| Instance where conductive plate 14b was removed | 0<br>30<br>45<br>60<br>90 | | | | — | | | | |
| Instance where conductive plate 14a was used | 0<br>30<br>45<br>60<br>90 | 0 | 55 | 40 | 10 | 10 | 7 | 4 | 5 |
| Instance where conductive plate 14b was used | 0<br>30<br>45<br>60<br>90 | 3 | | | | | | | |

Figure 39B:
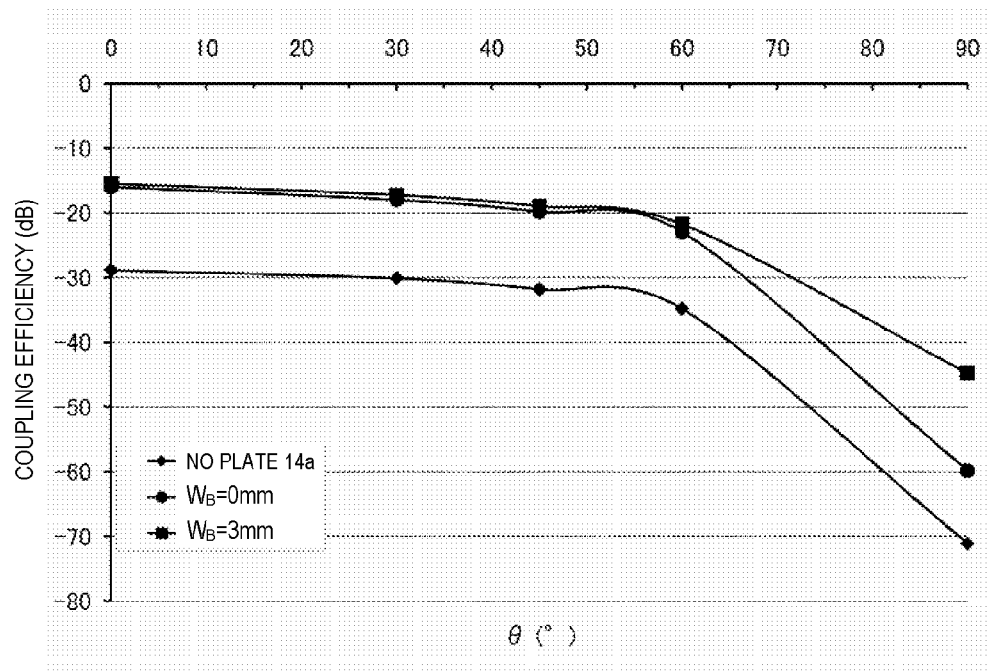

FIG. 39B schematically illustrates the results of the simulation. In FIG. 39B, the horizontal axis indicates angle $\theta_2$ (°) and the vertical axis indicates the coupling efficiency (dB). By seeing FIG. 39B, it will be understood that the coupling efficiency fell only to a small extent relative to the increase of the angle θ when the width $W_B$ of the bent part was 3 mm and particularly when the angle θ was not less than 60° if compared with other instances. This fact indicates that the use of a conductive plate 14b having bent edges broadens the directivity of coupling characteristics.

As described above, a short distance communication system according to this embodiment can broaden the directivity of coupling characteristics because a mobile phone 10 having a conductive plate 14a that is bent along the edges thereof is employed.

Figure 40A:
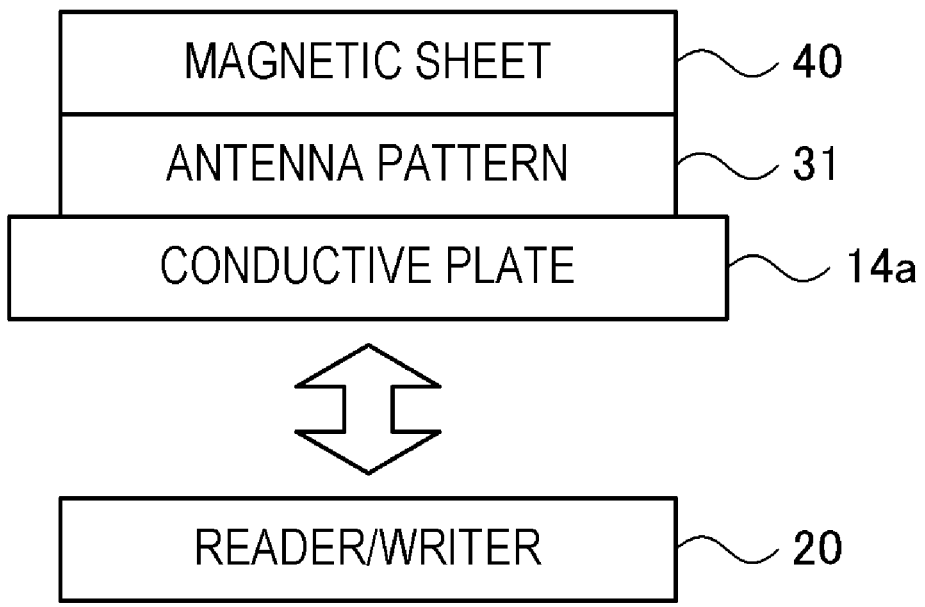
FIG. 40A is a schematic illustration of the system configuration of the short distance communication system according to the eighth embodiment of the present invention.

FIG. 40A is a schematic illustration of the system configuration of the short distance communication system according to the eighth embodiment of the present invention. The short distance communication system according to this embodiment differs from the short distance communication system 1 of the sixth embodiment in that it employs a magnetic sheet 40. Otherwise, this embodiment is same as the third embodiment. Now, this embodiment will be described below in detail with stress put on the difference between this embodiment and the sixth embodiment. Throughout the following description and the drawings referred to in the following description, the components similar to those of the sixth embodiment are denoted respectively by the same reference symbols.

As shown in FIG. 40A, the magnetic sheet 40 is arranged at the side opposite to the conductive plate 14a relative to the antenna pattern 31 so that the antenna pattern 31 is interposed between them. The magnetic sheet 40 is a magnetic member, which is a sheet-shaped member made of a magnetic substance such as iron oxide, chromium oxide, cobalt, ferrite or the like and applied onto the surface of the antenna pattern 31 by means of insulating glue (not shown). The magnetic sheet 40 has a size substantially same as or slightly larger than the antenna pattern 31 and smaller than the conductive plate 14a.

With the arrangement shown in FIG. 40A, the part of the magnetic field generated from the conductive plate 14a in the direction of the antenna pattern 31 is confined to the direction of the antenna pattern 31 by the magnetic sheet 40 after passing the antenna pattern 31. Then, as a result, the coupling efficiency is improved.

Table 24 shows the specific values of the parameters of the short distance communication system 1 used in a simulation for demonstrating the effect of the magnetic sheet 40. The magnetic sheet 40 has a size of 7 mm×7 mm that is same as the size of the substrate 30 of the antenna section 13. Table 25 shows the result of a simulation of coupling efficiency (dB) of a short distance communication system using the magnetic sheet 40 and that of a short distance communication system same as the former system except that no magnetic sheet 40 was used. As apparent from Table 25, the coupling efficiency (dB) was improved by using the magnetic sheet 40.

TABLE 24

| $L_{CP}$ mm | $L_{CO}$ mm | $L_{SL1}$ mm | $W_{SL1}$ mm | $L_{SL2}$ mm | $W_{SL2}$ mm | $L_{OL}$ mm | $L_{OX}$ mm | $L_{OY}$ mm | $L_{IX}$ mm | $L_{IY}$ mm |
|---|---|---|---|---|---|---|---|---|---|---|
| 55 | 40 | 10 | 10 | 7 | 4 | 5 | 6 | 6 | 2.6 | 2.6 |

TABLE 25

| | Coupling efficiency |
|---|---|
| Instance where magnetic sheet 40 was employed | −16.44 dB |
| Instance where no magnetic sheet 40 was employed | −17.03 dB |

Figure 40B:
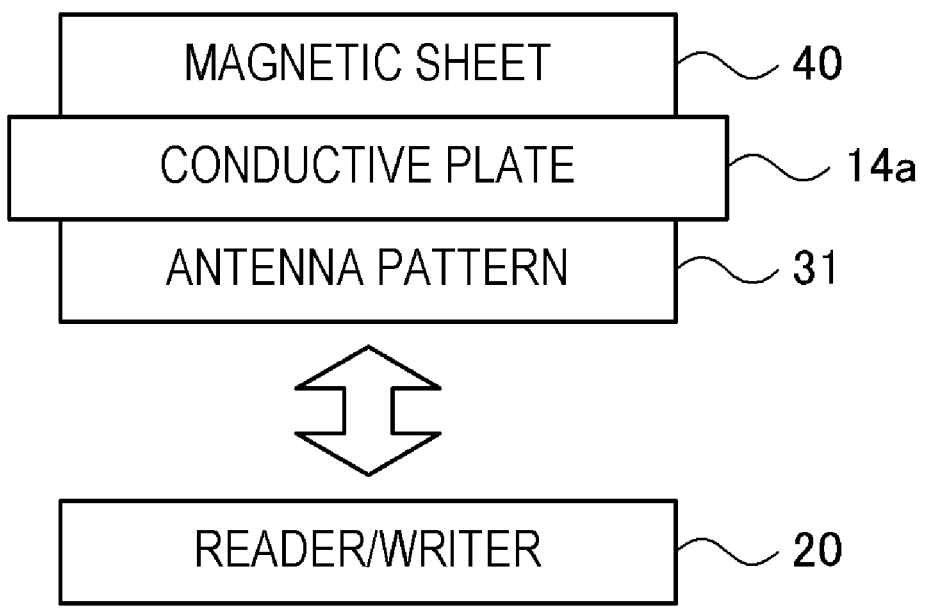
FIG. 40B is a schematic illustration of the system configuration of the short distance communication system according to the modification of the eighth embodiment of the present invention.

Note that the antenna pattern 31 may be arranged outside the cabinet 14 of the mobile phone 10, that is, at the side of the reader/writer 20 of the conductive plate 14a as described in the first embodiment. FIG. 40B schematically illustrates such an arrangement of the magnetic sheet 40. As shown in FIG. 28B, the magnetic sheet 40 is arranged at the side opposite to the antenna pattern 31 relative to the conductive plate 14a so that the conductive plate 14a is interposed between them in this instance. Then, the magnetic sheet 40 is applied to the surface of the conductive plate 14a by means of insulating glue (not shown).

With the arrangement of FIG. 40B, part of the magnetic field generated from the conductive plate 14a that is generated in the direction opposite to the antenna pattern 31 is confined to the direction of the antenna pattern 31 by the magnetic sheet 40. Then, as a result, the coupling efficiency is improved.

Table 26 shows the results of a simulation conducted for coupling efficiency (dB) in the case of FIG. 40B, where the same arrangement was used for two instances except the magnetic sheet 40 was employed in one of the instances, whereas no magnetic sheet 40 was employed in the other instance. The parameters same as those listed in Table 24 were used in this simulation. As apparent from Table 26, the coupling efficiency (dB) was improved by using the magnetic sheet 40 also in the simulation of FIG. 40B.

TABLE 26

| | Coupling efficiency |
|---|---|
| Instance where magnetic sheet 40 was employed | −16.07 dB |
| Instance where no magnetic sheet 40 was employed | −17.06 dB |

As described above, a short distance communication system of this embodiment employs the magnetic sheet 40 so that it can improve the coupling efficiency (dB) if compared with an arrangement of not using the magnetic sheet 40.

Figure 41A:
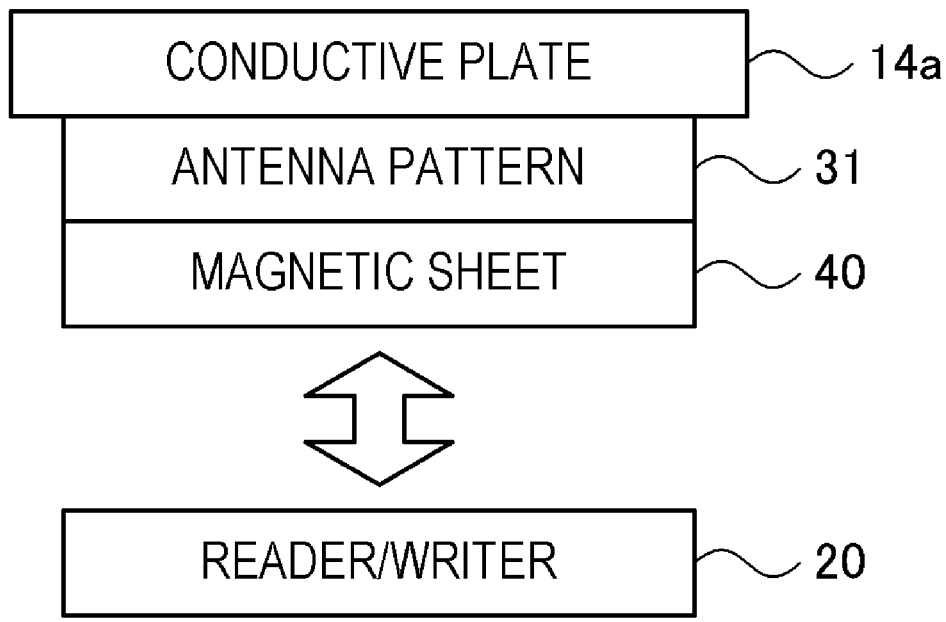
FIGS. 41A and 41B are schematic illustrations of the system configuration of the short distance communication system according to the modification of the eighth embodiment of the present invention.
Figure 41B:
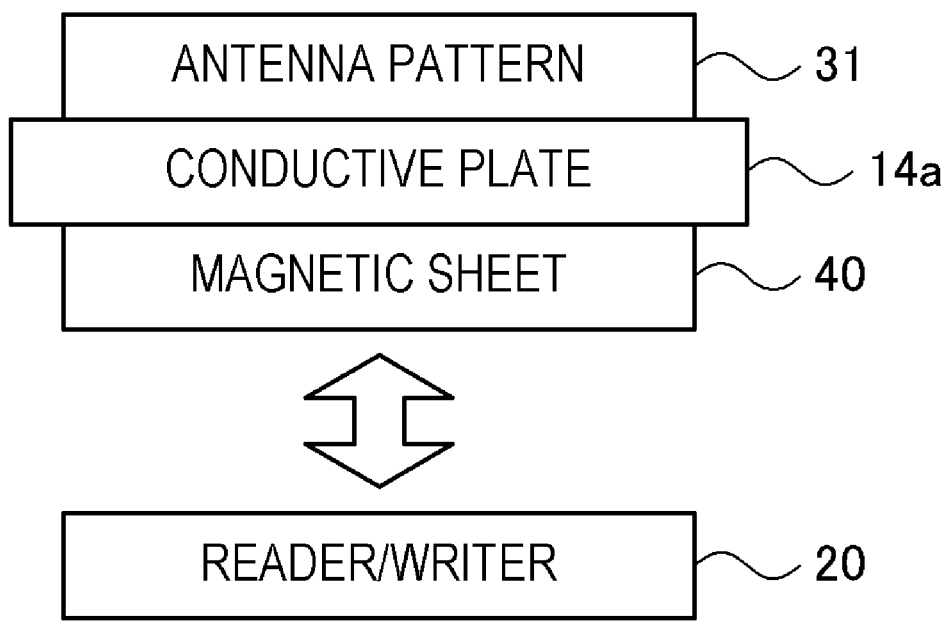

While the magnetic sheet 40 is arranged at a position remotest from the reader/writer 20 in the above-described embodiment, it may alternatively be arranged at a position closest to the reader/writer 20. FIGS. 41A and 41B schematically illustrate specific examples of such an arrangement. FIG. 41A shows an instance where the antenna pattern 31 is arranged at the side of the reader/writer 20 as viewed from the conductive plate 14a. With this arrangement, part of the magnetic field generated from the conductive plate 14a in the direction of the antenna pattern 31 is confined to the direction of the antenna pattern 31 by the magnetic sheet 40 after passing the antenna pattern 31 as in the case of FIG. 40A. Then, as a result, the coupling efficiency is improved. FIG. 41B shows an instance where the conductive plate 14a is arranged at the side of the reader/writer 20 as viewed from the antenna pattern 31. With this arrangement, part of the magnetic field generated from the conductive plate 14a in the direction opposite to the antenna pattern 31 is confined to the direction of the antenna pattern 31 by the magnetic sheet 40 as in the case of FIG. 40B. Then, as a result, the coupling efficiency is improved.

While the sixth embodiment through the eighth embodiment of the present invention are described above as preferred embodiments, the present invention is by no means limited thereto. It may needless to say that the present invention can be embodied in various different ways without departing from the spirit and scope of the present invention.

Figure 42A:
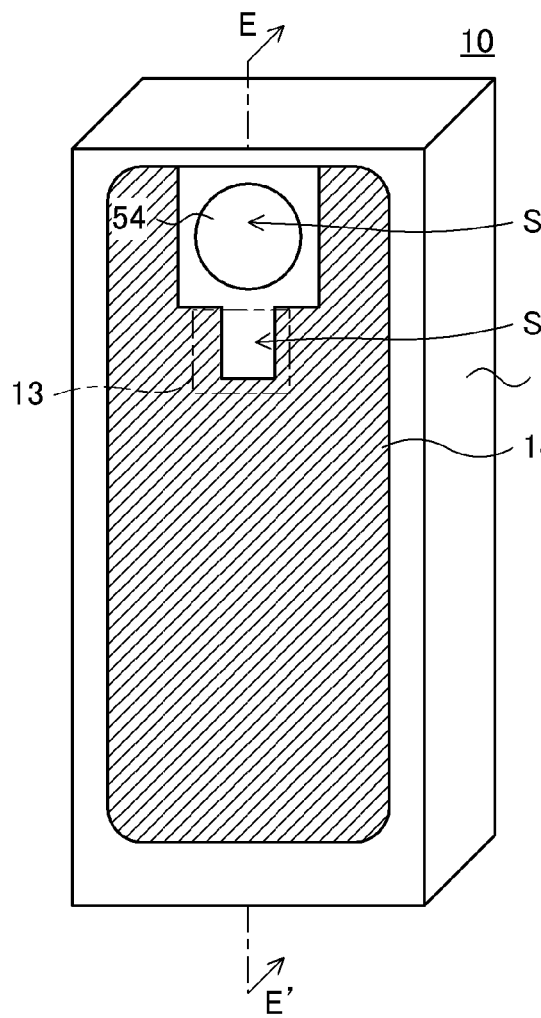
FIG. 42A is a schematic perspective view of a first modified mobile phone obtained by modifying the mobile phone shown in the sixth embodiment.
Figure 42B:
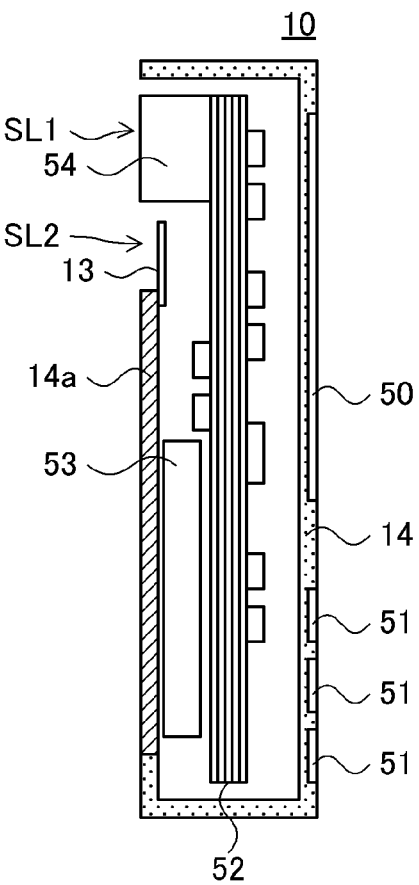
FIG. 42B is a schematic cross-sectional view taken along line E-E' in FIG. 42A.

FIG. 42A is a schematic perspective view of a modified mobile phone 10 obtained by modifying the mobile phone 10 shown in the sixth embodiment. FIG. 42B is a schematic cross-sectional view taken along line E-E' in FIG. 42A. In the case of this modified mobile phone 10, the cabinet 14 is an insulating member typically made of plastic and the conductive plate 14a is formed by a metal plate embedded into the rear surface side of the cabinet 14. Such an arrangement can also be used for the conductive plate 14a.

While the second slit was provided at the bottom side of the first slit in the above-described embodiments, the second slit is only required to be formed at a side of the first slit. In other words, the second slit may be formed at a lateral side of the first slit for example.

Figure 43A:
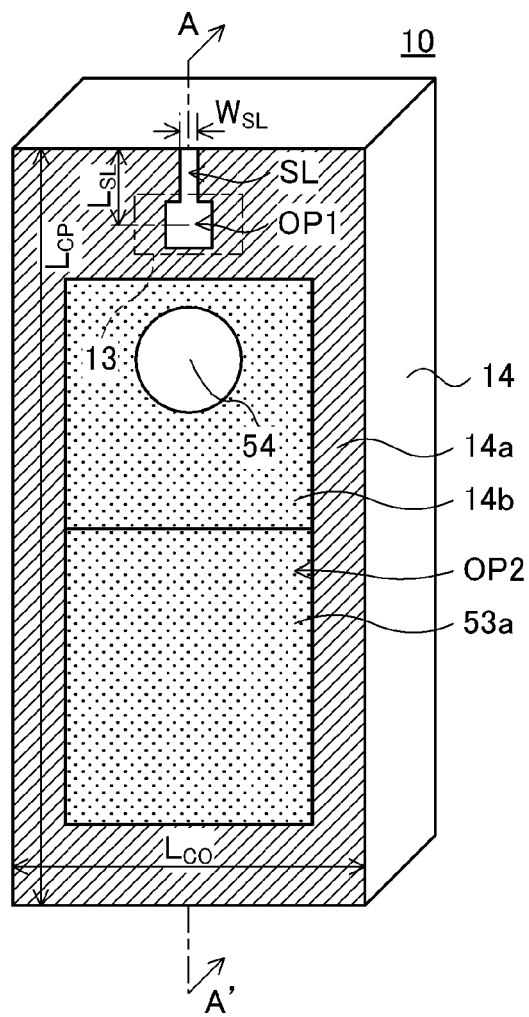
FIG. 43A is a schematic perspective view of a mobile phone to be used in a short distance communication system according to the ninth embodiment of the present invention.
Figure 43B:
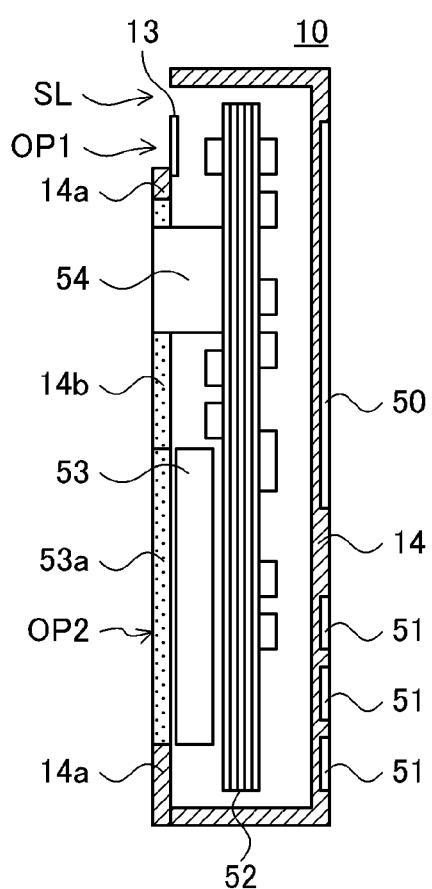
FIG. 43B is a cross-sectional view taken along line A-A' in FIG. 43A.

FIG. 43A is a schematic perspective view of a mobile phone 10 to be used in a short distance communication system according to the ninth embodiment of the present invention. FIG. 43B is a cross-sectional view taken along line A-A' in FIG. 43A. Part of the arrangement shown in FIG. 43B is hatched as in FIG. 43B for easy understanding, although FIG. 43A is not a cross-sectional view. The above description also applies to views that will be described hereinafter.

The short distance communication system according to this embodiment is same as the one according to the first embodiment except that only the mobile phone 10 thereof differs from that of the first embodiment. As shown in FIGS. 43A and 43B, the mobile phone 10 of this embodiment is substantially a rectangular parallelepiped and an LCD 50 and a keypad 51 are arranged on one of the six surfaces thereof. A multilayer substrate 52, a battery 53 and a camera 54 are arranged in the inside of the mobile phone 10 along with the antenna section 13 and the IC chip 12 (not shown in FIGS. 43A and 43B). The multilayer substrate 52 operates as the motherboard of the mobile phone 10 and various electronic circuits including a circuit for communications and a ground layer are formed on the surface and in the inside thereof. A battery cap 53a is provided at the rear surface of the cabinet 14 (the surface opposite to the surface where the LCD 50 and the keypad 51 are arranged out of the six surfaces). The provision of the battery cap 53a makes the battery 53 removable. The lens of the camera 54 is exposed at the rear surface of the cabinet 14. Note that the components other than the antenna section 13 and the IC chip 12 correspond to the main body section 15 shown in FIG. 1.

The cabinet 14 is made of an electroconductive metal material and the conductive plate 14a is formed by utilizing the back surface of the cabinet 14. The conductive plate 14a has a first aperture OP1, a slit SL extending from the first aperture OP1 to an end of the conductive plate 14a and a second aperture OP2 surround by the conductive plate 14a along all the periphery thereof. The lens of the camera 54 and the battery cap 53a both located at the rear surface of the cabinet 14 are arranged in the second aperture OP2. Differently stated, the provision of the second aperture OP2 on the conductive plate 14a makes it possible to mount the camera 54, the battery cap 53a and other components that are exposed at the rear surface in the mobile phone 10. In other words, a structure that minimally obstructs the operation of loading components specific to the mobile phone 10 to be mounted and functionally combined with the proximity type antenna is realized.

In the following description, the length and the width of the slit SL are respectively expressed as $L_{SL}$ and $W_{SL}$ and the area of the first aperture OP1 and that of the second aperture OP2 are respectively expressed as $S_{OP1}$ and $S_{OP2}$. The length of the conductive plate 14a in the extending direction of the slit SL and the length of the conductive plate 14a in the direction orthogonal to the extending direction of the slit SL are respectively expressed as $L_{CP}$ and $L_{CO}$. Note that the length $L_{SL}$ of the slit SL is defined as the length from the central point of the first aperture OP1 to the end of the conductive plate 14a as shown in FIG. 43A. The width $W_{SL}$ of the slit SL is made as narrow as possible within the range where neither an electric conduction is formed between the opposite sides of the slit SL of the conductive plate 14a nor a capacitor is formed by the opposite sides of the conductive plate 14a.

The inside of the second aperture OP2 (the region between the conductive plate 14a and the lens of the camera 54 and other components) may be filled with an insulating member 14b. While the inside of the slit SL and that of the first aperture OP1 are void in FIGS. 43A and 43B, they may be filled with a non-conductive substance such as insulating resin just like the inside of the second aperture OP2. When the insides are filled with a non-conductive substance, the cabinet 14 can be strengthened so much.

FIGS. 43A and 43B also show the position where the antenna section 13 is arranged. As shown in FIGS. 43A and 43B, the antenna section 13 is arranged at a position where at least part of the first aperture OP1 overlaps the antenna pattern 31 in plan view.

With the above-described positional arrangement, the coupling characteristics between the mobile phone 10 that is a non-contact type IC card and the reader/writer 20 are not degraded when the conductive plate 14a, which is a conductive member, is placed in position. Rather, the coupling characteristics are improved if compared with an instance where no conductive plate 14a is provided. This will be described more specifically below.

Figure 44A:
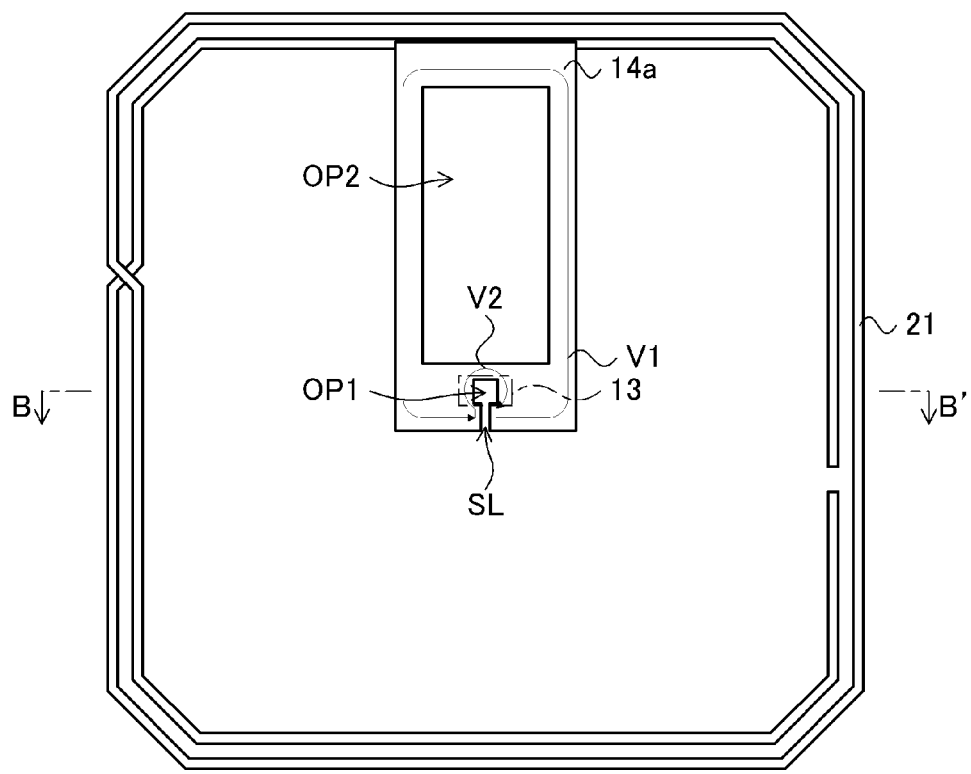
FIG. 44A is an illustration of a spiral coil that forms the proximity type antenna according to the ninth embodiment of the present invention and the conductive plate according to the ninth embodiment of the present invention.

FIG. 44A is an illustration of a spiral coil that forms the proximity type antenna 21 and the conductive plate 14a. The arrowed lines in FIG. 44A indicate the eddy currents that flow in the conductive plate 14a. As indicated by the arrowed lines, as the conductive plate 14a is brought close to the proximity type antenna 21, eddy currents V1 and V2 flow in the conductive plate 14a. The eddy current V1 is an electric current that flows along the edges of the conductive plate 14a (an electric current that flows along the periphery of the second aperture OP2), whereas the eddy current V2 is an electric current that flows around the first aperture OP1. Note that V1 and V2 do not represent any current values and are merely identification symbols for identifying the electric currents.

Figure 44B:
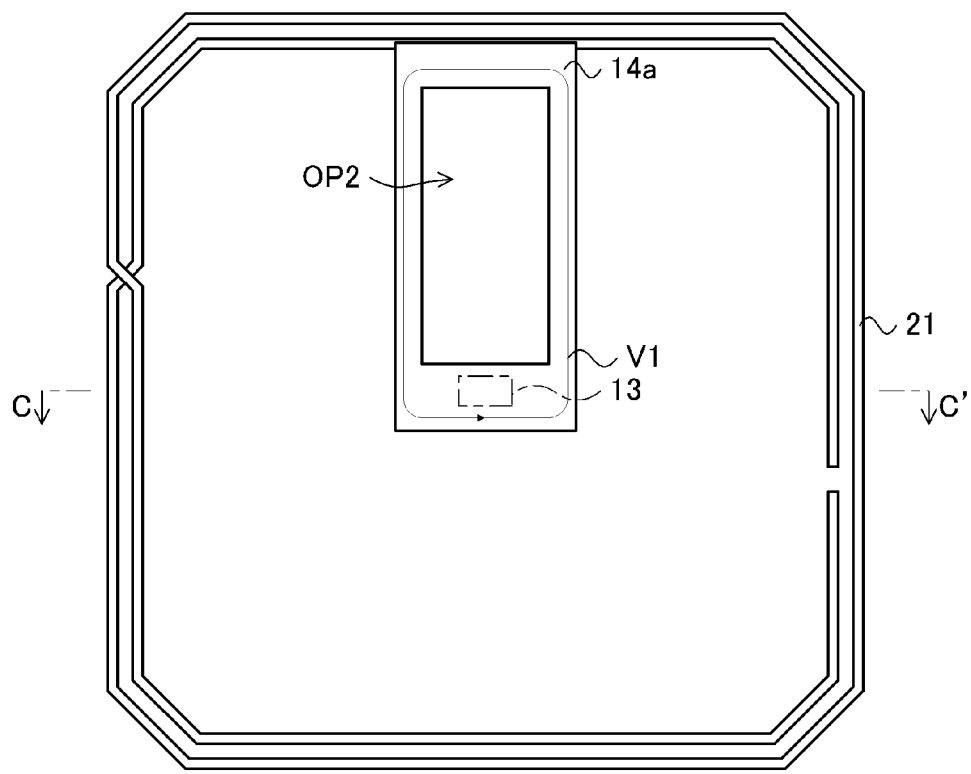
FIG. 44B shows an instance where a conductive plate having neither an aperture nor a slit is employed.

FIG. 44B shows an instance where a conductive plate 14a having neither a first aperture OP1 nor a slit SL is employed as a comparative example. As will be understood by comparing the comparative example and FIG. 44A, the eddy current V2 is an electric current that flows in the conductive plate 14a only when a first aperture OP1 and a slit SL are provided. In other words, because a slit SL is there, the eddy current V1 cannot make a full turn along the edges of the conductive plate 14a and therefore makes a detour to bypass the slit SL. Since a first aperture OP1 is arranged on the bypass (at the inner end of the slit SL), an eddy current V2 is generated so as to flow in the direction opposite to the flowing direction of the eddy current V1.

Since the eddy currents that flow in the conductive plate 14a are generated by the magnetic field generated from the proximity type antenna 21, the eddy current V1 flows in the direction of generating a magnetic field that weakens the former magnetic field. To the contrary, the eddy current V2 flows in the direction opposite to the flowing direction of the eddy current V1 and hence it generates a magnetic field that intensifies the magnetic field generated from the proximity type antenna 21. Therefore, the magnetic field is intensified as a result of that the eddy current V2 flows. The net results will be that the coupling characteristics are improved if compared with the instance where the conductive plate 14a has neither a first aperture OP1 nor a slit SL and also with the instance where no conductive plate 14a is provided.

Figure 45A:
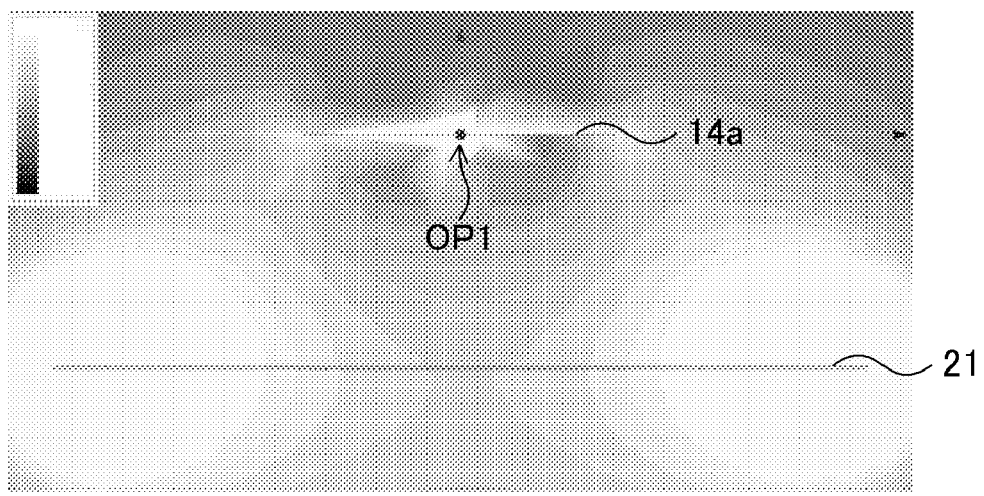
FIGS. 45A and 45B show the results obtained by simulating the magnetic field near the proximity type antenna and the conductive plate according to the ninth embodiment of the present invention.
Figure 45B:
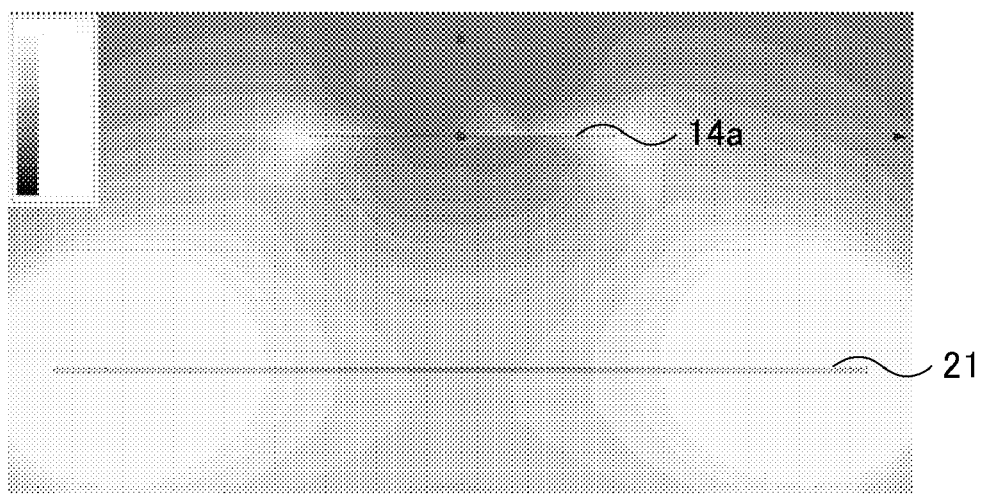
Figures 46A, 46B, 46C, 46D, 46E:
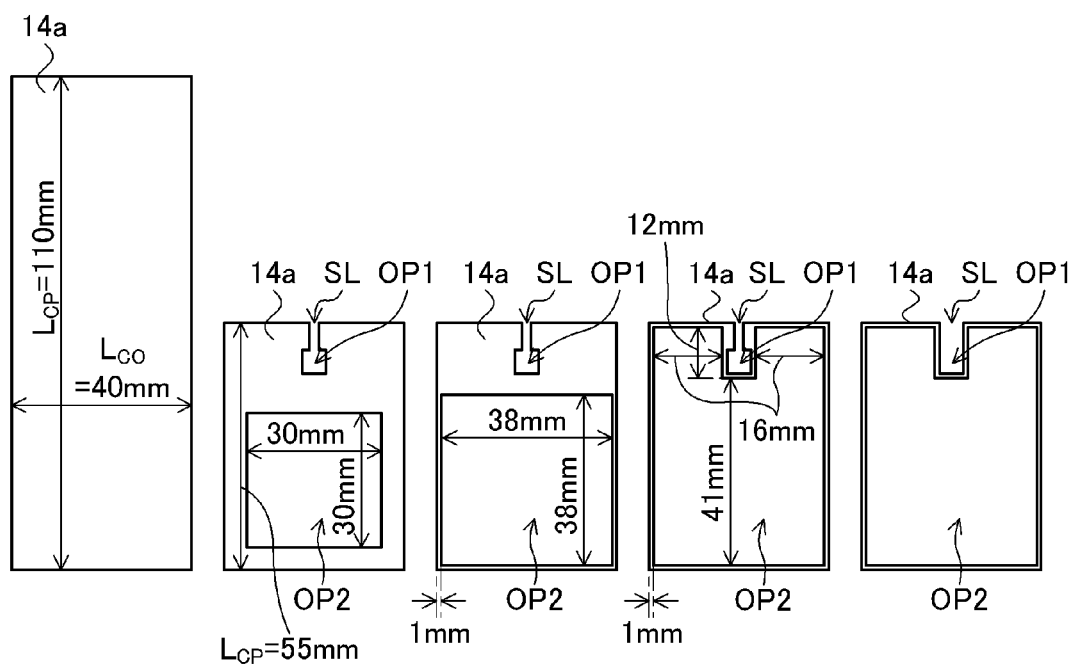
FIGS. 46A through 46E shows the conductive plates used in a simulation in order to show the influence of the second aperture according to the ninth embodiment of the present invention relative to the coupling efficiency.

FIGS. 45A and 45B show the results obtained by simulating the magnetic field near the proximity type antenna 21 and the conductive plate 14a. FIG. 45A shows the magnetic field along the cross section taken along line B-B' in FIG. 44A and FIG. 45B shows the magnetic field along the cross section taken along line C-C' in FIG. 44B.

In FIGS. 45A and 45B, the light-colored areas are areas where the magnetic field is strong. As will be understood by seeing these views, a strong magnetic field is generated around the first aperture OP1 but no such magnetic field is found when no first aperture OP1 is provided. This is generated by the above-described eddy current V2 and the coupling characteristics are improved when a conductive plate 14a having a first aperture OP1 and a slit SL is employed because such a magnetic field is generated.

As described above, the coupling characteristics between the mobile phone 10 that is a non-contact type IC card and the reader/writer 20 are improved by providing the conductive plate 14a with a first aperture OP1 and a slit SL.

Now, the influence of the second aperture OP2 on the coupling characteristics will be described below by referring to the results obtained by a simulation of the coupling efficiency observable between the mobile phone 10 that is a non-contact type IC card and the reader/writer 20. In this simulation, the size of the second aperture OP2 was employed as variable parameter and the tendency of change of the coupling efficiency relative to the change in the size of the second aperture OP2 was observed.

In this simulation and in each of the simulations that will be described hereinafter, the proximity type antenna 21 had a size of 110 mm square and the distance between the proximity type antenna 21 and the antenna section 13 was made to be equal to 30 mm, while the thickness of the conductive plate 14a was made to be equal to 35 μm. The positional arrangement of the conductive plate 14a and the antenna pattern 31 were so determined as to make the central point of the proximity type antenna 21, that of the first aperture OP1 and that of the inner periphery of the antenna pattern 31 agree with one another in plan view.

Table 27 shows the specific values of parameters used for the conductive plates 14a of six patterns in the simulation. In the table, the symbols (mm etc.) shown below the respective parameters represent the units of the parameters. This description also applies to all the tables shown hereinafter. In short, the pattern (x) out of the six patterns shows an instance where no conductive plate 14a was employed. FIGS. 46A through 46E shows plan views of the conductive plates 14a of the other patterns (a) through (e). Pattern (a) shows an instance where the apertures and the slit are removed from the conductive plate 14a. The areas $S_{OP2}$ of second apertures OP2 of the patterns (b) through (d) are made to increase sequentially in the above listed order. The size of the second aperture OP2 of each of the patterns (c) and (d) is so determined that the width of the area of the electroconductive substance left between the outer periphery of the conductive plate 14a and that of the second aperture OP2 is equal to 1 mm. Particularly in the pattern (d), the width of the area of the electroconductive substance is 1 mm at all the four sides of the conductive plate 14a except the lateral sides of the slit SL. As a result, the amount of the electroconductive substance to be used for the conductive plate 14a can be reduced and, at the same time, the second aperture OP2 can have a large area so that a wide region can be secured for loading components specific to the mobile phone 10. When a conductive plate 14a is formed by burying an electroconductive pattern into an insulating cabinet 14 as in the case of the fifth modified conductive plate that will be described hereinafter by referring to FIGS. 52A and 52B, the use of the pattern (d) provides an advantage of not being detrimental to the design of the mobile phone 10 because the conductive plate 14a is arranged along the edges of the rear surface of the cabinet 14. The pattern (e) differs from the pattern (d) in that the width $W_{SL}$ of the slit SL is made greater than its counterpart of the latter pattern and equal to the width of the first aperture OP1. While the pattern (e) may be inferior to the pattern (d) in terms of coupling efficiency, it provides an advantage of easy machining because it has a simple profile. While the value of $L_{CP}$ of the pattern (a) is twice as large as that of any other pattern, this value is selected only for the sake of convenience of simulation and did not significantly affect the results of the simulation.

TABLE 27

| | $L_{CP}$ mm | $L_{CO}$ mm | $S_{OP1}$ mm² | $L_{SL}$ mm | $W_{SL}$ mm | $S_{OP2}$ mm² | $L_{OX}$ mm | $L_{OY}$ mm | $L_{IX}$ mm | $L_{IY}$ mm |
|---|---|---|---|---|---|---|---|---|---|---|
| (x) | 0 | 0 | — | — | — | — | 6 | 6 | 2.6 | 2.6 |
| (a) | 110 | 40 | 0 | 0 | 0 | 0 | | | | |
| (b) | 55 | | 4 × 4 | 10 | 0.2 | 30 × 30 | | | | |
| (c) | | | | | | 38 × 38 | | | | |
| (d) | | | | | | 41 × 38 | | | | |
| (e) | | | | | 4 | +12 × 32 | | | | |

Table 28 shows the results of the simulation for each of the patterns shown in Table 27. As will be understood by seeing the table, the coupling efficiency was best with the pattern (b) and worst with the pattern (a). The results reflect the effect of providing the conductive plate 14a with a first aperture OP1 and a slit SL. As for the patterns (b) through (d) having a second aperture OP2, the coupling efficiency falls as the area of the second aperture OP2 increases. The coupling efficiency of the pattern (e) having a large width $W_{SL}$ is worse than any of the patterns (b) through (d). However, coupling efficiency of the pattern (e) is better than that of the pattern (x) having no conductive plate 14a.

TABLE 28

| | Coupling efficiency |
|---|---|
| (x) | −28.86 dB |
| (a) | −48.80 dB |
| (b) | −16.31 dB |

TABLE 28-continued

| | Coupling efficiency |
|---|---|
| (c) | −16.66 dB |
| (d) | −16.85 dB |
| (e) | −17.77 dB |

From the above-described results, it is safe to say that the effect of improving the coupling characteristics by providing a first aperture OP1 and a slit SL is satisfactory even when a second aperture OP2 is provided, although the second aperture OP2 is preferably not very large. This is because, when the second aperture OP2 is too large, the width of the area of the electroconductive substance becomes too narrow for an eddy current V1 to flow and hence the flow of the eddy current V1 is obstructed. Differently stated, the area of the electroconductive substance where the second aperture OP2 is to be formed preferably has a large width.

The pattern (c) provides a better result if compared with the pattern (d) probably because the area of the electroconductive substance is too small at and around the first aperture OP1 and the flow of an eddy current V2 is obstructed in the pattern (d). Therefore, it is safe to say that the second aperture OP2 is separated from the first aperture OP1 as far as possible in order to secure a certain area for the electroconductive substance around the first aperture OP1.

Now, preferable materials of the conductive plate 14a will be described below.

Table 29 shows the materials of the conductive plates 14a tested in a simulation conducted to show preferable materials for the conductive plate 14a and the specific values of the electro-conductivities $C_{14a}$ thereof and other parameters of this simulation. In this simulation, conductive plates 14a made of various different materials were employed and the tendency of change of the coupling efficiency relative to the electro-conductivities of the different materials was observed.

TABLE 29

| Material | $C_{14a}$ $10^7$ S/m | $L_{CP}$ mm | $L_{CO}$ mm | $S_{OP1}$ mm² | $W_{SL}$ mm | $L_{SL}$ mm | $S_{OP2}$ mm² | $L_{OX}$ mm | $L_{OY}$ mm | $L_{IX}$ mm | $L_{IY}$ mm |
|---|---|---|---|---|---|---|---|---|---|---|---|
| Cu | 5.800 | 55 | 40 | 4 × 4 | 0.2 | 10 | 30 × 30 | 6 | 6 | 2.6 | 2.6 |
| Al | 3.800 | | | | | | | | | | |
| Mg | 2.250 | | | | | | | | | | |
| Brass | 1.500 | | | | | | | | | | |
| Fe | 1.030 | | | | | | | | | | |
| Bronze | 1.000 | | | | | | | | | | |
| Lead | 0.500 | | | | | | | | | | |
| Ti | 0.182 | | | | | | | | | | |
| SUS | 0.110 | | | | | | | | | | |

According to the results of the simulation (not shown), the coupling efficiency was high when the electro-conductivity $C_{14a}$ was high and held stable when the electro-conductivity $C_{14a}$ was not less than $1 \times 10^7$ S/m except the single instance where Fe (electro-conductivity $C_{14a} = 1.030 \times 10^7$ S/m) was employed for the material of the conductive plate 14a. It was also found that the coupling efficiency was remarkably low when Fe was employed for the material of the conductive plate 14a if compared with instances where materials showing a substantially same electro-conductivity were employed. This will be thought to be due to that Fe is a ferromagnetic substance (whereas each of the other materials is either a paramagnetic substance or a diamagnetic substance). Thus, the conductive plate 14a is preferably made of a material that is paramagnetic or diamagnetic and shows an electro-conductivity $C_{14a}$ of not less than $1 \times 10^7$ S/m.

Now, modified conductive plates 14a of this embodiment will be sequentially described below.

Figure 47A:
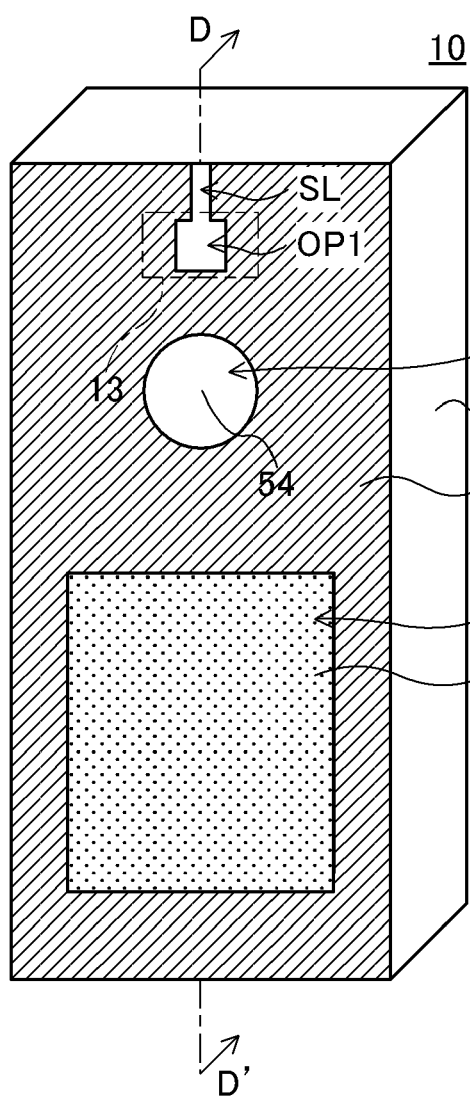
FIG. 47A is a schematic perspective view of a mobile phone having a first modified conductive plate of the ninth embodiment of the present invention.
Figure 47B:
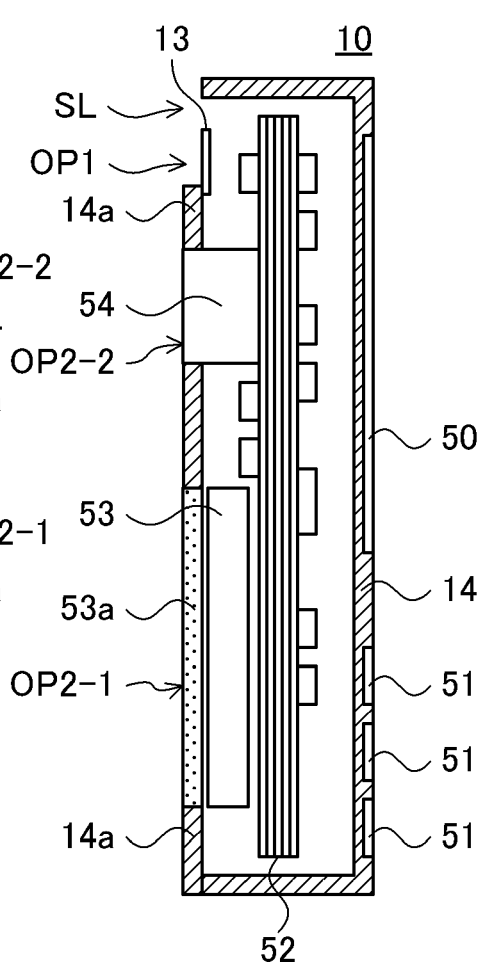
FIG. 47B is a cross-sectional view taken along line D-D' in FIG. 47A.

FIG. 47A is a schematic perspective view of a mobile phone 10 having a first modified conductive plate 14a. FIG. 47B is a cross-sectional view taken along line D-D' in FIG. 47A. In the first modified conductive plate 14a, the second aperture OP2 is divided into second aperture OP2-1 that corresponds to battery cap 53a and second aperture OP2-2 that corresponds to the lens of camera 54. Differently stated, the first modified conductive plate 14a has a third aperture (an aperture corresponding to the lens of the camera 54) in addition to a second aperture OP2 (an aperture corresponding to the battery cap 53). With this arrangement, the use of the insulating member 14b is no longer necessary and the total area of the second apertures OP2 can be reduced. While the second aperture OP2 is divided into two in this instance, the number of second apertures OP2 may be appropriately selected according to the number of components to be arranged on the rear surface of the cabinet 14. The profile of each of the divided second apertures OP2 may be appropriately determined according to the component to be arranged in it.

Figure 48A:
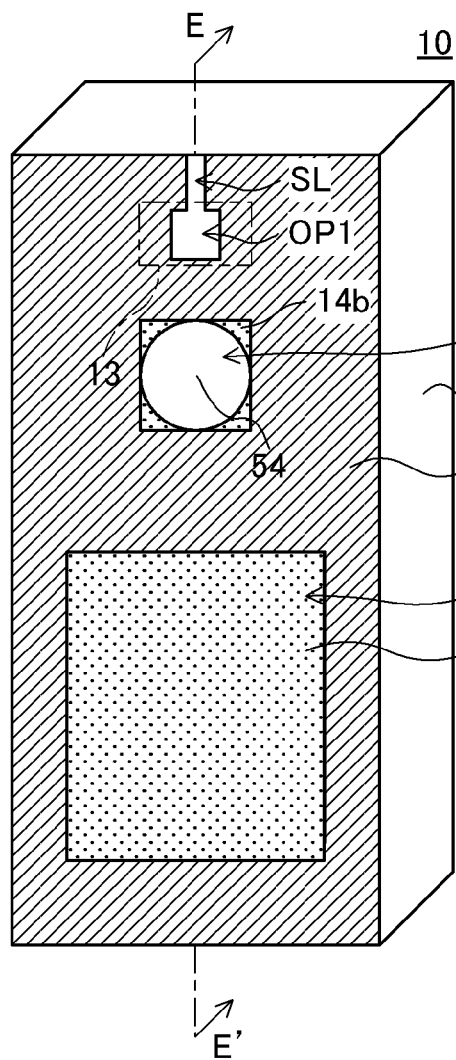
FIG. 48A is a schematic perspective view of a mobile phone having a second modified conductive plate of the ninth embodiment of the present invention.
Figure 48B:
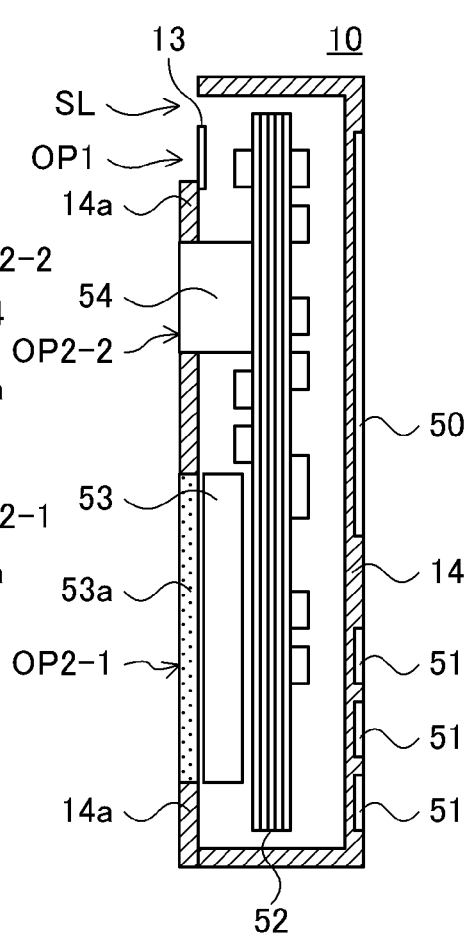
FIG. 48B is a cross-sectional view taken along line E-E' in FIG. 48A.

FIG. 48A is a schematic perspective view of a mobile phone 10 having a second modified conductive plate 14a. FIG. 48B is a cross-sectional view taken along line E-E' in FIG. 48A. This modified conductive plate 14a is same as the first modified conductive plate 14a in that it has two second apertures OP2-1 and OP2-2 but differs from the first modified conductive plate 14a in that the second aperture OP2-2 is square. Since the lens of the camera 54 of this embodiment is round, a gap is produced in the second aperture OP2 and the gap is filled with an insulating member 14b. Thus, a conductive plate 14a can be manufactured without considering the profile of the component to be arranged in the second aperture OP2 by using an insulating member 14b to fill the gap and hence the process of manufacturing the conductive plate 14a can be simplified.

Figure 49A:
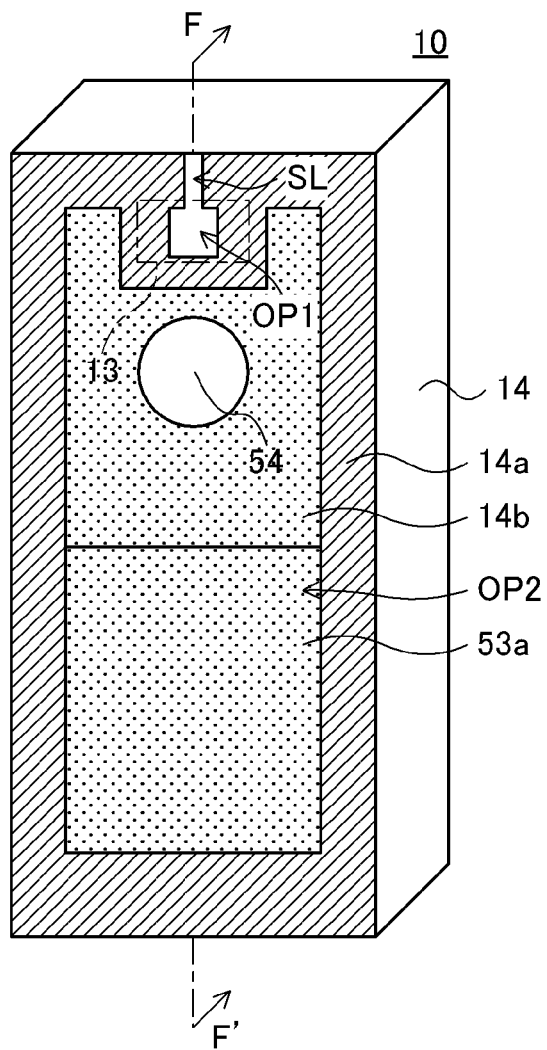
FIG. 49A is a schematic perspective view of a mobile phone having a third modified conductive plate of the ninth embodiment of the present invention.
Figure 49B:
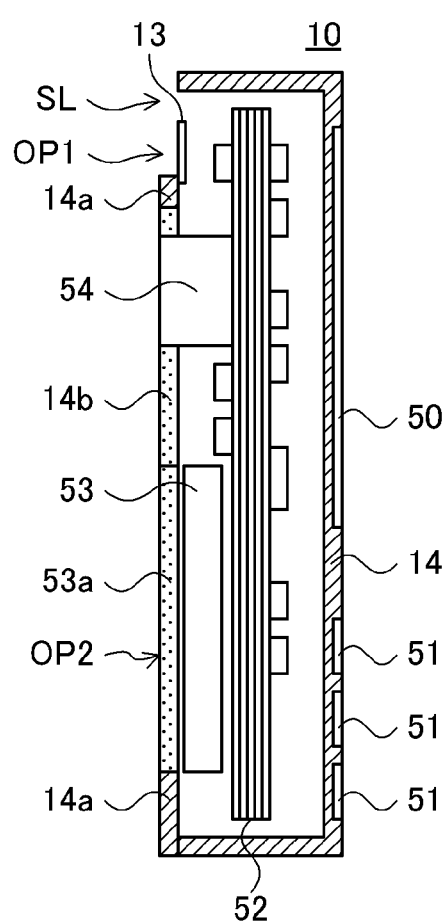
FIG. 49B is a cross-sectional view taken along line F-F' in FIG. 49A.

FIG. 49A is a schematic perspective view of a mobile phone 10 having a third modified conductive plate 14a. FIG. 49B is a cross-sectional view taken along line F-F' in FIG. 49A. By comparing FIG. 49A with FIG. 43A, it will be understood that the area $S_{OP2}$ of the second aperture OP2 of this modified conductive plate 14a is large if compared with the instance of FIG. 43A. As will be clear from the results of the simulation conducted on the conductive plates 14a shown in FIGS. 46C and 46D, an excellent coupling characteristics can be obtained when the area $S_{OP2}$ of the second aperture OP2 is made large as shown in FIG. 49A if compared with an instance where no conductive plate 14a is employed. Thus, a conductive plate 14a having a relatively large second aperture OP2 like this modified conductive plate 14a can be adopted for the purpose of the present invention.

Figure 50A:
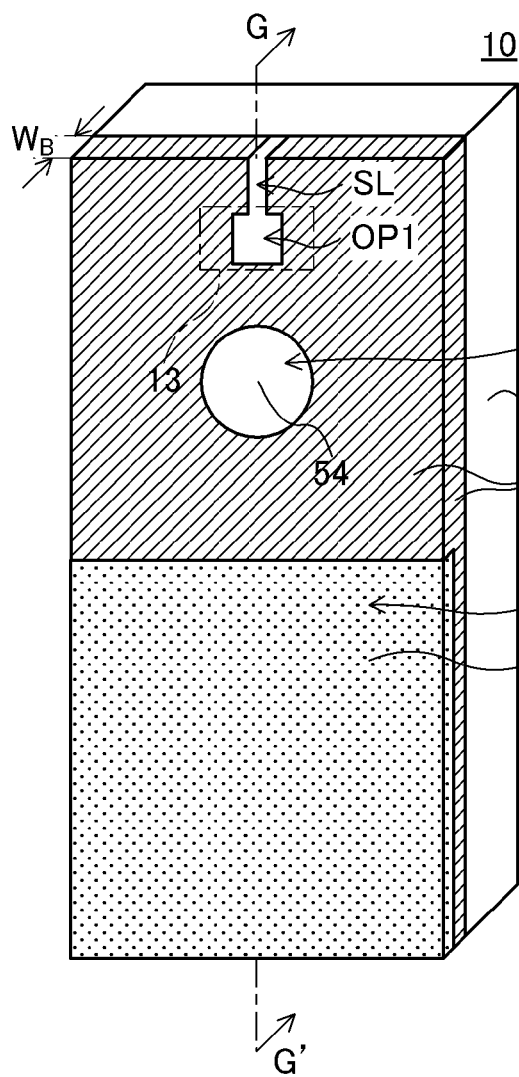
FIG. 50A is a schematic perspective view of a mobile phone having a fourth modified conductive plate of the ninth embodiment of the present invention.
Figure 50B:
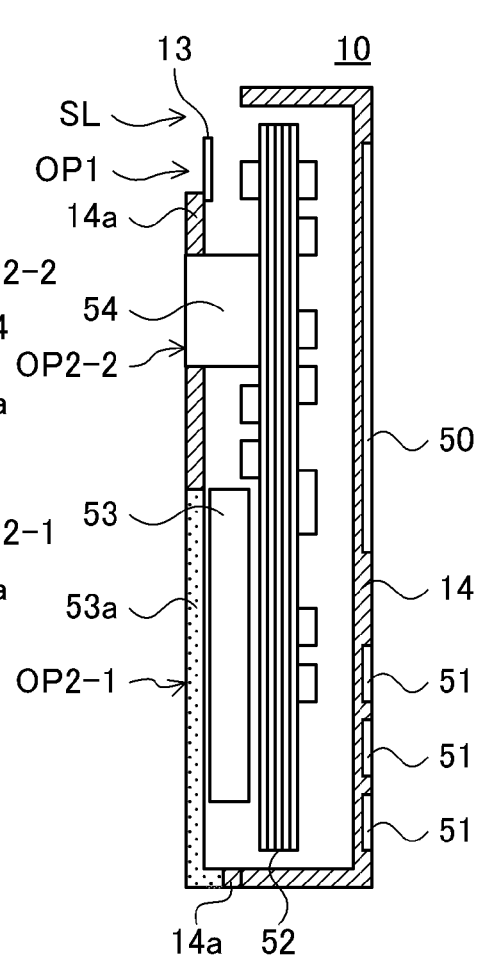
FIG. 50B is a cross-sectional view taken along line G-G' in FIG. 50A.

FIG. 50A is a schematic perspective view of a mobile phone 10 having a fourth modified conductive plate 14a. FIG. 50B is a cross-sectional view taken along line G-G' in FIG. 50A. This modified conductive plate 14a extends not only in the rear surface to the lateral surfaces of the cabinet 14 by a width of $W_B$ from the rear surface. In other words, the edges of the conductive plate 14a are bent so as to move away from the reader/writer 20 by a distance equal to the width of $W_B$. The slit SL is also extended to the lateral side to the corresponding end of the conductive plate 14a so as to move away from the reader/writer 20.

By using a conductive plate 14a that is bent along the edges in the above-described manner, the battery cap 53a can be broadened to the lateral surfaces as shown in FIGS. 50A and 50B. Thus, mobile phone 10 can enjoy a higher degree of freedom for its design. Additionally, an effect of broadened directivity of coupling characteristics can be obtained as will be described in greater detail hereinafter.

Figure 51:
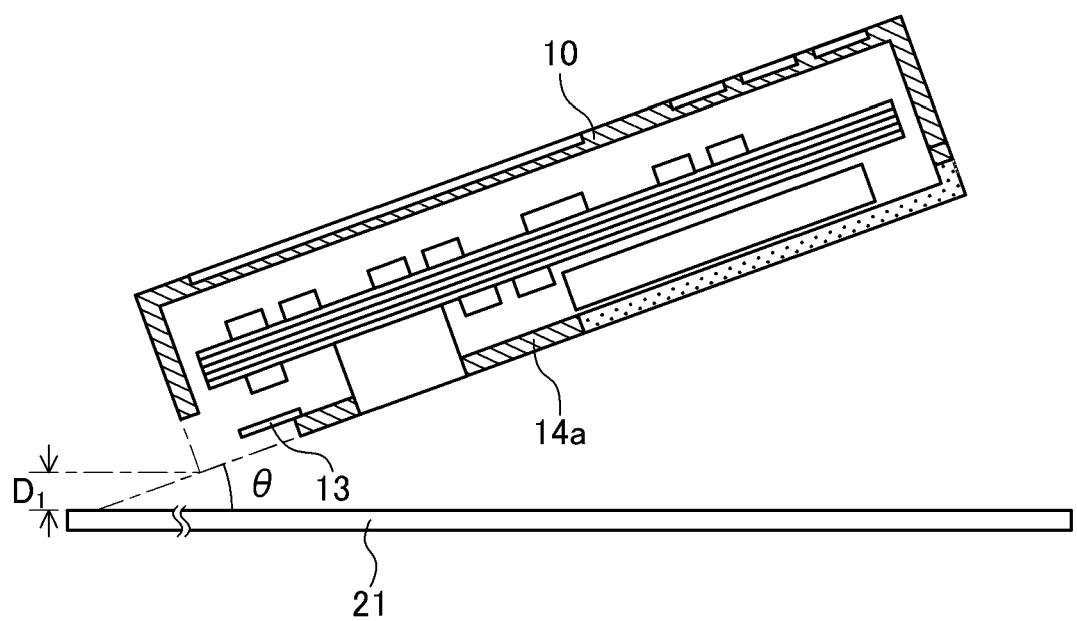
FIG. 51 is a schematic illustration of the angle that was employed in the simulation showing the expansion effect of the directivity of coupling characteristics.

FIG. 51 is a schematic illustration of the angle θ that was employed in this simulation. The cross-sectional view of the mobile phone 10 shown in FIG. 51 is obtained by tilting the cross-sectional view shown in FIG. 50B. In actual scenes where the mobile phone 10 is operated, the mobile phone 10 and the proximity type antenna 21 of the reader/writer 20 may not necessarily be in parallel with each other as shown in FIG. 51 but may be arranged to show an angle θ(≠0°). In this simulation, this angle θ was employed as variable parameter and the tendency of change of the coupling efficiency relative to the change in the angle θ was observed.

The object of this simulation was to demonstrate the effect of using a conductive plate 14a that are bent along the edges thereof. In this simulation, a width of $W_B$=0 mm and that of $W_B$=3 mm were used for the bent part. For the purpose of comparison, an instance where the conductive plate 14a was removed (the cabinet 14 of the mobile phone 10 including the part corresponding to the conductive plate 14a was made of a non-conductive material) was also observed in the simulation.

Table 30 shows the specific values of the parameters of this simulation. Although not shown in Table 31 for the reason of the available space, $L_{OX}$, $L_{OY}$, $L_{IX}$ and $L_{IY}$ were 6 mm, 6 mm, 2.6 mm and 2.6 mm respectively. In this simulation, the position of the antenna section 13 relative to the conductive plate 14a was so determined that the central point of the first aperture OP1 and the central point of the inner periphery of the antenna pattern 31 agreed with each other in plan view. Additionally, the antenna section 13 was located at the same position also in the instance where the conductive plate 14b was removed. The position of the mobile phone 10 relative to the proximity type antenna 21 was so selected as to make the central point of the proximity type antenna 21 agree with the central point of the inner periphery of the antenna pattern 31 in plan view and the minimum distance $D_1$ between the proximity type antenna 21 and the mobile phone 10 (see FIG. 51) show a constant value.

TABLE 30

| | $θ_2$ ° | $W_B$ mm | $L_{CP}$ mm | $L_{CO}$ mm | $S_{OP1}$ mm² | $L_{SL}$ mm | $S_{OP2}$ mm² |
|---|---|---|---|---|---|---|---|
| Instance where conductive plate 14a was removed | 0 | | | | — | | |
| | 30 | | | | | | |
| | 45 | | | | | | |
| | 60 | | | | | | |
| | 90 | | | | | | |

TABLE 30-continued

| | $θ_2$ ° | $W_B$ mm | $L_{CP}$ mm | $L_{CO}$ mm | $S_{OP1}$ mm² | $L_{SL}$ mm | $S_{OP2}$ mm² |
|---|---|---|---|---|---|---|---|
| Instance where conductive plate 14a was used | 0 | 0 | 55 | 40 | 4 × 4 | 10 | 30 × 30 |
| | 30 | | | | | | |
| | 45 | | | | | | |
| | 60 | | | | | | |
| | 90 | | | | | | |
| | 0 | 3 | | | | | |
| | 30 | | | | | | |
| | 45 | | | | | | |
| | 60 | | | | | | |
| | 90 | | | | | | |

According to the results of the simulation (not shown), the coupling efficiency fell only to a small extent relative to the increase of the angle θ when the width $W_B$ of the bent part was 3 mm and particularly when the angle θ was not less than 60° if compared with other instances. This fact indicates that the use of a conductive plate 14a having bent edges broadens the directivity of coupling characteristics.

While the second aperture OP2-1 of this modified conductive plate spreads across the rear surface and extends to the lateral surfaces of the cabinet 14, a mobile phone 10 may alternatively have a second aperture OP2 formed only at a lateral surface of the cabinet 14. With such an arrangement, a jack, a charging terminal and other components can be arranged on the rear surface of the cabinet 14.

Figure 52A:
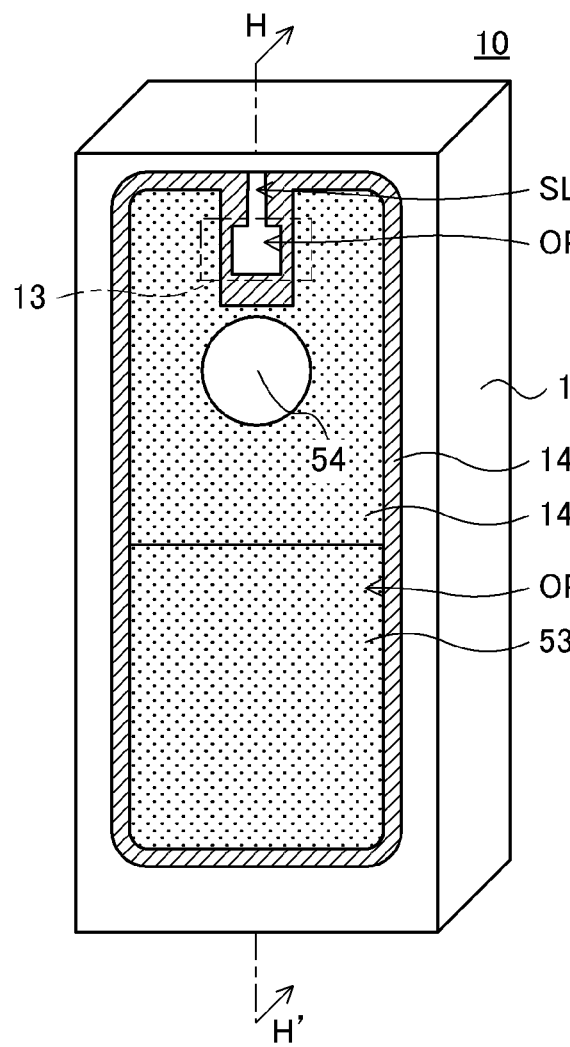
FIG. 52A is a schematic perspective view of a mobile phone having a fifth modified conductive plate of the ninth embodiment of the present invention.
Figure 52B:
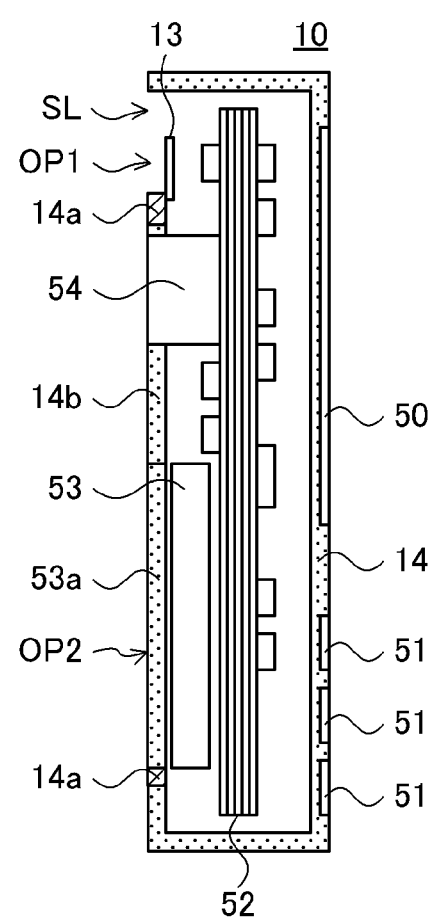
FIG. 52B is a cross-sectional view taken along line H-H' in FIG. 52A.
Figures 53A, 53B:
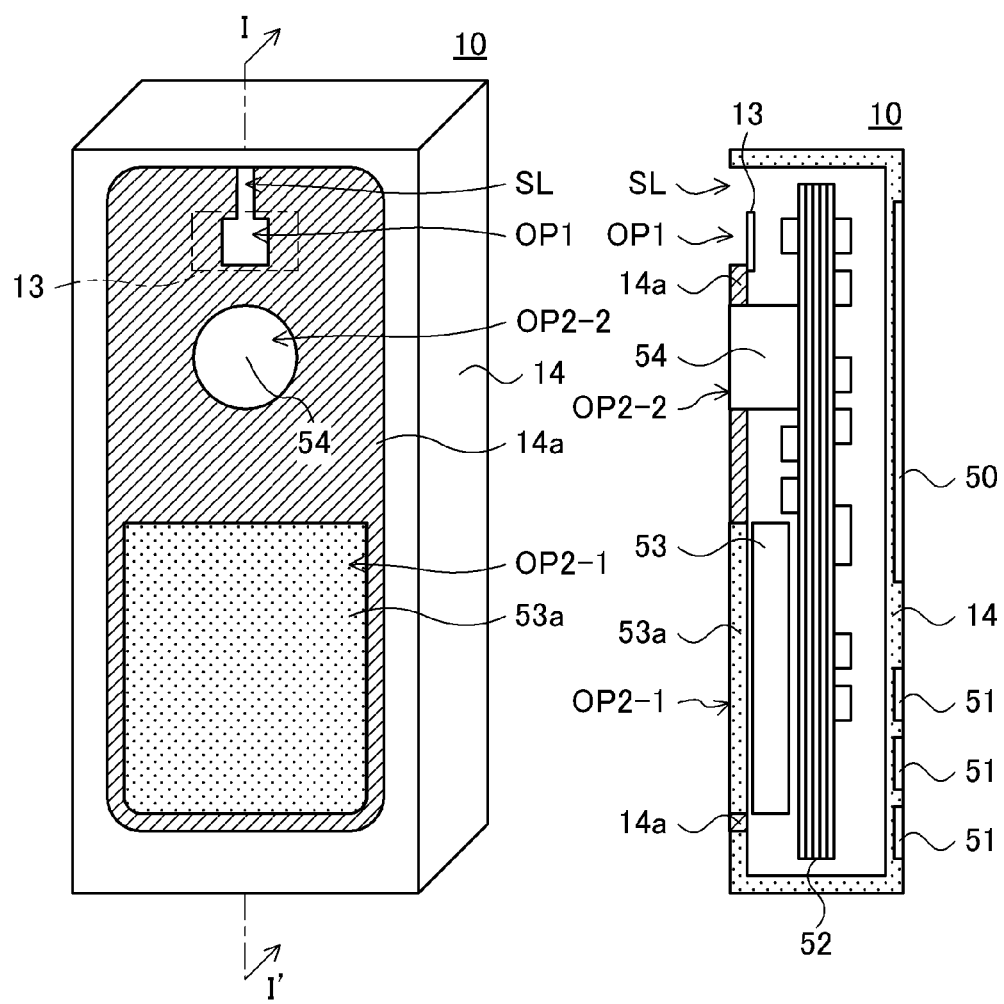
FIG. 53A is a schematic perspective view of a mobile phone having a sixth modified conductive plate of the ninth embodiment of the present invention.
FIG. 53B is a cross-sectional view taken along line I-I' in FIG. 53A.

FIG. 52A is a schematic perspective view of a mobile phone 10 having a fifth modified conductive plate 14a. FIG. 52B is a cross-sectional view taken along line H-H' in FIG. 52A. FIG. 53A is a schematic perspective view of a mobile phone 10 having a sixth modified conductive plate 14a. FIG. 53B is a cross-sectional view taken along line I-I' in FIG. 53A. The cabinets 14 of the fifth and sixth modified conductive plates 14a and those of the seventh and eighth modified conductive plates 14a, which will be described hereinafter, are made of an insulating material and the conductive plates 14a are formed by means of an electroconductive pattern embedded in the rear surface side of the cabinet 14.

Each of the fifth and sixth modified conductive plates 14a is similar to the third and first modified conductive plates 14a, respectively. In other words, when the cabinet 14 is made of an insulating material, a structure similar to the one in which the cabinet 14 is made of an electroconductive material can be obtained by embedding an electroconductive pattern into the rear surface side of the cabinet 14. It may be needless to say that an electroconductive pattern may be bonded to the rear surface of the cabinet 14 instead of being embedded into the rear surface side of the cabinet 14.

Figure 54A:
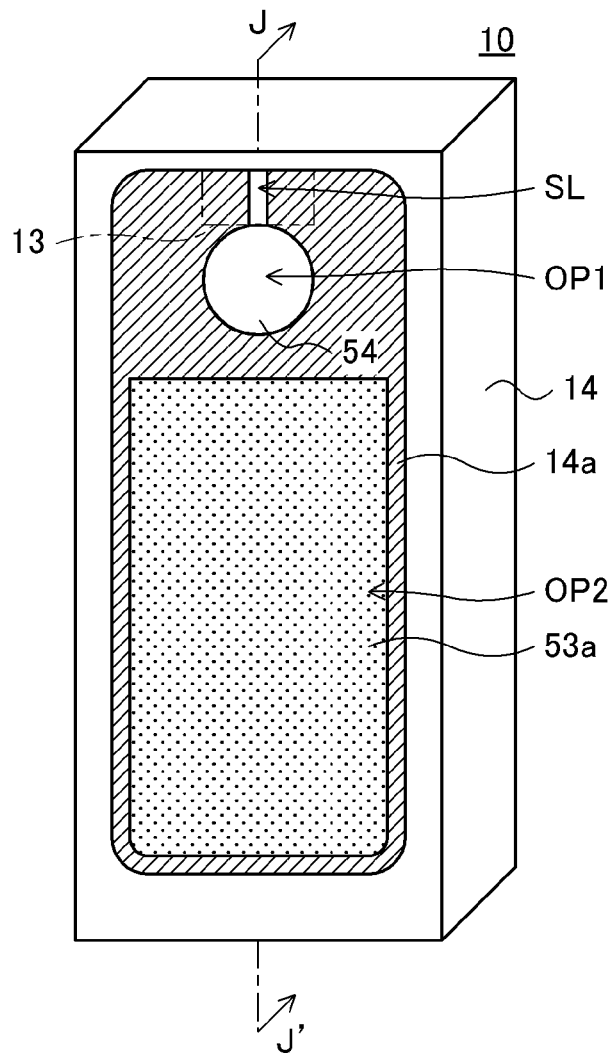
FIG. 54A is a schematic perspective view of a mobile phone having a seventh modified conductive plate of the ninth embodiment of the present invention.
Figure 54B:
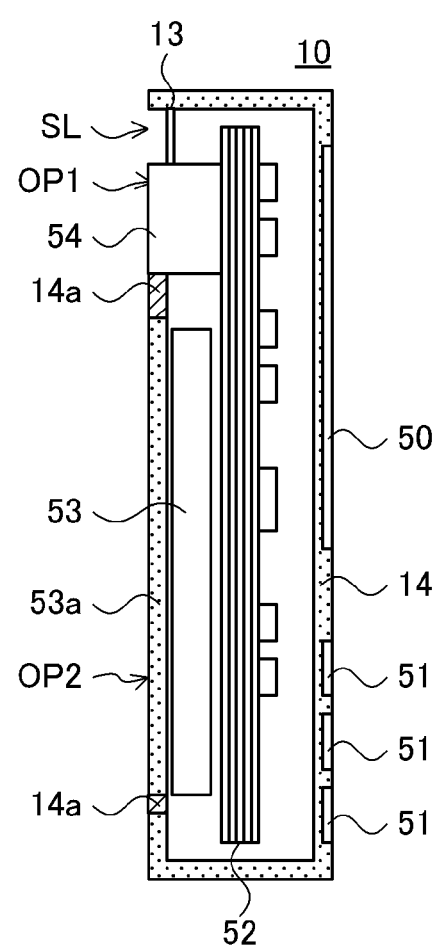
FIG. 54B is a cross-sectional view taken along line J-J' in FIG. 54A.

FIG. 54A is a schematic perspective view of a mobile phone 10 having a seventh modified conductive plate 14a. FIG. 54B is a cross-sectional view taken along line J-J' in FIG. 54A. This modified conductive plate 14 shows an arrangement where the position of the lens of the camera 54 is located close to the top side of the mobile phone 10 when compared with the above-described arrangements and hence no space is available for the first aperture OP1 unlike those arrangements.

As shown in FIGS. 54A and 54B, the lens of the camera 54 is arranged in the inside of the first aperture OP1 of the seventh modified conductive plate 14a. As for the antenna section 13, at least part of the slit SL overlaps the antenna pattern 31 in plan view. Since the eddy current V2 flows to the opposite sides of the slit SL, this arrangement can also suppress degradation of coupling characteristics.

Figure 55A:
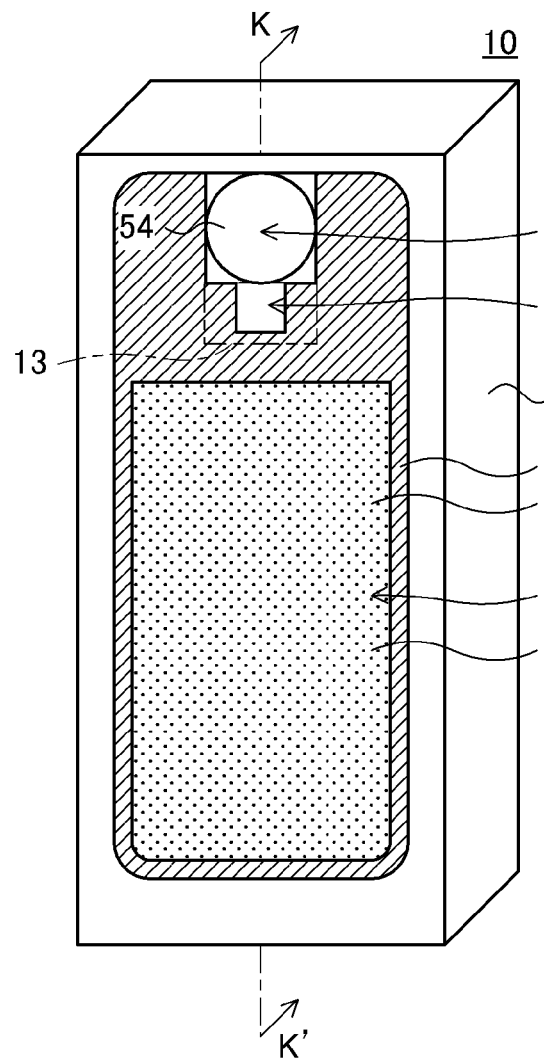
FIG. 55A is a schematic perspective view of a mobile phone having a eighth modified conductive plate of the ninth embodiment of the present invention.

FIG. 55A is a schematic perspective view of a mobile phone 10 having an eighth modified conductive plate 14a.

Figure 55B:
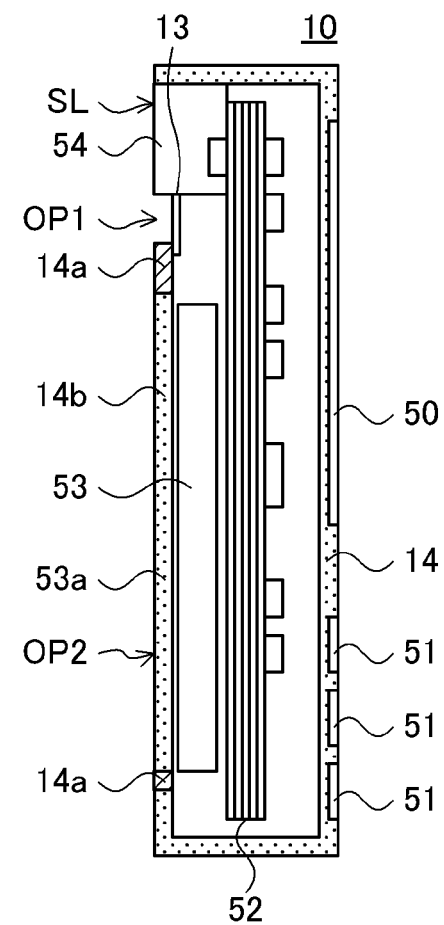
FIG. 55B is a cross-sectional view taken along line K-K' in FIG. 55A.

FIG. 55B is a cross-sectional view taken along line K-K' in FIG. 55A. This modified conductive plate 14a shows an arrangement where the position of the lens of the camera 54 is located close to the top side of the mobile phone 10 when compared with the above-described arrangements and hence no space is available even for the slit SL unlike those arrangements.

As shown in FIGS. 55A and 55B, the lens of the camera 54 is arranged in the inside of the slit SL of the eighth modified conductive plate 14a. Therefore, the width $W_{SL}$ of the slit SL is made about as wide as the width of the lens of the camera 54. However, as will be understood by seeing the results of the simulation on the conductive plate 14a shown in FIG. 46E, an arrangement using such a wide slit SL can also suppress degradation of coupling characteristics due to a conductive plate 14a.

Figure 56A:
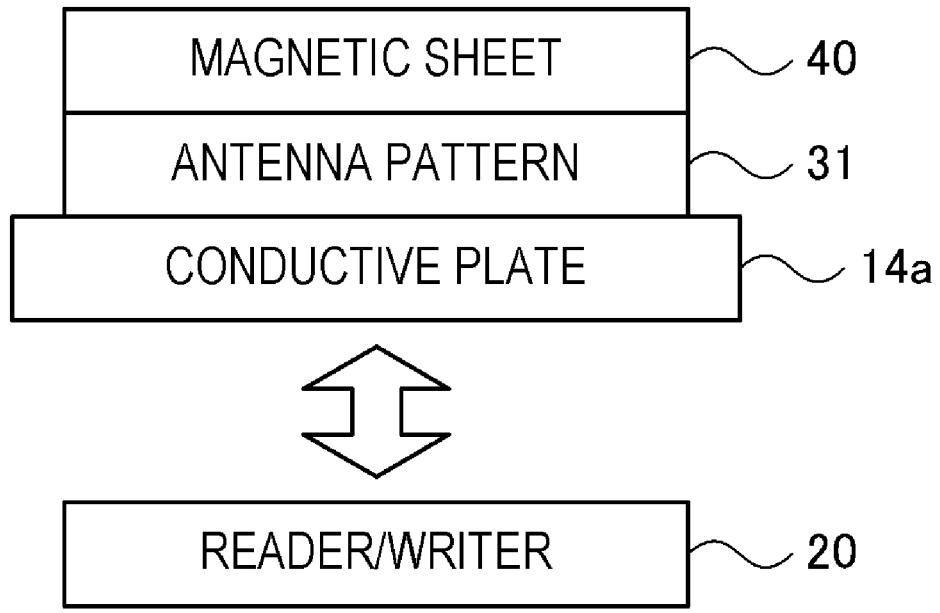
FIG. 56A is a schematic illustration of the system configuration of the short distance communication system according to the tenth embodiment of the present invention.

FIG. 56A is a schematic illustration of the system configuration of the short distance communication system according to the tenth embodiment of the present invention. The short distance communication system according to this embodiment differs from the short distance communication system 1 of the ninth embodiment in that it employs a magnetic sheet 40. Otherwise, this embodiment is same as the ninth embodiment. Now, this embodiment will be described below in detail with stress put on the difference between this embodiment and the ninth embodiment. Throughout the following description and the drawings referred to in the following description, the components similar to those of the ninth embodiment are denoted respectively by the same reference symbols.

As shown in FIG. 56A, the magnetic sheet 40 is arranged at the side opposite to the conductive plate 14a relative to the antenna pattern 31 so that the antenna pattern 31 is interposed between them. The magnetic sheet 40 is a magnetic member, which is a sheet-shaped member made of a magnetic substance such as iron oxide, chromium oxide, cobalt, ferrite or the like and applied onto the surface of the antenna pattern 31 by means of insulating glue (not shown). The magnetic sheet 40 has a size substantially same as or slightly larger than the antenna pattern 31 and smaller than the conductive plate 14a.

With the arrangement shown in FIG. 56A, the part of the magnetic field generated from the conductive plate 14a in the direction of the antenna pattern 31 is confined to the direction of the antenna pattern 31 by the magnetic sheet 40 after passing the antenna pattern 31. Then, as a result, the coupling efficiency is improved.

Table 31 shows the specific values of the parameters of the short distance communication system 1 used in a simulation for demonstrating the effect of the magnetic sheet 40. The magnetic sheet 40 has a size of 7 mm×7 mm that is same as the size of the substrate 30 of the antenna section 13. Table 32 shows the result of a simulation of coupling efficiency (dB) of a short distance communication system using the magnetic sheet 40 and that of a short distance communication system same as the former system except that no magnetic sheet 40 was used. As apparent from Table 32, the coupling efficiency (dB) was improved by using the magnetic sheet 40.

TABLE 31

| $L_{CP}$ mm | $L_{CO}$ mm | $S_{OP1}$ mm² | $W_{SL}$ mm | $L_{SL}$ mm | $S_{OP2}$ mm² | $L_{OX}$ mm | $L_{OY}$ mm | $L_{IX}$ mm | $L_{IY}$ mm |
|---|---|---|---|---|---|---|---|---|---|
| 55 | 40 | 4 × 4 | 0.2 | 10 | 30 × 30 | 6 | 6 | 2.6 | 2.6 |

TABLE 32

|  | Coupling efficiency |
|---|---|
| Instance where magnetic sheet 40 was employed | −15.18 dB |
| Instance where no magnetic sheet 40 was employed | −16.3 dB |

Figure 56B:
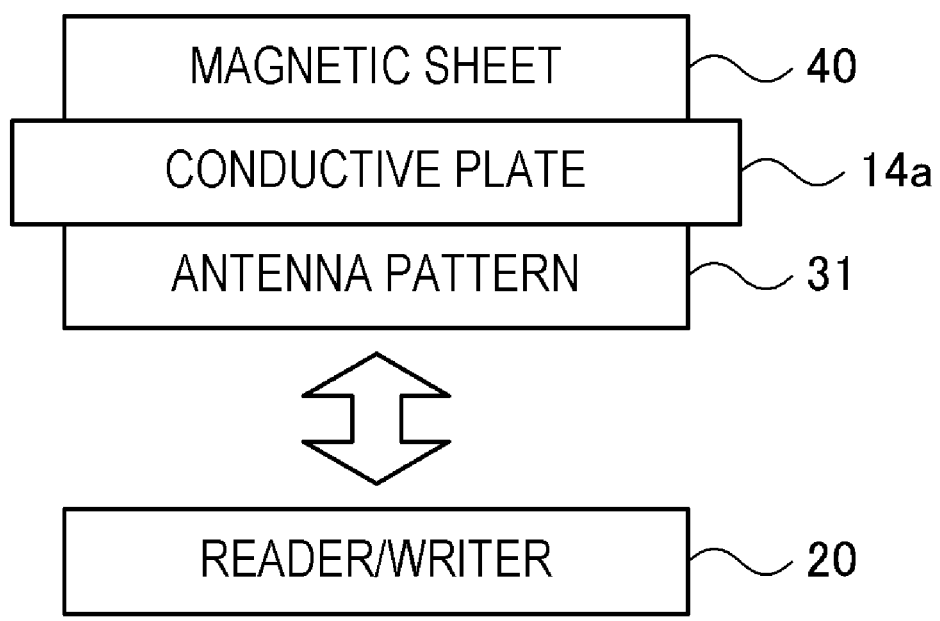
FIG. 56B is a schematic illustration of the system configuration of the short distance communication system according to the modification of the tenth embodiment of the present invention.

Note that the antenna pattern 31 may be arranged outside the cabinet 14 of the mobile phone 10, that is, at the side of the reader/writer 20 of the conductive plate 14a as described in the first embodiment. FIG. 56B schematically illustrates such an arrangement of the magnetic sheet 40. As shown in FIG. 16B, the magnetic sheet 40 is arranged at the side opposite to the antenna pattern 31 relative to the conductive plate 14a so that the conductive plate 14a is interposed between them in this instance. Then, the magnetic sheet 40 is applied to the surface of the conductive plate 14a by means of insulating glue (not shown).

With the arrangement of FIG. 56B, part of the magnetic field generated from the conductive plate 14a that is generated in the direction opposite to the antenna pattern 31 is confined to the direction of the antenna pattern 31 by the magnetic sheet 40. Then, as a result, the coupling efficiency is improved.

Table 33 shows the results of a simulation conducted for coupling efficiency (dB) in the case of FIG. 56B, where the same arrangement was used for two instances except the magnetic sheet 40 was employed in one of the instances, whereas no magnetic sheet 40 was employed in the other instance. The parameters same as those listed in Table 31 were used in this simulation. As apparent from Table 33, the coupling efficiency (dB) was improved by using the magnetic sheet 40 also in the simulation of FIG. 56B.

TABLE 33

|  | Coupling efficiency |
|---|---|
| Instance where magnetic sheet 40 was employed | −14.96 dB |
| Instance where no magnetic sheet 40 was employed | −16.31 dB |

As described above, a short distance communication system of this embodiment employs the magnetic sheet 40 so that it can improve the coupling efficiency (dB) if compared with an arrangement of not using the magnetic sheet 40.

Figure 57A:
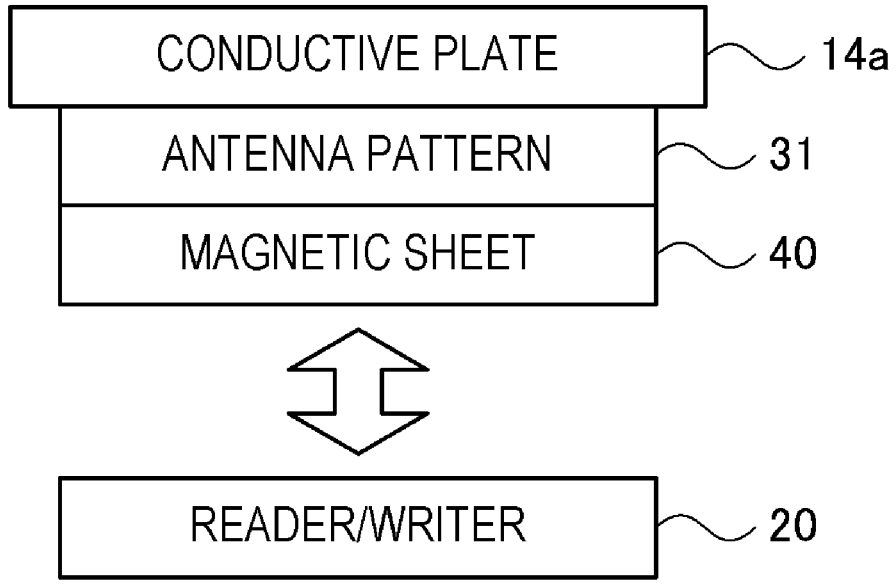
FIGS. 57A and 57B are schematic illustrations of the system configuration of the short distance communication system according to the modification of the tenth embodiment of the present invention.
Figure 57B:
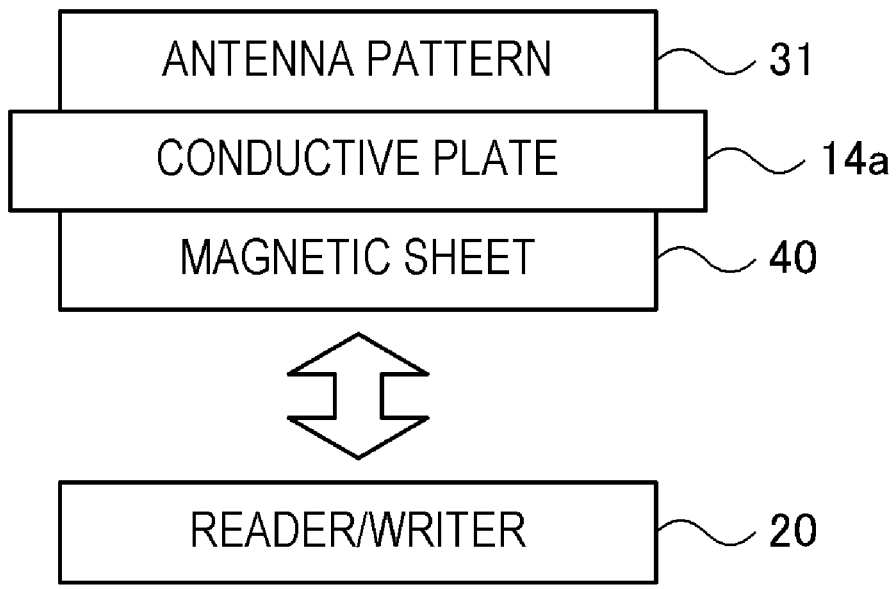

While the magnetic sheet 40 is arranged at a position remotest from the reader/writer 20 in the above-described embodiment, it may alternatively be arranged at a position closest to the reader/writer 20. FIGS. 57A and 57B schematically illustrate specific examples of such an arrangement. FIG. 57A shows an instance where the antenna pattern 31 is arranged at the side of the reader/writer 20 as viewed from the conductive plate 14a. With this arrangement, part of the magnetic field generated from the conductive plate 14a in the direction of the antenna pattern 31 is confined to the direction of the antenna pattern 31 by the magnetic sheet 40 after passing the antenna pattern 31 as in the case of FIG. 56A. Then, as a result, the coupling efficiency is improved. FIG. 57B shows an instance where the conductive plate 14a is arranged at the side of the reader/writer 20 as viewed from the antenna pattern 31. With this arrangement, part of the magnetic field generated from the conductive plate 14a in the direction opposite to the antenna pattern 31 is confined to the direction of the antenna pattern 31 by the magnetic sheet 40 as in the case of FIG. 56B. Then, as a result, the coupling efficiency is improved.

While the first embodiment and the tenth embodiment of the present invention are described above as preferred embodiments, the present invention is by no means limited thereto. It may needless to say that the present invention can be embodied in various different ways without departing from the spirit and scope of the present invention.

For example, a conductive plate 14a may alternatively be prepared by bonding an electroconductive foil or a conductive plate to a cabinet that is an insulating member or by printing.

While the slit of each of the above-described first through tenth embodiments is a linear slit having a constant width, the slit SL may not necessarily be a linear slit having a constant wide. It may alternatively be a curved slit or a slit having a profile of a variable width (trapezoidal, wedge-shaped, entasis-shaped, etc.).

While the conductive plate 14a and the antenna section 13 are electrically isolated from each other in each of the above-described first through tenth embodiments, the conductive plate 14a and the antenna section 13 may be electrically connected to each other by way of a grounding terminal when the conductive plate 14a is formed by using a grounding layer.

A wide variety of components such as a camera module or a chip component may be arranged at a position of overlapping the antenna pattern 31 in plan view. In this case, at least one of the substrate 30 and the magnetic sheet 40 can be impeditive of the arrangement depending on the size and so on of the arranged component. In that case, a hole into which the component is inserted may be provided in each of the substrate 30 and the magnetic sheet 40.

Figure 58A:
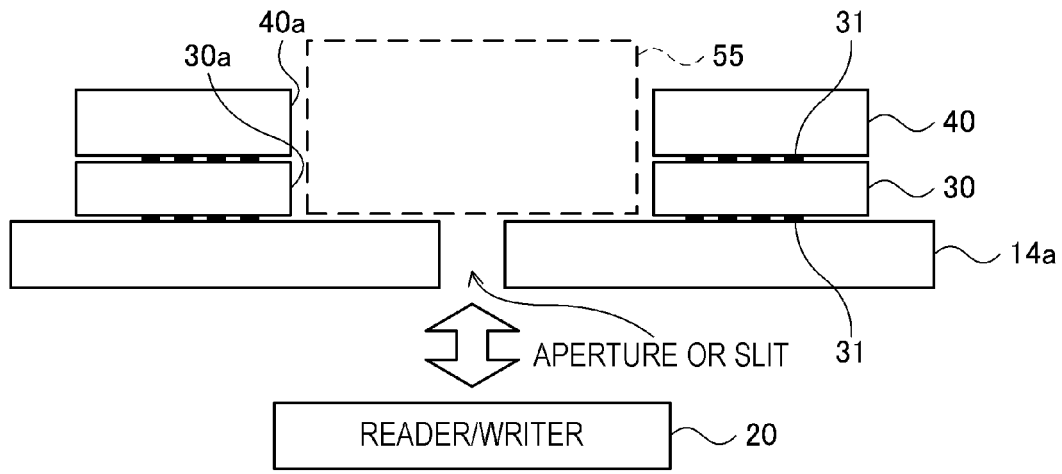
FIG. 58A shows an instance where holes into which a component is inserted are provided in the substrate and the magnetic sheet, respectively, in the short distance communication system according to the third, the fifth, the eighth, and the tenth embodiment of the present invention.

FIG. 58A shows an instance where holes 30a, 40a into which a component 55 is inserted are provided in the substrate 30 and the magnetic sheet 40, respectively, in the short distance communication system according to the third, the fifth, the eighth, and the tenth embodiment of the present invention shown in FIG. 16A, FIG. 28A, FIG. 40A, FIG. 56A, respectively. The hole 30a is provided at a region surrounded by an inner periphery of the antenna pattern 31. The component 55 shown in FIG. 58A is arranged on the multilayer substrate 52 (see FIG. 3(b) and so on) and has a size to the extent that it gets into the substrate 30 and the magnetic sheet 40 as shown in FIG. 58A. However, in the instance shown in FIG. 58A, it becomes possible to arrange the component 55 preferably since the holes 30a, 40a are provided.

Note that, in the instance shown in FIG. 58A, one antenna pattern 31 is configured by providing a planar spiral coil on each of both surfaces of the substrate 30 and connecting the planar spiral coils by through-hole conductor(s) (not shown) provided in the substrate 30. It is possible to configure the antenna pattern 31 using the both surfaces of the substrate 30 like that.

Figure 58B:
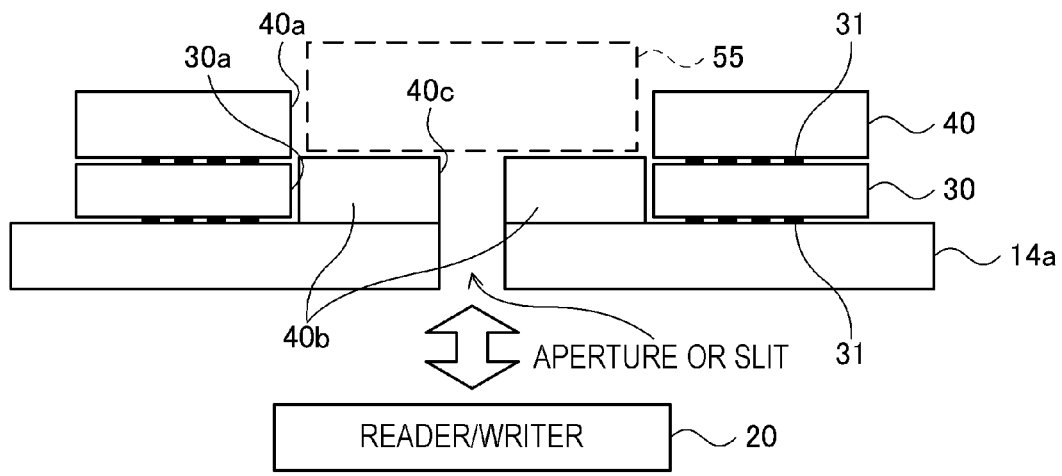
FIG. 58B shows a modification where a magnetic member is provided in the hole provided in the substrate in the instance shown in FIG. 58A.

FIG. 58B shows an instance where the component 55 has a size to the extent that it gets into the magnetic sheet 40 while it does not have a size to the extent that it gets into the substrate 30 and the magnetic sheet 40. As shown in FIG. 58B, even in such a case, it is preferable not to remove the hole 30a of the substrate 30 and to provide a magnetic member 40b in the hole 30a. With this arrangement, it becomes possible to drag a magnetic field produced around the aperture (or the slit) to the antenna pattern 31 efficiently through the magnetic member 40b. Therefore, an improving effect of the coupling efficiency is promised.

Note that, in the instance shown in FIG. 58B, a hole 40c is also provided in the magnetic member 40b. The hole 40c is provided at a position of overlapping the aperture (or the slit) in plan view. In a case where it is not preferable to stop the aperture (or the slit), the hole 40c may be provided in the magnetic member 40b like this. In a case where it does not matter to stop the aperture (or the slit) or not, there is no need to provide the hole 40c.

Figure 58C:
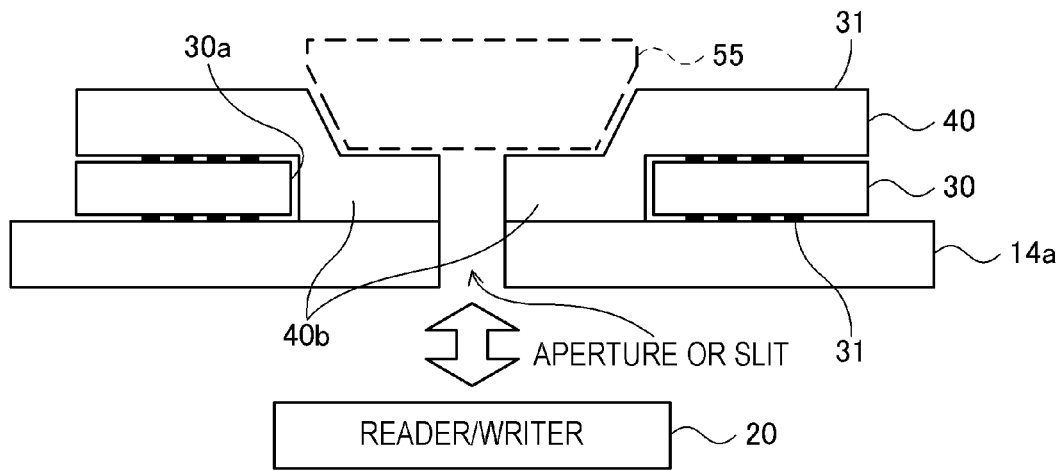
FIG. 58C shows a modification where a magnetic member provided in the instance shown in FIG. 58A is structurally-integrated with the magnetic sheet.

FIG. 58C shows a modification of the instance shown in FIG. 58B. In this instance, as shown in FIG. 58C, the magnetic member 40b and the magnetic sheet 40 are structurally-integrated. It is possible to employ such a configuration depending on the size or the profile of the component 55. And with this arrangement, an improving effect of the coupling efficiency is promised as the instance shown in FIG. 58B.

While each of the first through tenth embodiments is described in terms of a mobile phone in which a non-contact type IC card is mounted, the present invention is by no means limited to applications to mobile phones and can find a broader scope of applications including radio communication devices and other communication devices.

What is claimed is:

1. A proximity type antenna comprising:
   an antenna pattern that wirelessly communicates with an external communication device by magnetic coupling; and
   a conductive plate arranged near the antenna pattern;
   the conductive plate having an aperture and a slit extending from the aperture to an end of the conductive plate;
   at least part of the aperture being arranged at a position of overlapping either the antenna pattern or the region surrounded by the inner periphery of the antenna pattern in plan view.

2. The proximity type antenna as claimed in claim 1, wherein the aperture is arranged off the central point of the conductive plate.

3. The proximity type antenna as claimed in claim 1, wherein the conductive plate is arranged between the antenna pattern and the external communication device; and
   the proximity type antenna further comprises a magnetic member arranged at the side opposite to the conductive plate relative to the antenna pattern.

4. The proximity type antenna as claimed in claim 1, wherein the conductive plate is arranged at the side opposite to the external communication device relative to the antenna pattern; and
   the proximity type antenna further comprises a magnetic member arranged at the side opposite to the antenna pattern relative to the conductive plate.

5. The proximity type antenna as claimed in claim 1, wherein the outer profile area of the antenna pattern is not more than 20% of the area of the conductive plate.

6. The proximity type antenna as claimed in claim 5, wherein the area of the aperture is not less than 20% of the inner profile area of the antenna pattern and not more than 400% of the outer profile area of the antenna pattern.

7. The proximity type antenna as claimed in claim 1, wherein the area of the aperture is not more than 10% of the area of the conductive plate.

8. The proximity type antenna as claimed in claim 1, wherein the length of the slit is not more than 20% or not less than 30% and not more than 70% of the length of the conductive plate in the extending direction of the slit.

9. The proximity type antenna as claimed in claim 1, wherein at least the part of the terminal edge of the conductive plate where the slit is formed is curved to move away from the external communication device.

10. The proximity type antenna as claimed in claim 1, wherein the conductive plate is made of a paramagnetic substance or a diamagnetic substance showing an electric conductivity of not less than $1 \times 10^7$ S/m.

11. The proximity type antenna as claimed in claim 1, wherein the proximity type antenna operates as part of the non-contact type IC card to be mounted in a radio communication device; and the conductive plate is the cabinet of the radio communication device.

12. The proximity type antenna as claimed in claim 1, wherein the proximity type antenna operates as part of the non-contact type IC card to be mounted in a radio communication device;

the radio communication device comprises a circuit substrate including a circuit for communications and a ground layer; and the conductive plate operates as the ground layer.

13. A radio communication device including a proximity type antenna wherein the proximity type antenna comprising:

an antenna pattern that wirelessly communicates with an external communication device by magnetic coupling; and a conductive plate arranged near the antenna pattern;

the conductive plate having an aperture and a slit extending from the aperture to an end of the conductive plate;

at least part of the aperture being arranged at a position of overlapping either the antenna pattern or the region surrounded by the inner periphery of the antenna pattern in plan view.

14. A proximity type antenna comprising:

an antenna pattern that wirelessly communicates with an external communication device by magnetic coupling; and a conductive plate arranged near the antenna pattern in a state of being insulated from the antenna pattern;

the conductive plate having an aperture and a slit extending from the aperture to an end of the conductive plate;

the antenna pattern being arranged at a position of not overlapping the aperture in plan view but overlapping at least part of the slit in plan view.

15. The proximity type antenna as claimed in claim 14, wherein the conductive plate is arranged between the antenna pattern and the external communication device; and the proximity type antenna further comprises a magnetic member arranged at the side opposite to the conductive plate relative to the antenna pattern.

16. The proximity type antenna as claimed in claim 14, wherein the conductive plate is arranged at the side opposite to the external communication device relative to the antenna pattern; and the proximity type antenna further comprises a magnetic member arranged at the side opposite to the antenna pattern relative to the conductive plate.

17. The proximity type antenna as claimed in claim 14, wherein the area where the slit overlaps the antenna pattern in plan view is not less than 35% and not more than 110% of the outer profile area of the antenna pattern.

18. The proximity type antenna as claimed in claim 14, wherein the width of the slit is not less than the length of the inner periphery of the antenna pattern as viewed in the transversal direction of the slit and not more than the length of the outer periphery of the antenna pattern as viewed in the transversal direction of the slit.

19. The proximity type antenna as claimed in claim 14, wherein at least the part of the terminal edge of the conductive plate where the slit is formed is curved to move away from the external communication device.

20. The proximity type antenna as claimed in claim 14, wherein the conductive plate is made of a paramagnetic substance or a diamagnetic substance showing an electric conductivity of not less than $1 \times 10^7$ S/m.

21. The proximity type antenna as claimed in claim 14, wherein the proximity type antenna operates as part of the non-contact type IC card to be mounted in a radio communication device; and the conductive plate is the cabinet of the radio communication device.

22. The proximity type antenna as claimed in claim 14, wherein the proximity type antenna operates as part of the non-contact type IC card to be mounted in a radio communication device;

the radio communication device comprises a circuit substrate including a circuit for communications and a ground layer; and the conductive plate operates as the ground layer.

23. A radio communication device including a proximity type antenna wherein the proximity type antenna comprising:

an antenna pattern that wirelessly communicates with an external communication device by magnetic coupling; and a conductive plate arranged near the antenna pattern in a state of being insulated from the antenna pattern;

the conductive plate having an aperture and a slit extending from the aperture to an end of the conductive plate;

the antenna pattern being arranged at a position of not overlapping the aperture in plan view but overlapping at least part of the slit in plan view.

24. A proximity type antenna comprising:

an antenna pattern that wirelessly communicates with an external communication device by magnetic coupling; and a conductive plate arranged near the antenna pattern in a state of being insulated from the antenna pattern;

the conductive plate being provided at an end part thereof with a slit having a constant width or an inwardly tapered slit;

the antenna pattern being arranged at a position of overlapping at least part of the slit in plan view.

25. The proximity type antenna as claimed in claim 24, wherein the conductive plate is arranged between the antenna pattern and the external communication device; and the proximity type antenna further comprises a magnetic member arranged at the side opposite to the conductive plate relative to the antenna pattern.

26. The proximity type antenna as claimed in claim 24, wherein the conductive plate is arranged at the side opposite to the external communication device relative to the antenna pattern; and the proximity type antenna further comprises a magnetic member arranged at the side opposite to the antenna pattern relative to the conductive plate.

27. The proximity type antenna as claimed in claim 24, wherein the area where the slit overlaps the antenna pattern in plan view is not less than 35% and not more than 110% of the outer profile area of the antenna pattern.

28. The proximity type antenna as claimed in claim 24, wherein the width of the slit is not less than the length of the inner periphery of the antenna pattern as viewed in the transversal direction of the slit and not more than the length of the outer periphery of the antenna pattern as viewed in the transversal direction of the slit.

29. The proximity type antenna as claimed in claim 24, wherein at least the part of the terminal edge of the conductive plate where the slit is formed is curved to move away from the external communication device.

30. The proximity type antenna as claimed in claim 24, wherein the conductive plate is made of a paramagnetic substance or a diamagnetic substance showing an electric conductivity of not less than $1\times10^7$ S/m.

31. The proximity type antenna as claimed in claim 24, wherein the proximity type antenna operates as part of the non-contact type IC card to be mounted in a radio communication device; and the conductive plate is the cabinet of the radio communication device.

32. The proximity type antenna as claimed in claim 24, wherein the proximity type antenna operates as part of the non-contact type IC card to be mounted in a radio communication device;

the radio communication device comprises a circuit substrate including a circuit for communications and a ground layer; and the conductive plate operates as the ground layer.

33. A radio communication device including a proximity type antenna wherein the proximity type antenna comprising:

an antenna pattern that wirelessly communicates with an external communication device by magnetic coupling; and a conductive plate arranged near the antenna pattern in a state of being insulated from the antenna pattern;

the conductive plate being provided at an end part thereof with a slit having a constant width or an inwardly tapered slit;

the antenna pattern being arranged at a position of overlapping at least part of the slit in plan view.

34. A proximity type antenna comprising:

an antenna pattern that wirelessly communicates with an external communication device by magnetic coupling; and a conductive plate arranged near the antenna pattern in a state of being insulated from the antenna pattern;

the conductive plate having a relatively wide first slit arranged at an end part and a relatively narrow second slit arranged at the first slit;

the width of the second slit being smaller than the width of the antenna pattern;

the antenna pattern being arranged across the second slit in plan view.

35. The proximity type antenna as claimed in claim 34, wherein the conductive plate is arranged between the antenna pattern and the external communication device; and the proximity type antenna further comprises a magnetic member arranged at the side opposite to the conductive plate relative to the antenna pattern.

36. The proximity type antenna as claimed in claim 34, wherein the conductive plate is arranged at the side opposite to the external communication device relative to the antenna pattern; and the proximity type antenna further comprises a magnetic member arranged at the side opposite to the antenna pattern relative to the conductive plate.

37. The proximity type antenna as claimed in claim 34, wherein the area where the second slit overlaps the antenna pattern in plan view is not less than 30% and not more than 70% of the outer profile area of the antenna pattern.

38. The proximity type antenna as claimed in claim 34, wherein at least the part of the terminal edge of the conductive plate where the first slit is formed is curved to move away from the external communication device.

39. The proximity type antenna as claimed in claim 34, wherein the conductive plate is made of a paramagnetic substance or a diamagnetic substance showing an electric conductivity of not less than $1\times10^7$ S/m.

40. The proximity type antenna as claimed in claim 34, wherein the proximity type antenna operates as part of the non-contact type IC card to be mounted in a radio communication device; and the conductive plate is the cabinet of the radio communication device.

41. The proximity type antenna as claimed in claim 34, wherein the proximity type antenna operates as part of the non-contact type IC card to be mounted in a radio communication device;

the radio communication device comprises a circuit substrate including a circuit for communications and a ground layer; and the conductive plate operates as the ground layer.

42. A radio communication device including a proximity type antenna wherein the proximity type antenna comprising:

an antenna pattern that wirelessly communicates with an external communication device by magnetic coupling; and a conductive plate arranged near the antenna pattern in a state of being insulated from the antenna pattern;

the conductive plate having a relatively wide first slit arranged at an end part and a relatively narrow second slit arranged at the first slit;

the width of the second slit being smaller than the width of the antenna pattern;

the antenna pattern being arranged across the second slit in plan view.

43. A proximity type antenna comprising:

an antenna pattern that wirelessly communicates with an external communication device by magnetic coupling; and a conductive plate arranged near the antenna pattern in a state of being insulated from the antenna pattern;

the conductive plate having a first aperture, a slit extending from the first aperture to an end of the conductive plate and a second aperture surrounded by the conductive plate along all of its periphery;

the antenna pattern being arranged at a position of overlapping at least either of at least part of the first aperture or at least part of the slit in plan view.

44. The proximity type antenna as claimed in claim 43, wherein the conductive plate is arranged between the antenna pattern and the external communication device; and the proximity type antenna further comprises a magnetic member arranged at the side opposite to the conductive plate relative to the antenna pattern.

45. The proximity type antenna as claimed in claim 43, wherein the conductive plate is arranged at the side opposite to the external communication device relative to the antenna pattern; and the proximity type antenna further comprises a magnetic member arranged at the side opposite to the antenna pattern relative to the conductive plate.

46. The proximity type antenna as claimed in claim 43, wherein at least the part of the terminal edge of the conductive plate where the first slit is formed is curved to move away from the external communication device.

47. The proximity type antenna as claimed in claim 43, wherein the conductive plate is made of a paramagnetic substance or a diamagnetic substance showing an electric conductivity of not less than $1\times10^7$ S/m.

48. The proximity type antenna as claimed in claim 43, wherein the proximity type antenna operates as part of the non-contact type IC card to be mounted in a radio communication device; and the conductive plate is the cabinet of the radio communication device.

49. The proximity type antenna as claimed in claim 43, wherein the proximity type antenna operates as part of the non-contact type IC card to be mounted in a radio communication device;

the radio communication device comprises a circuit substrate including a circuit for communications and a ground layer; and the conductive plate operates as the ground layer.

50. A radio communication device including a proximity type antenna wherein the proximity type antenna comprising:

an antenna pattern that wirelessly communicates with an external communication device by magnetic coupling; and a conductive plate arranged near the antenna pattern in a state of being insulated from the antenna pattern;

the conductive plate having a first aperture, a slit extending from the first aperture to an end of the conductive plate and a second aperture surrounded by the conductive plate along all of its periphery;

the antenna pattern being arranged at a position of overlapping at least either of at least part of the first aperture or at least part of the slit in plan view.

* * * * *